(12) United States Patent
Sato et al.

(10) Patent No.: US 8,248,219 B2
(45) Date of Patent: Aug. 21, 2012

(54) INTERIOR INFORMATION DISPLAY APPARATUS AND LIGHT IRRADIATION APPARATUS USED FOR THE SAME

(75) Inventors: Yoshihisa Sato, Nagoya (JP); Tetsuya Enokizaka, Nagoya (JP); Kenichi Mori, Suzuka (JP); Seiji Kawai, Aichi-gun (JP)

(73) Assignee: Denso Corporation, Kariya (JP)

( * ) Notice: Subject to any disclaimer, the term of this patent is extended or adjusted under 35 U.S.C. 154(b) by 614 days.

(21) Appl. No.: 12/523,772

(22) PCT Filed: Dec. 21, 2007

(86) PCT No.: PCT/JP2007/074637
§ 371 (c)(1),
(2), (4) Date: Jul. 20, 2009

(87) PCT Pub. No.: WO2008/087832
PCT Pub. Date: Jul. 24, 2008

(65) Prior Publication Data
US 2010/0295670 A1   Nov. 25, 2010

(30) Foreign Application Priority Data

Jan. 19, 2007 (JP) ................................. 2007-009865
Oct. 4, 2007 (JP) ................................. 2007-261110

(51) Int. Cl.
*B60Q 1/00* (2006.01)
(52) U.S. Cl. ............... 340/425.5; 340/438; 340/459; 340/461; 353/14
(58) Field of Classification Search .......... 340/458, 340/425.5, 438, 459, 461; 353/13, 14
See application file for complete search history.

(56) References Cited

U.S. PATENT DOCUMENTS

| | | | |
|---|---|---|---|
| 4,908,611 A | 3/1990 | Iino | |
| 5,327,154 A | 7/1994 | Aoki | |
| 5,699,057 A | 12/1997 | Ikeda et al. | |
| 6,733,133 B2 | 5/2004 | Egle et al. | |
| 6,969,183 B2 | 11/2005 | Okubo et al. | |
| 7,036,936 B2 | 5/2006 | Hattori et al. | |
| 7,131,728 B2* | 11/2006 | Nambudiri et al. ............. 353/13 |
| 7,233,311 B2 | 6/2007 | Okubo et al. | |

(Continued)

FOREIGN PATENT DOCUMENTS

DE   103 34 720   3/2005

(Continued)

OTHER PUBLICATIONS

Partial International Search Report for PCT/JP2007/074637, mailed Jan. 29, 2008.

(Continued)

*Primary Examiner* — Toan N Pham
(74) *Attorney, Agent, or Firm* — Nixon & Vanderhye P.C.

(57) ABSTRACT

Information is displayed by irradiating a visible light on a specific position based on at least one of vehicle state information, vehicle surrounding information, and vehicle interior information. For example, the visible light is irradiated on a target switch based on signals indicating an on/off state of a headlamp operation switch and an on/off state of a key switch. A user 5 can easily confirm the target switch and unerringly operate the target switch. A visible light irradiator 6 is arranged in a vehicle compartment and irradiates the visible light to display information in the vehicle compartment. The information can be provided for the user 5 in a novel manner.

53 Claims, 31 Drawing Sheets

U.S. PATENT DOCUMENTS

| | | |
|---|---|---|
| 7,242,388 B2 | 7/2007 | Lieberman et al. |
| 7,275,831 B2 | 10/2007 | Knoll et al. |
| 7,287,884 B2 | 10/2007 | Koike |
| 2003/0146827 A1 | 8/2003 | Koike |
| 2005/0046755 A1 | 3/2005 | Hattori et al. |
| 2006/0022808 A1 | 2/2006 | Ito et al. |
| 2006/0087416 A1 | 4/2006 | Kumabe et al. |
| 2006/0097858 A1 | 5/2006 | Kumabe et al. |
| 2008/0198335 A1 | 8/2008 | Kawai et al. |
| 2008/0238640 A1 | 10/2008 | Mori et al. |
| 2008/0239242 A1 | 10/2008 | Mori et al. |
| 2008/0297727 A1 | 12/2008 | Mori |

FOREIGN PATENT DOCUMENTS

| | | |
|---|---|---|
| JP | 1-245287 | 9/1989 |
| JP | 4-276788 | 10/1992 |
| JP | 8-070418 | 3/1996 |
| JP | 1997-210716 | 8/1997 |
| JP | 10-301200 | 11/1998 |
| JP | 2001-021832 | 1/2001 |
| JP | 2001-159954 | 6/2001 |
| JP | 2002-114095 | 4/2002 |
| JP | 2003-165404 | 6/2003 |
| JP | 2003-291688 | 10/2003 |
| JP | 2004-026109 | 1/2004 |
| JP | 2004-117494 | 4/2004 |
| JP | 2004-136838 | 5/2004 |
| JP | 2004-220257 | 8/2004 |
| JP | 2004-237827 | 8/2004 |
| JP | 2004-262363 | 9/2004 |
| JP | 2005-059721 | 3/2005 |
| JP | 2005-141557 | 6/2005 |
| JP | 2005-234676 | 9/2005 |
| JP | 2005-321948 | 11/2005 |
| JP | 2006-154370 | 6/2006 |
| JP | 2006-221536 | 8/2006 |
| JP | 2006-318159 | 11/2006 |
| JP | 2006-318160 | 11/2006 |
| JP | 2006-327481 | 12/2006 |

OTHER PUBLICATIONS

International Search Report and Written Opinion for PCT/JP2007/074637, mailed Mar. 25, 2008.

* cited by examiner

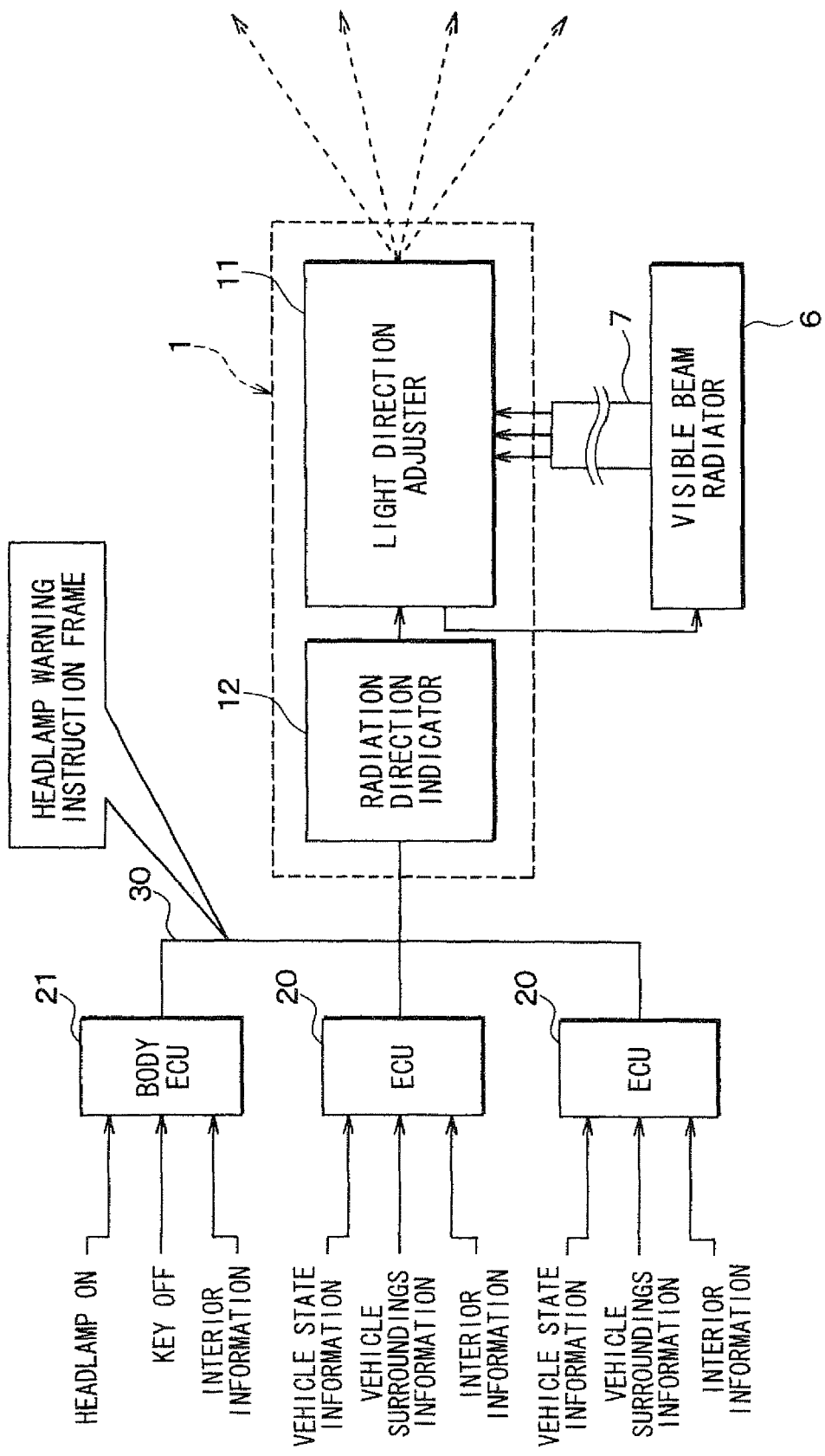

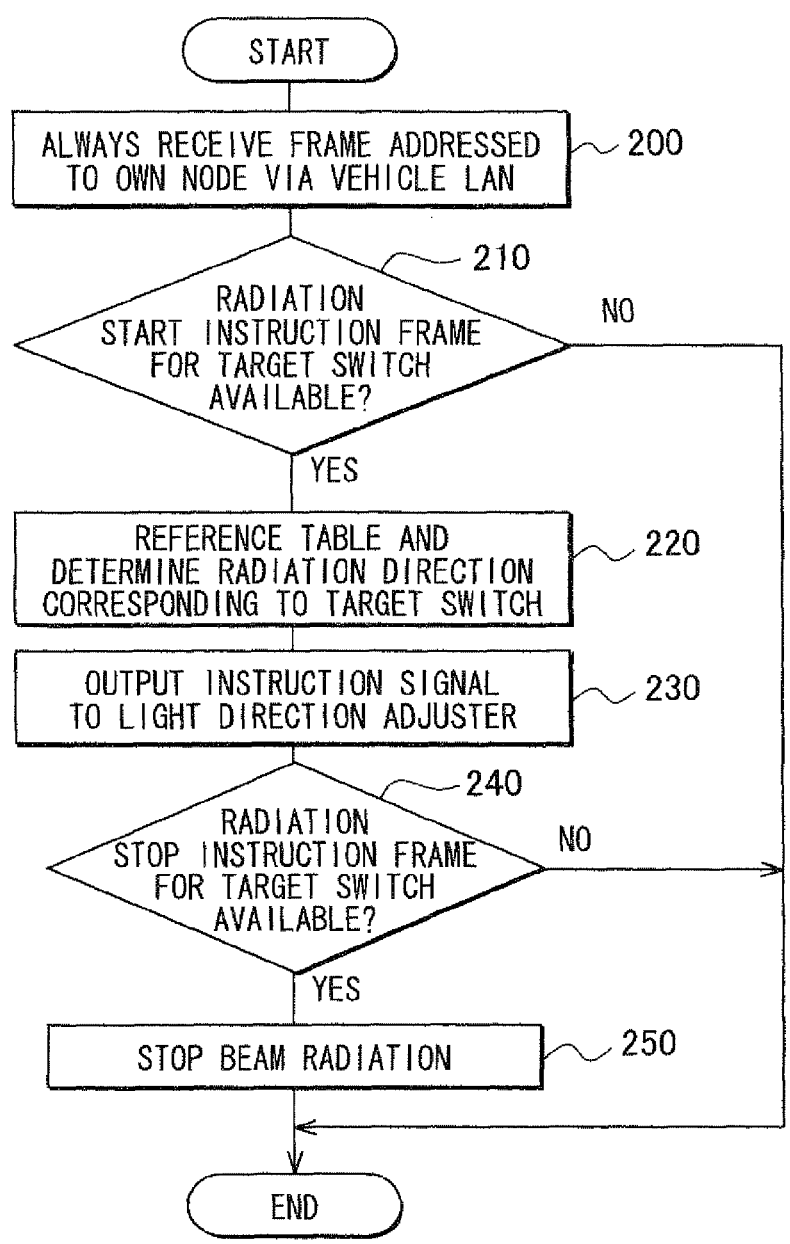

FIG. 31

| TRAJECTORY | HUMAN BEING | TWO-WHEEL VEHICLE |
|---|---|---|
| CROSSING AHEAD OF VEHICLE (FROM RIGHT TO LEFT) | TWO BEAM SPOTS ARE ALTERNATELY DISPLAYED ON INSTRUMENT PANEL AND MOVE FROM RIGHT TO LEFT. | TWO ADJACENT CIRCLES MOVE FROM RIGHT TO LEFT ON INSTRUMENT PANEL. |
| CROSSING AHEAD OF VEHICLE (FROM LEFT TO RIGHT) | TWO BEAM SPOTS ARE ALTERNATELY DISPLAYED ON INSTRUMENT PANEL AND ARE MOVED FROM LEFT TO RIGHT. | TWO ADJACENT CIRCLES MOVE FROM LEFT TO RIGHT ON INSTRUMENT PANEL. |
| APPROACHING OWN VEHICLE FROM FRONT | TWO BEAM SPOTS ARE ALTERNATELY DISPLAYED AT CENTER OF INSTRUMENT PANEL AND MOVE SO AS TO APPROACH DRIVER FROM FRONT. | TWO ADJACENT CIRCLES MOVE AT CENTER OF INSTRUMENT PANEL SO AS TO APPROACH DRIVER FROM FRONT. |
| APPROACHING OWN VEHICLE FROM REAR (RIGHT OF VEHICLE) | TWO BEAM SPOTS ARE ALTERNATELY DISPLAYED ON RIGHT OF INSTRUMENT PANEL AND MOVE FROM REAR TO FRONT. | TWO ADJACENT CIRCLES MOVE FROM REAR TO FRONT ON RIGHT OF INSTRUMENT PANEL. |
| APPROACHING OWN VEHICLE FROM REAR (LEFT OF VEHICLE) | TWO BEAM SPOTS ARE ALTERNATELY DISPLAYED ON LEFT OF INSTRUMENT PANEL AND MOVE FROM REAR TO FRONT. | TWO ADJACENT CIRCLES MOVE FROM REAR TO FRONT ON LEFT OF INSTRUMENT PANEL. |

FIG. 32

(a) 

(b) 

(c) 

FIG. 42

| LASER BEAM START POINT | INSTRUMENT PANEL | PILLAR |
|---|---|---|
| CONTENTS | WARNING (METER)<br>INDICATOR (METER)<br>DROWSINESS DETECTION (NAVIGATION SCREEN) | ROUTE GUIDANCE (NAVIGATION SCREEN)<br>CLEARANCE SONAR DISPLAY (NAVIGATION SCREEN)<br>REAR VIEW DISPLAY (NAVIGATION SCREEN)<br>INCOMING CALL NOTIFICATION (NAVIGATION SCREEN)<br>ETC CHARGING (NAVIGATION SCREEN)<br>MAINTENANCE INFORMATION SUCH AS OIL OR FILTER REPLACEMENT (NAVIGATION SCREEN) |

INTERIOR INFORMATION DISPLAY APPARATUS AND LIGHT IRRADIATION APPARATUS USED FOR THE SAME

CROSS REFERENCE TO RELATED APPLICATIONS

The present application is a National Phase of International Application No. PCT/JP2007/074637, filed 21 Dec. 2007, which designated the U.S., and which claims priority to is based on Japanese Patent Applications No. 2007-9865 filed on Jan. 19, 2007, and No. 2007-261110 filed on Oct. 4, 2007, the disclosures of which are incorporated herein by reference.

TECHNICAL FIELD

The present invention relates to an in-vehicle information display apparatus for displaying information in a compartment of a vehicle using light irradiated from a light source and to a light irradiation device for the in-vehicle information display apparatus.

BACKGROUND ART

Conventionally, an instrument panel is provided with a switch for a vehicle headlamp or position lamp. A light emitting device illuminates the switch and others or the switch surroundings to allow a user to recognize the switches in darkness, for example, at night and to facilitate switch operations.

An interior light or a spot lamp is provided at the center of a vehicle ceiling or above a driver seat. Irradiating the interior light or the spot lamp illuminates the interior or a specific place in front of a driver seat or a passenger seat.

Conventionally, however, the light emitting device simply illuminates the switch and the others or the switch surroundings, or brightens a specific position in the vehicle, not providing any information using the illumination.

An audio message or a display on a monitor can provide a user with information, but gives rise to difficulty for instructing the user in particular operations. Further, the user may feel that the audio message is annoying.

DISCLOSURE OF THE INVENTION

The present invention has been made in consideration of the foregoing. It is therefore an object of the present invention to provide an in-vehicle information display apparatus that includes an interior visible beam irradiator, displays information in the interior using a visible beam irradiated from the visible beam irradiator, and is capable of providing the user with information in a new mode.

According to a first aspect of the disclosure, An in-vehicle information display apparatus includes: a visible light irradiation device mounted on a vehicle and configured to irradiate a condensed visible light as one of a spot light and an area light to a predetermined position in a vehicle compartment; a light irradiation controller including a light direction adjuster and an irradiation direction indicator, wherein the light direction adjuster adjusts an irradiation direction of the visible light irradiated from the visible light irradiation device, and the irradiation direction indicator outputs data associated with the irradiation direction to the light direction adjuster to adjust the irradiation direction of the visible light; and an electronic control unit specifying information about an information display image based on at least one of vehicle state information, vehicle surrounding information and vehicle interior information, and transmits the information about the information display image to the irradiation direction indicator. The irradiation direction indicator outputs the data associated with the irradiation direction to the light direction adjuster based on the information about the information display image transmitted from the electronic control unit, and the light direction adjuster adjusts the irradiation direction of the visible light irradiated from the visible beam irradiator for irradiating the visible light irradiated into the vehicle compartment according to the information about the information display image.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation device is provided in the vehicle compartment. The light irradiation device irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information.

According to a second aspect of the disclosure, a light irradiation device is mounted on a vehicle, and irradiates a condensed visible light as a spot light or an area light to a predetermined position in a vehicle compartment. An electronic control unit specifies information about an information display image based on at least one of vehicle state information, vehicle surrounding information, and vehicle interior information and transmits the information about the information display image to the light irradiation device. The light irradiation device irradiates the visible light in the vehicle compartment in accordance with the information about the information display image transmitted from the electronic control unit. A light irradiation controller irradiates the visible light into the vehicle compartment with changing an irradiation position of the visible light in accordance with information about the information display image transmitted from the electronic control unit.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation device is provided in the vehicle compartment. The light irradiation device irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information. Further, the movingly irradiation of the visible light can provide to increase the possibility of causing the user to pay attention to the irradiation. The user can reliably recognize the beginning of visual beam irradiation. A fixation point of the user can be guided to a target location to be irradiated in the vehicle compartment. Further, the information is displayed at locations in the vehicle compartment, and it is possible to display the information associated with the irradiation location by changing irradiation locations of the visual light depending on the content of information to be displayed.

According to a third aspect of the disclosure, an in-vehicle information display apparatus includes: a light irradiation controller mounted on a vehicle and configured to irradiate a condensed visible light as one of a spot light and an area light to a predetermined position in a vehicle compartment; and an electronic control unit specifying information about an information display image based on at least one of vehicle state information, vehicle surrounding information and vehicle interior information, and transmits the information about the information display image to the light irradiation controller. The light irradiation controller irradiates the visible light into the vehicle compartment in accordance with information about the information display image transmitted from the electronic control unit. The light irradiation controller movingly irradiates the visible light from a specific position to another position in the vehicle compartment in accordance with the information about the information display image transmitted from the electronic control unit.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation device is provided in the vehicle compartment. The light irradiation device irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information. The movingly irradiation of the visible light provides to increase the possibility of causing the user to pay attention to the irradiation. The user can reliably recognize the beginning of visual beam irradiation. A fixation point of the user can be guided to a target location to be irradiated in the vehicle compartment. The information can be displayed on various locations in the vehicle compartment. A location to irradiate the visible light can be changed in accordance with the information about an information display image. For example, information can be displayed in association with an irradiation location.

According to a fourth aspect of the disclosure, an in-vehicle information display apparatus includes: a light irradiation controller mounted on a vehicle and configured to irradiate a condensed visible light as one of a spot light and an area light to a predetermined position in a vehicle compartment; and an electronic control unit specifying information about an information display image based on at least one of vehicle state information, vehicle surrounding information and vehicle interior information, and transmits the information about the information display image to the light irradiation controller. The light irradiation controller irradiates the visible light into the vehicle compartment in accordance with information about the information display image transmitted from the electronic control unit. The light irradiation controller movingly irradiates the visible light from a specific position to another position in the vehicle compartment in accordance with the information about the information display image transmitted from the electronic control unit.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation device is provided in the vehicle compartment. The light irradiation device irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information. The movingly irradiation of the visible light provides to increase the possibility of causing the user to pay attention to the irradiation. The user can reliably recognize the beginning of visual beam irradiation. A fixation point of the user can be guided to a target location to be irradiated in the vehicle compartment. The information can be displayed on various locations in the vehicle compartment. A location to irradiate the visible light can be changed in accordance with the information about an information display image. For example, information can be displayed in association with an irradiation location.

According to a fifth aspect of the disclosure, a video light generation apparatus is arranged in a vehicle compartment, and condenses a light from a light source to generate a video light. An occupant determination means determines whether an occupant exists in a vehicle compartment. A display control means controls the video light generation apparatus to irradiate the video light in the vehicle compartment so as to display a video image when the occupant determination means determines that no occupant is in the vehicle compartment. When it is determined that no occupant is in the vehicle compartment, the video light generation apparatus irradiates the video light in the vehicle compartment to display the video image. The video can be displayed more effectively without limitation on places for displaying the video.

According to a sixth aspect of the disclosure, a position adjusting means adjusts a position of information displayed by irradiating a laser beam on an instrument panel surface of a vehicle from a vehicular display apparatus. Information can be visually recognized in accordance with a height of a driver. The position for displaying the information can be adjusted so as to be capable of decreasing a visual line distance.

According to a seventh aspect of the disclosure, a generated light is irradiated on the surface of a structural object in a vehicle compartment positioned in a peripheral visual field of an occupant so as to change an irradiation direction of the generated light. The generated light is displayed movingly in an irradiation range. An occupant can notice the generated light that is displayed movingly in the peripheral visual field to provide information.

Generally, the human visual cognitive capability is highest at the central visual field and tends to decrease from the central visual field to the peripheral visual field. When recognizing an object included in the peripheral visual field, the human being moves his or her visual line so that the object is included in the central visual field. A change may be made to the object included in the peripheral visual field in such a case where a pedestrian runs out into the road. The human being obviously tends to unconsciously and promptly react on the change of the object and move the visual line to the object. The human being can notice the generated light that is displayed movingly in the peripheral visual field.

According to an eighth aspect of the disclosure, an in-vehicle information display apparatus acquires information about a surrounding situation from an system outside of the vehicle while an autonomous sensor mounted on the vehicle cannot detect the surrounding situation. The in-vehicle information display apparatus determines whether the information needs to be provided. When it is determined that information needs to be provided, a generated light is irradiated on a structural object in the vehicle compartment included in the peripheral visual field of an occupant. The occupant can notice the display by the generated light and pay attention to the surroundings of the vehicle. As a result, the in-vehicle information display apparatus can supply the occupant with information about an obstacle that cannot be detected from the vehicle.

According to a ninth aspect of the disclosure, an irradiator irradiates light into a vehicle compartment. A display control means controls the irradiator to irradiate light to a steering wheel of the vehicle and to display an instruction for steering wheel operation.

According to such a construction, the irradiator irradiates light to the vehicle compartment and on the vehicle steering wheel so as to display an instruction for steering wheel operation. The instruction for steering wheel operation can be displayed without providing an indicator on an instrument panel in the vehicle compartment.

The instruction for steering wheel operation can be displayed using a space on the vehicle steering wheel easily visible to a driver.

BRIEF DESCRIPTION OF THE DRAWINGS

The above and other objects, features and advantages of the present invention will become more apparent from the following detailed description made with reference to the accompanying drawings. In the drawings:

FIG. 4 is a block diagram illustrating an exemplary use of an in-vehicle information display apparatus;

FIG. 5 is a flow chart illustrating an information display process performed by an irradiation direction indicator according to an example in FIG. 4;

FIG. 6 is a diagram illustrating a table of a relation between a target switch and an irradiation direction;

FIG. 31 is a diagram illustrating a table of exemplary trajectories for displaying obstacles;

FIG. 32 is a diagram illustrating display pattern examples of visual beam trajectories depending on hazard levels;

FIG. 42 is a diagram illustrating a table of grouping examples according to degrees of urgency.

PREFERRED EMBODIMENTS FOR CARRYING OUT THE INVENTION (First Embodiment)

Figure 1:
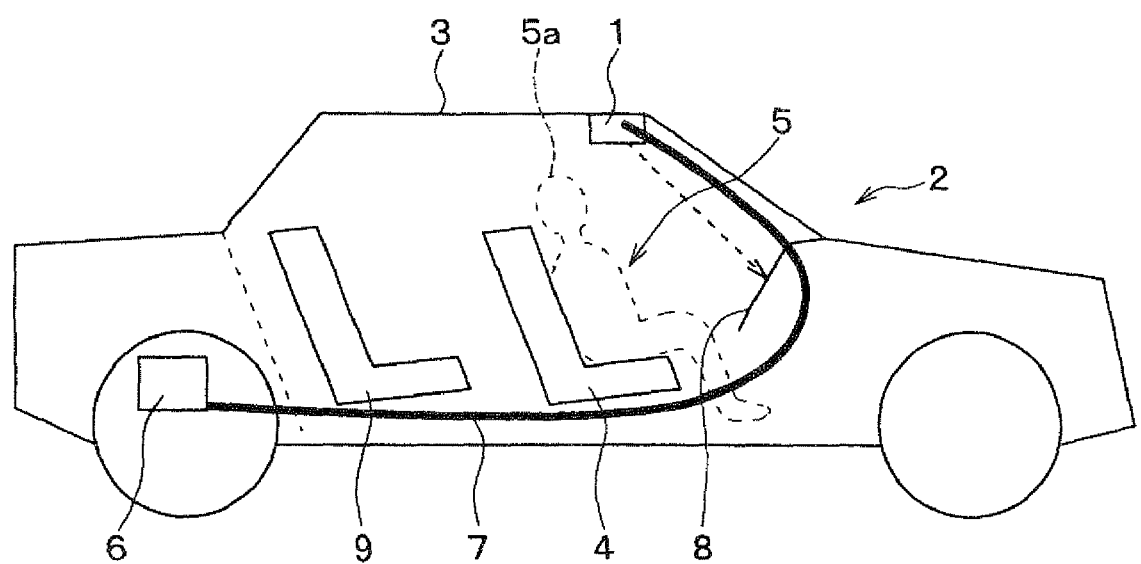
FIG. 1 is a diagram illustrating a side view and showing an example of mounting a light irradiation device of an in-vehicle information display apparatus on a vehicle according to a first embodiment of the invention.

The following describes a first embodiment of the invention. FIG. 1 is a side view showing an example of mounting the in-vehicle information display apparatus according to the present embodiment.

As shown in FIG. 1, a light irradiation device 1 (light irradiation controller) is included in the in-vehicle information display apparatus and is mounted on a ceiling 3 of a vehicle 2. Specifically, the light irradiation device 1 is provided on the ceiling 3 toward a vehicle front far from a driver seat 4. Preferably, the light irradiation device 1 is provided toward the vehicle front far from an expected position of a head 5a of a user 5 when the user 5 sits on the driver seat 4. Similarly to the light irradiation device 1, a visible beam irradiator (visible light irradiation device) 6 is included in the in-vehicle information display apparatus and is provided in a trunk.

The light irradiation device 1 irradiates visual beams to positions in a vehicle compartment. The "positions in the vehicle compartment" here are intended to mean any positions including the interior in the vehicle compartment where the visible beam irradiator 6 can irradiate visual beams. Specifically, the positions include not only various meters (not shown) in the vehicle compartment and display sections for navigation, DVD (Digital Versatile Disc), and TV (television), but also all surfaces in the vehicle compartment (including the interior) where a visual beam can be physically irradiated. Specifically, surfaces in the vehicle compartment include various switches to be described, an instrument panel surface, a center console, a seat belt buckle, a front pillar, and a steering wheel.

The visual beam is irradiated on reachable positions or surfaces in the vehicle compartment surfaces of vehicle structures belonging to or provided in the vehicle compartment independently of surface areas, surface curvatures, irregularity, or surface roughness. The visual beam is generated by condensing visual light causing a large focal depth. The visual beam can form a relatively sharp image for displaying information at positions in the vehicle compartment where many curved surfaces and lines are used. However, the visual beam may reflect on a highly reflective portion such as a glass surface and may be irradiated at an unintended location. Necessary information may not be correctly transmitted to the user 5. It is preferable to avoid irradiating the visual beam to a highly reflective portion such as a glass surface.

The light irradiation device 1 displays various information by irradiating the visual beam to positions in the vehicle compartment or movingly irradiating the visual beam to different irradiation positions at positions in the vehicle compartment. Various information can be provided for the user 5. Specifically, the light irradiation device 1 adjusts irradiation directions of the visual beam irradiated from a visible beam irradiator 11 to be described later to display information in the vehicle compartment using the visual beam. In such a manner, the visual beam can be used to instruct or guide the user 5.

The information is displayed at a location that is not specially provided for the information display. Even when the visual beam is irradiated so as to display the information, the beam irradiation stops displaying the information. The location for displaying the information returns to a state where no information is displayed. Normally, the user 5 need not be aware of the location for the information display. The location can be used for the information display when the visual beam is irradiated.

The light irradiation device 1 may be provided independently or may be housed in an interior light or elsewhere. According to the example, the light irradiation device 1 is provided on the ceiling 3. In addition, the light irradiation device 1 may be provided ahead of a rear view mirror.

The visible beam irradiator 6 irradiates a visual beam. The visible beam irradiator 6 supplies a visual beam to the light irradiation device 1 through an optical fiber cable 7. For example, the visible beam irradiator 6 is constructed as a laser generator that irradiates the laser as a visual beam. The visible beam irradiator 6 may irradiate the other visual beams than the laser to display information by condensing visible light generated by an LED or an incandescent lamp, for example.

According to the embodiment, the visible beam irradiator 6 is placed in the trunk taking into consideration a case where the visible beam irradiator 6 includes parts such as a semiconductor laser that is weak against a high temperature. The above-mentioned place is selected for mounting so as to avoid an easily heated place such as the ceiling 3 of the vehicle 2 and mount the visible beam irradiator 6 at a place free from a high temperature in the vehicle compartment. The above is merely an example. The visible beam irradiator 6 may be mounted anywhere in the vehicle 2 where a high temperature can be avoided. For example, the visible beam irradiator 6 may be mounted under the driver seat 4 or in the instrument panel. For example, the visible beam irradiator 6 may be provided with a heat dissipation structure such as a cooling fan or an irradiation fin to resist heat. The visible beam irradiator 6 may be integrated with the light irradiation device 1 into a light irradiation module.

The optical fiber cable 7 needs to be laid out so as to transmit a visual beam irradiated from the visible beam irradiator 6 to the light irradiation device 1. When the light irradiation device 1 is provided on the ceiling 3 according to the embodiment, the optical fiber cable 7 can reach the ceiling 3 from the trunk under seats, passing through the rear of the instrument panel 8 and a front pillar (not shown).

Figure 2:
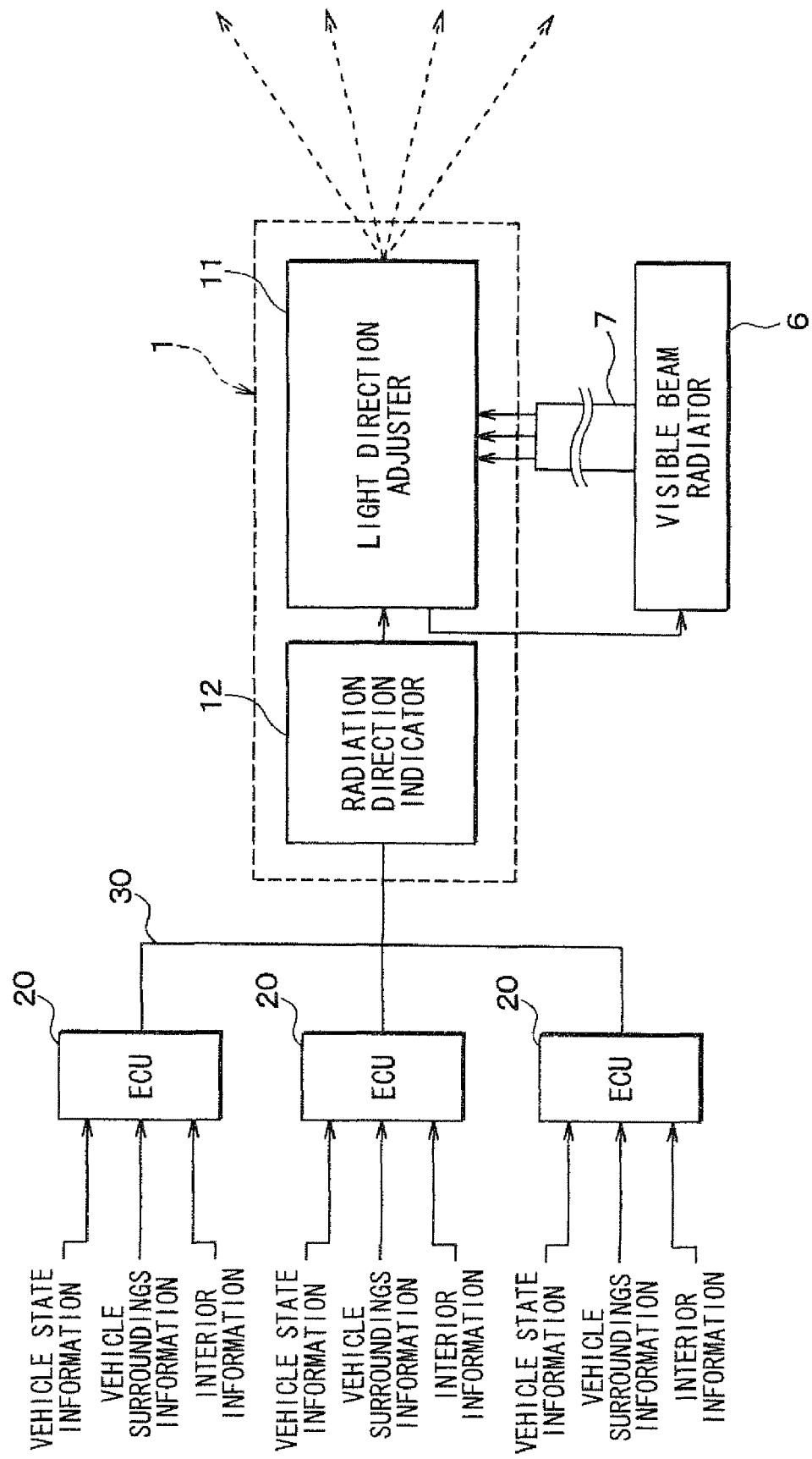
FIG. 2 is a block diagram illustrating an in-vehicle information display apparatus including the light irradiation device.

FIG. 2 is a block diagram showing the in-vehicle information display apparatus including the light irradiation device 1. As shown in FIG. 2, the light irradiation device 1 includes a light direction adjuster 11 and an irradiation direction indicator 12 integrated with each other.

The light direction adjuster 11 outputs a request signal for requesting the visible beam irradiator 6 to irradiate a visual beam. In addition, the light direction adjuster 11 reflects or curves a visual beam irradiated from the visible beam irradiator 6 to adjust irradiation directions of the visual beam. For example, the light direction adjuster 11 includes a DLP (registered trademark) digital projector manufactured by Texas Instruments Incorporated (TI) used for galvanometer mirrors and projectors.

The irradiation direction indicator 12 outputs an instruction signal that instructs the light direction adjuster 11 to adjust a visual beam direction. The irradiation direction indicator 12 includes a known microcomputer provided with a CPU, ROM, RAM, and 10, for example. In accordance with a program stored in the ROM, the irradiation direction indicator 12 receives an irradiation instruction frame that requests information display by irradiating a visual beam. The irradiation direction indicator 12 transmits an instruction signal corresponding to the content of the irradiation instruction frame to the light direction adjuster 11. The irradiation instruction frame contains the contents of information to be displayed. For example, the irradiation instruction frame includes information such as messages, symbols, and patterns that are created based on vehicle state information, vehicle surrounding information, or vehicle compartment information and are supplied to an occupant (user 5) in the vehicle. The irradiation instruction frame also includes information simply for specifying an irradiation target. In other words, the irradiation instruction frame includes not only an information display image meaningful itself but also information that is meaningless itself but, when illuminated, guides the user 5 to an irradiation target. That is, some frames signify information about an information display image and are used to start irradiating a message, for example. Other frames are used to stop irradiating the information to be displayed. The irradiation direction indicator 12 outputs instruction signals for providing these frames.

According to the above described construction, the irradiation direction indicator 12 inputs an instruction signal to the light direction adjuster 11. The light direction adjuster 11 outputs a request signal for irradiating a visual beam to the visible beam irradiator 6. When the visible beam irradiator 6 irradiates the visual beam, the light direction adjuster 11 adjusts the direction of the visual beam to be reflected or bent.

In such a manner, the visual beam can specify a location to be confirmed by the user 5. Switches and a dashboard of the instrument panel 8 are examples of positions in the vehicle compartment that need to be confirmed by the user 5. The visual beam is movingly irradiated on different irradiation positions based on a predetermined origin in the vehicle so as to guide a location to be carefully watched by the user 5. The visual beam can be irradiated on switches on the instrument panel 8 to instruct the user 5 what should be operated. The visual beam can display information on the dashboard using letters, symbols, and patterns created based on the detected vehicle state information, vehicle surrounding information, or vehicle compartment information. Necessary information can be provided for the user 5. The information display will be described later in more detail.

An example of the light irradiation device 1 is known as the exterior display output section described in Japanese Patent Application Laid-open No. 2004-505315. A detailed description about the specific structure of the light irradiation device 1 is omitted.

According to the above description the irradiation position is changed from any position of origin. Further, a specific position may be predetermined as an origin. Alternatively, an eye direction detector (not shown) may be used to detect an eye direction of the user 5. A specific position may be settled as an origin so as to align with the eye direction. The visual beam may be movingly irradiated on different irradiation positions from the origin. It is possible to increase the possibility of causing the user 5 to pay attention to the irradiation. The user 5 can reliably recognize the beginning of visual beam irradiation. A fixation point of the user 5 can be guided to a target location, such as a position where the visual beam is irradiated.

As shown in FIG. 2, the light irradiation device 1 is connected to an electronic control unit (hereafter referred to as an ECU) 20 through a wired or wireless vehicle LAN 30. The ECU 20 provides various controls for the vehicle 2 and supplies information. Each ECU 20 provides the irradiation direction indicator 12 with various information needed for information display via the vehicle LAN 30.

Specifically, each ECU 20 acquires the vehicle state information, the vehicle surrounding information, and the vehicle interior information based on various sensors, operation switches, or input signals.

The vehicle state information indicates states of the vehicle 2 detected by various onboard apparatuses (not shown) provided for the vehicle 2. Such states concern opening or closing a door or a window of the vehicle 2 or operating a parking brake, for example. The vehicle state information can be acquired based on the following signals, for example. A wireless ECU controls locking or unlocking a door using a wireless key or a remote key and generates a door lock/unlock signal. A door ECU recognizes and controls opening and closing a door or a window and generates a signal indicating an open/close state of the window. A parking brake switch of the vehicle 2 controls activating or deactivating the parking brake and generates a parking brake signal indicating a parking brake state.

The vehicle surrounding information is detected by a vehicle surroundings sensor (not shown) and includes: information about obstacles to the vehicle 2 such as the other vehicles, two-wheel vehicles, and pedestrians around the vehicle 2; information near the vehicle 2 such as specific facilities including landmarks and stores, advertisements and traffic lights; and information outside the vehicle such as ambient temperature, weather information, and exterior illumination. The information about vehicle states can include obstacle types, positions (latitude and longitude), traveling directions (orientations), and traveling speeds (kilometers per hour) in addition to the presence or absence of obstacles. The vehicle surrounding information can be acquired by supplying information such as surrounding situation information about an obstacle, namely, an object such as another vehicle, two-wheel vehicle, or a pedestrian that may interrupt the progress of the own vehicle. An obstacle detection sensor, i.e., autonomous sensor such as an ultrasonic or a radar sensor mounted on the vehicle cannot detect such obstacle. The surrounding situation information is supplied from the road-to-vehicle communication between the vehicle and an external roadside infrastructure or from the inter-vehicle communication with the other vehicles using a wireless communication apparatus.

The vehicle interior information provides information about the user 5 or information in the vehicle compartment used to irradiate a visual beam. The vehicle interior information includes a state indicating whether the user 5 gets in the vehicle, an eye position of the user 5, an obstacle such as the steering wheel that interrupts a visual beam, temperature and humidity in the vehicle compartment, a sound volume in the vehicle compartment, odor in the vehicle compartment, and a diffuse reflection factor of the visual beam. For example, the vehicle interior information can be acquired based on the following signals: a signal indicating an on/off state of a key switch (or an ignition key) of the vehicle 2, which can be considered the same as information about the ignition key for a push switch in a smart key system; a final posture sensor signal from a final posture sensor that is embedded in each seat in the vehicle compartment and detects whether an occupant sits on the seat; a signal from the wireless ECU indicating a locked or unlocked state of a door; a signal from the door ECU indicating an open or closed state of the door; light signals indicating on/off states of a headlamp and a position lamp controlled by the vehicle light control switch; and a parking brake signal indicating an on/off state of the parking brake.

The vehicle interior information includes biological information about the user 5. A known sensor (not shown) detects the biological information including sweating, pulse rate, and blinking or mouth opening based on the facial image recognition.

Based on the acquired information, each of the ECUs 20 transmits the irradiation instruction frame to the irradiation direction indicator 12 via the vehicle LAN 30. At the time of transmission, a node is associated with the irradiation instruction frame. The own node is equivalent to an address and indicates the content of the irradiation instruction frame to be executed by the irradiation direction indicator 12. Using the own node, the irradiation direction indicator 12 can recognize that the irradiation instruction frame stores the content to be executed by the irradiation direction indicator 12. The transmitted irradiation instruction frame stores the contents of information messages to be displayed or instructions to start or stop irradiating messages.

Figure 3:
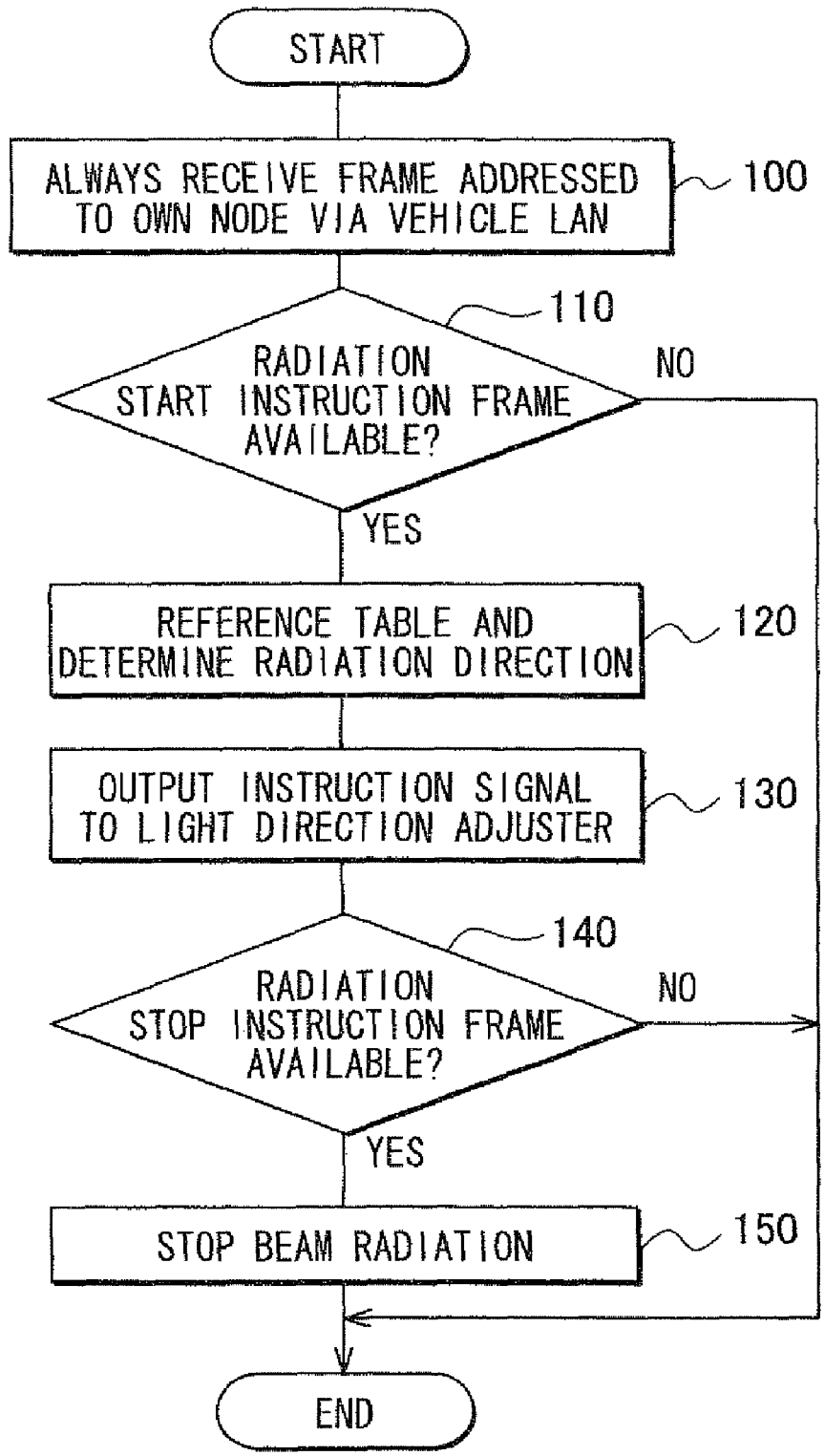
FIG. 3 is a flow chart illustrating an information display process performed by an irradiation direction indicator.

The following describes operations of the in-vehicle information display apparatus according to the embodiment. FIG. 3 is a flow chart showing an information display process performed by the irradiation direction indicator 12. The information display process can refer to the program stored in the irradiation direction indicator 12. The information display process is periodically performed at a specified computing cycle independently of whether the ignition switch is turned on or off.

At Step 100, the process receives a frame addressed to the own node via the vehicle LAN 30. Frames containing various data are transmitted within the vehicle LAN 30. The process receives one of these frames by determining whether the own node is attached to the frame addressed to the irradiation direction indicator 12.

At Step 110, the process determines whether the received frame contains an irradiation start instruction frame. The irradiation start instruction frame is an irradiation instruction frame that is transmitted from each of various ECUs 20 and contains the content of an instruction to start irradiating a location to be confirmed by the user 5 in the vehicle compartment. Step 110 is determined affirmatively when the frame containing the irradiation start instruction is received. Step 110 is determined negatively when no irradiation start instruction frame is received. When Step 110 is determined affirmatively, the process proceeds to Step 120. When Step 110 is determined negatively, the process terminates.

At Step 120, the process references a table to determine data that is stored in the irradiation start instruction frame and indicates the irradiation direction corresponding to a location for irradiation. The irradiation direction table is previously stored in the ROM of the irradiation direction indicator 12. For example, the table contains a location for irradiation and an angle of the visual beam for irradiating the location.

The process proceeds to Step 130 and outputs an instruction signal to the light direction adjuster 11 in accordance with the irradiation direction data determined at Step 120. The light direction adjuster 11 outputs a request signal for requesting irradiation of the visual beam to the visible beam irradiator 6. In such a manner, an intended visual beam is irradiated. The light direction adjuster 11 adjusts the irradiation direction of the visual beam. The visual beam irradiates a predetermined position stored in the irradiation instruction frame.

The process proceeds to Step 140 and determines whether the received frame contains an irradiation stop instruction frame. The irradiation stop instruction frame is an irradiation instruction frame that is transmitted from each of various ECUs 20 and includes the content of an instruction to stop the irradiation. Step 140 is determined affirmatively when the irradiation stop instruction frame is received. Step 140 is determined negatively when no irradiation stop instruction frame is received. When Step 140 is determined affirmatively, the process proceeds to Step 150. When Step 140 is determined negatively, the process terminates.

At Step 150, the process outputs an instruction signal to the light direction adjuster 11 so as to stop the beam irradiation. The visible beam irradiator 6 stops irradiating the visual beam.

An example of the in-vehicle information display apparatus will be described. In the present example, the in-vehicle information display apparatus provides information based on the vehicle state information.

FIG. 4 is a block diagram showing an example of the in-vehicle information display apparatus. FIG. 5 is a flow chart showing the information display process performed by the irradiation direction indicator 21 according to the example. With reference to the drawings, the following describes operations of the in-vehicle information display apparatus according to the embodiment.

As shown in FIG. 4, the example uses a body ECU 21 as one of the above-mentioned ECUs 20. The body ECU 21 controls the headlamp. The following describes how information is displayed in the vehicle compartment based on a request from the body ECU 21.

Specifically, the body ECU 21 acquires a signal indicating the on/off state of a headlamp operation switch or a signal indicating the on/off state of a key switch (accessory switch or ignition switch). The signals are used as the vehicle state information. Based on the signals, the body ECU 21 determines that the user 5 has forgotten to turn off the headlamp when the headlamp operation switch is on and the key switch is off. The body ECU 21 supplies the irradiation direction indicator 12 with the frame containing the irradiation instruction that warns the user against the headlamp left turned on. To stop the irradiation, the body ECU 21 supplies the irradiation direction indicator 12 with a frame containing an irradiation instruction that stops irradiating a headlamp warning.

When the irradiation instruction frame is transmitted, the irradiation direction indicator 12 performs the information display process as shown in FIG. 5. The process receives the irradiation instruction frame associated with the own node (Step 200). The process determines whether the irradiation instruction frame contains an irradiation start instruction frame for a switch for irradiation (hereafter referred to as a target switch) (Step 210). When the irradiation start instruction frame for the target switch is contained, the process determines the irradiation direction corresponding to the target switch by referencing the table (Step 220).

FIG. 6 is a table showing an example of the relation between a target switch and an irradiation direction. As shown in FIG. 6, the table stores irradiation directions corresponding to target switches (A) through (D). In the present example, the light direction adjuster 11 rotates a reflecting mirror to adjust the visual beam irradiation direction. The reflecting mirror normal vector is represented as spherical rotational coordinate (r, θ, φ) with reference to the reflecting mirror rotation center. The spherical rotational coordinate (r, θ, φ) is used as data for adjusting the visual beam irradiation direction.

Figure 7:
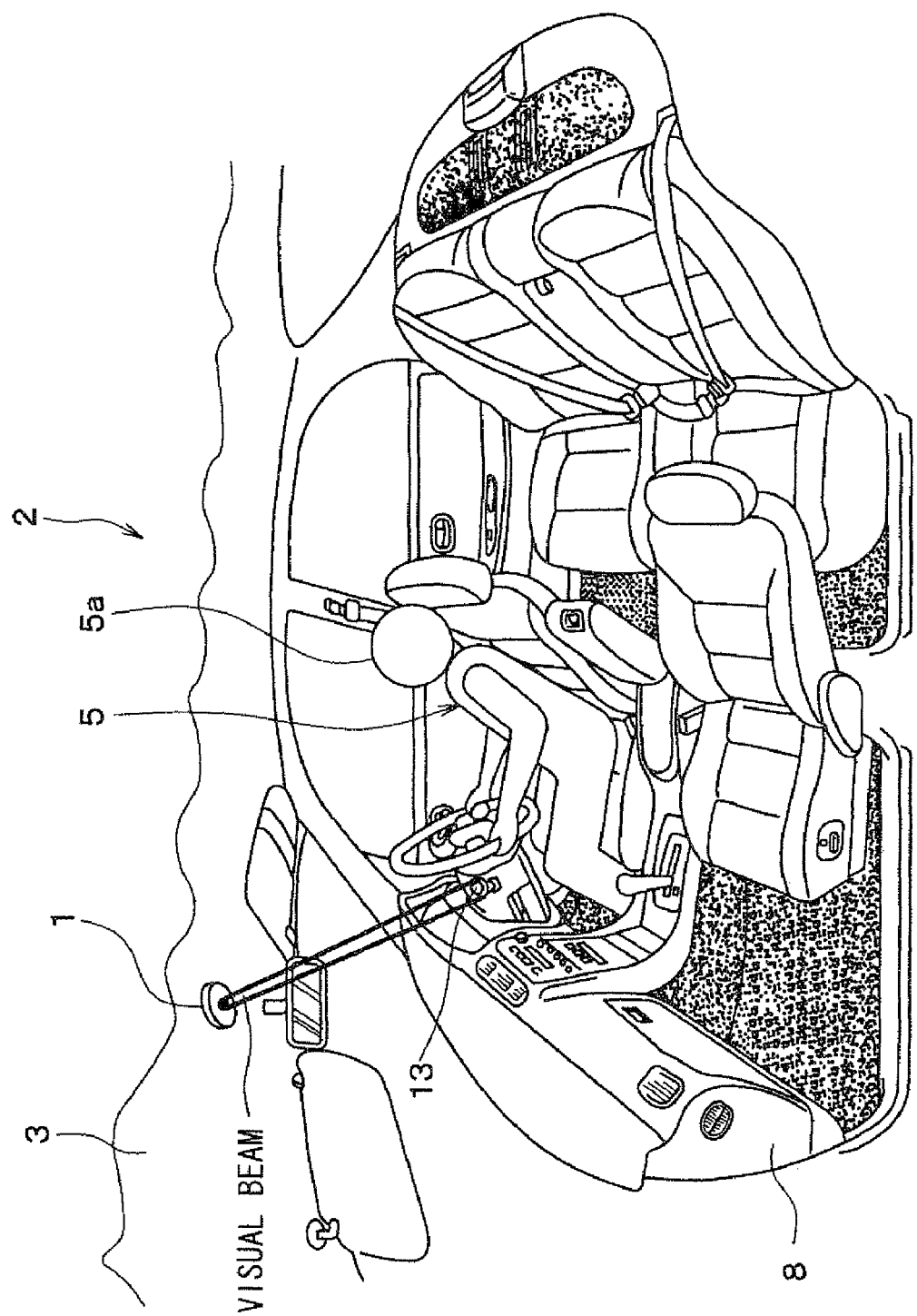
FIG. 7 illustrates an interior when irradiating an operation switch for a headlamp as a target switch.

The irradiation direction indicator 12 outputs an instruction signal indicating the determined irradiation direction to the light direction adjuster 11. The light direction adjuster 11 adjusts the direction of the visual beam irradiated from the visible beam irradiator 6 to irradiate the target switch (Step 230). FIG. 7 shows the inside of the vehicle compartment when irradiating an operation switch 13 for a headlamp as a target switch.

In order to guide an attention of the user 5 to the target switch, it is preferable to irradiate a visual beam to a location in the vehicle compartment where the user 5 can easily recognize the visual beam. From that location, the visual beam may be movingly irradiated so as to finally irradiate the target switch making it possible to guide the user 5 to the target switch to which the user 5 is requested to pay careful attention. The user 5 can be unerringly provided with the information.

Since the visual beam is movingly irradiated, the user 5 can notice the visual beam that moves within a peripheral visual field and is displayed to provide the information. Generally, the human visual cognitive capability is highest at the central visual field and tends to decrease from the central visual field to the peripheral visual field. When recognizing an object included in the peripheral visual field, the human being moves his or her visual line so that the object is included in the central visual field. When a change is made to the object included in the peripheral visual field, the human being obviously tends to unconsciously and promptly react on the change of the object and move the visual line to the object. The user 5 can be made to notice the visual beam that is displayed movingly in the peripheral visual field.

The user 5 can easily confirm that the information is displayed to prompt the user 5 to operate the target switch. The user 5 can unerringly operate the target switch.

When the irradiation instruction frame contains the irradiation stop instruction frame for the target switch (Step 240), the irradiation direction indicator 12 outputs an instruction signal to the light direction adjuster 11. The instruction signal indicates stopping the irradiation to the target switch. The visible beam irradiator 6 stops the irradiation to stop irradiating the target switch (Step 250). The user 5 is assumed to turn off the headlamp when the body ECU 21 confirms the headlamp operation switch 13 is turned off. The body ECU 21 can transmit the irradiation stop instruction frame for the target switch to the irradiation direction indicator 12 so as to terminate the headlamp warning. The target switch operation is confirmed to provide a condition for stopping the irradiation. Under such a condition, the body ECU 21 transmits the irradiation stop instruction frame for the target switch.

The user 5 cannot be assumed to turn off the headlamp when the target switch is not operated even though the visual beam irradiation provides the information. In such a case, the irradiation stop instruction frame for the target switch may be transmitted after a lapse of a predetermined time to stop unnecessarily irradiating the visual beam. Alternatively, the same effect can be provided by transmitting the irradiation stop instruction frame for the target switch by confirming that the user 5 has left the vehicle 2, for example, when the wireless ECU has confirmed that the door has been locked.

As mentioned above, the in-vehicle information display apparatus according to the embodiment irradiates a visual beam to locations in the vehicle compartment based on at least one of the vehicle state information, the vehicle surrounding information, and the vehicle interior information. The in-vehicle information display apparatus can display the information associated with the irradiation location by changing irradiation locations of the visual beam depending on the content of information to be displayed. The in-vehicle information display apparatus can provide the user 5 with information in a novel mode.

For example, the in-vehicle information display apparatus irradiates a visual beam to the target switch based on signals indicating the on/off states of the operation switch 13 for the headlamp and the key switch. The in-vehicle information display apparatus can allow the user 5 to easily confirm the target switch and thereby allow the user 5 to unerringly operate the target switch. Particularly, the in-vehicle information display apparatus first irradiates a visual beam to a location easily recognized by the user 5 in the vehicle compartment, then moves the irradiated visual beam, and finally irradiates the target switch. The in-vehicle information display apparatus can reliably guide an attention of the user 5 to the target switch that needs to be confirmed by the user 5. The information can be unerringly provided for the user 5.

As mentioned above, the light irradiation device 1 is provided in the vehicle compartment and irradiates a visual beam to display the information in the vehicle compartment. The information can be provided for the user 5 in a novel mode. The light irradiation device 1 moves the irradiated visual beam and finally irradiates the target switch. The light irradiation device 1 can reliably guide an attention of the user 5 to the target switch that needs to be confirmed by the user 5. The information can be unerringly provided for the user 5.

The visual beam is directly irradiated on unpredetermined positions in the vehicle compartment. Various types of information can be displayed to the user 5 at proper times without using a special display section for displaying the information.

According to the embodiment, the light irradiation device 1 is provided on the ceiling 3 of the vehicle 2 so as to easily provide the user 5 with information. When the light irradiation device 1 is provided on the ceiling 3, there are few obstacles that may interrupt a straight route from the light irradiation device 1 to the switches on the instrument panel 8.

The light irradiation device 1 can widely irradiate the visual beam. For such a reason, the ceiling 3 of the vehicle 2 is preferable to mount the light irradiation device 1.

(Second Embodiment)

A second embodiment of the invention will be described. As a specific example of the in-vehicle information display apparatus, the present embodiment describes a case of irradiating a visual beam to a location different from the target switch as described in a first embodiment. Similarly to the first embodiment, a second embodiment describes information provision based on the vehicle state information.

Figure 8:
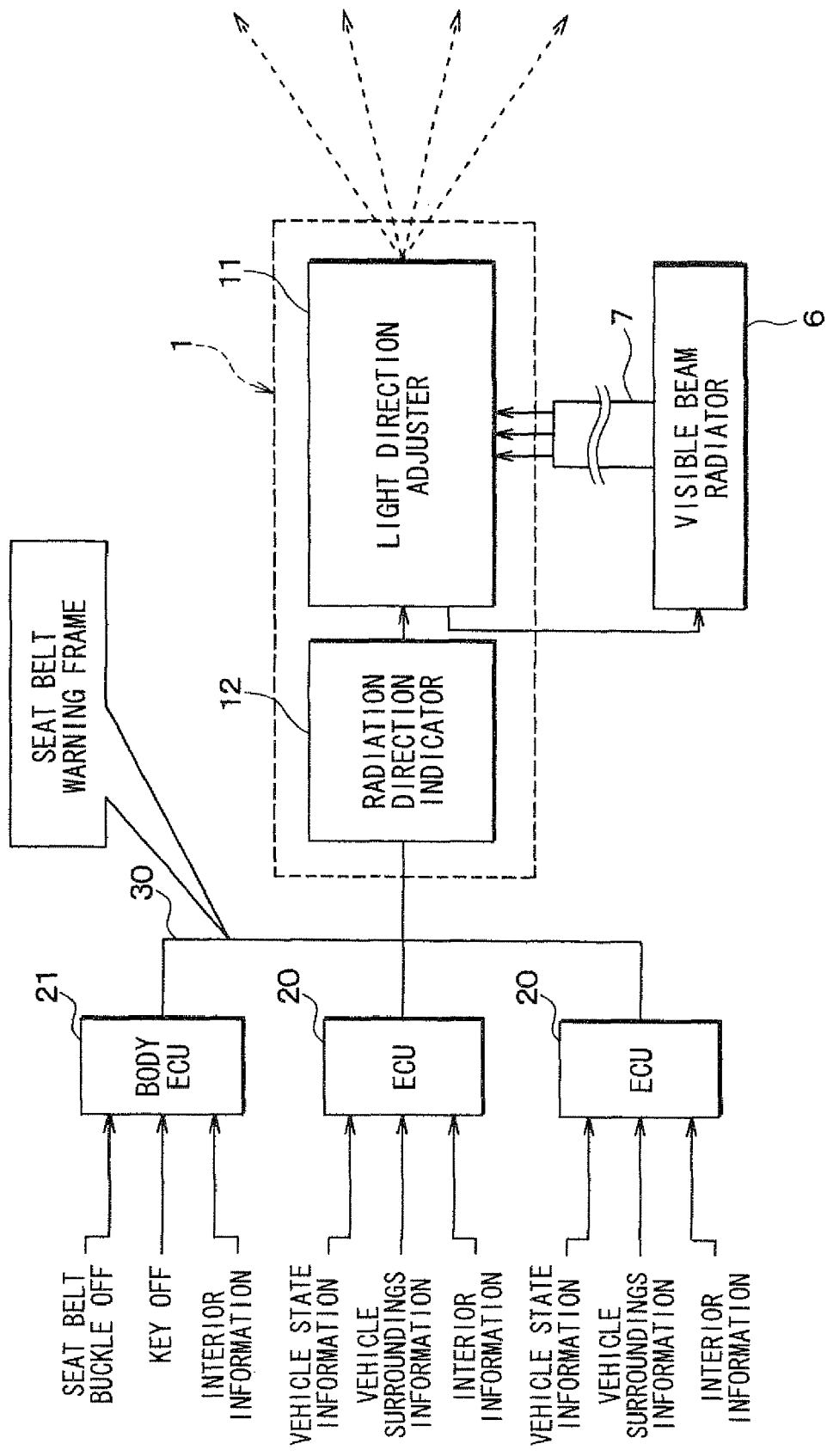
FIG. 8 is a block diagram illustrating an exemplary use of an in-vehicle information display apparatus according to a second embodiment of the invention.
Figure 9:
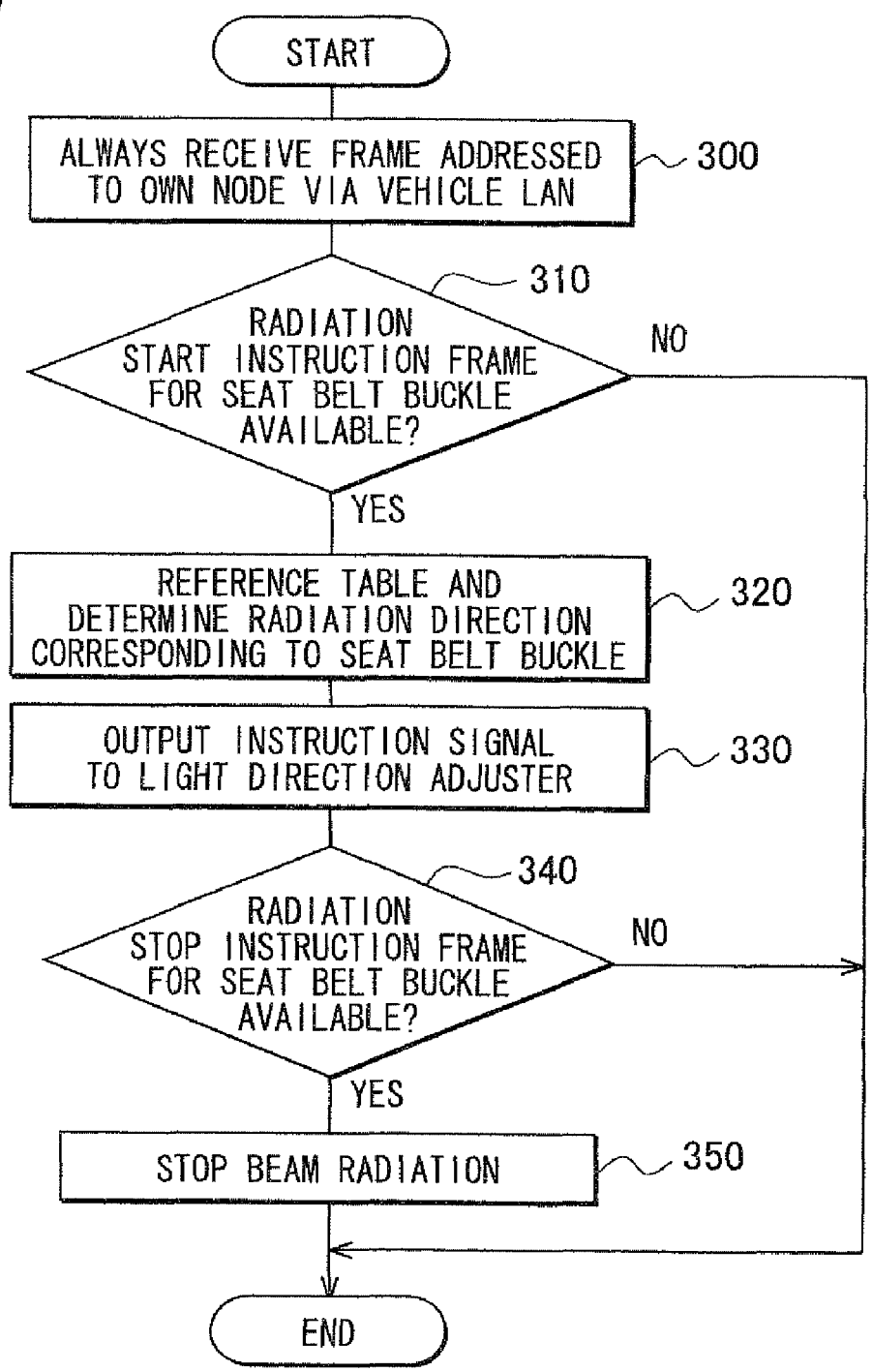
FIG. 9 is a flow chart illustrating an information display process performed by an irradiation direction indicator according to an example in FIG. 8.

FIG. 8 is a block diagram exemplifying the use of the in-vehicle information display apparatus according to a second embodiment. FIG. 9 is a flow chart showing the information display process performed by the irradiation direction indicator 21 according to the present example. With reference to the drawings, the following describes operation examples of the in-vehicle information display apparatus according to the embodiment.

FIG. 8 diagrams an example of using the body ECU 21 as one of the above-mentioned ECUs 20. The body ECU 21 confirms attachment of the seat belt, for example. The following describes how the in-vehicle information display apparatus displays information in the vehicle compartment based on a request from the body ECU 21 or, more specifically, guides the user 5 to wear the seat belt buckle.

The body ECU 21 acquires a signal indicating an on/off state of the seat belt buckle whether the seat belt is fastened or unfastened. The body ECU 21 also acquires a signal indicating an on/off state of the key switch. These signals are used as the vehicle state information. Based on the signals, the body ECU 21 may detect that the seat belt buckle is turned off and the key switch changes from the off to on state. In such a case, the body ECU 21 determines that the user 5 is driving the vehicle with the seat belt buckle turned off, namely, with the seat belt unfastened. The body ECU 21 supplies the irradiation direction indicator 12 with an irradiation instruction frame that activates a seat belt warning. To stop the irradiation, the body ECU 21 supplies the irradiation direction indicator 12 with an irradiation instruction frame that stops the irradiation for the seat belt warning.

When supplied with the irradiation instruction frame, the irradiation direction indicator 12 performs the information display process in FIG. 9. The process receives the irradiation instruction frame associated with the own node (Step 300). The process determines whether the irradiation instruction frame contains the irradiation start instruction frame for the seat belt buckle (Step 310). When the irradiation instruction frame contains the irradiation start instruction frame for the seat belt buckle, the process determines an irradiation direction corresponding to the seat belt buckle by referencing the table (Step 320). As shown in FIG. 6 according to a first embodiment, the table also stores adjustment data in terms of irradiation directions corresponding to the seat belt buckle.

Figure 10:
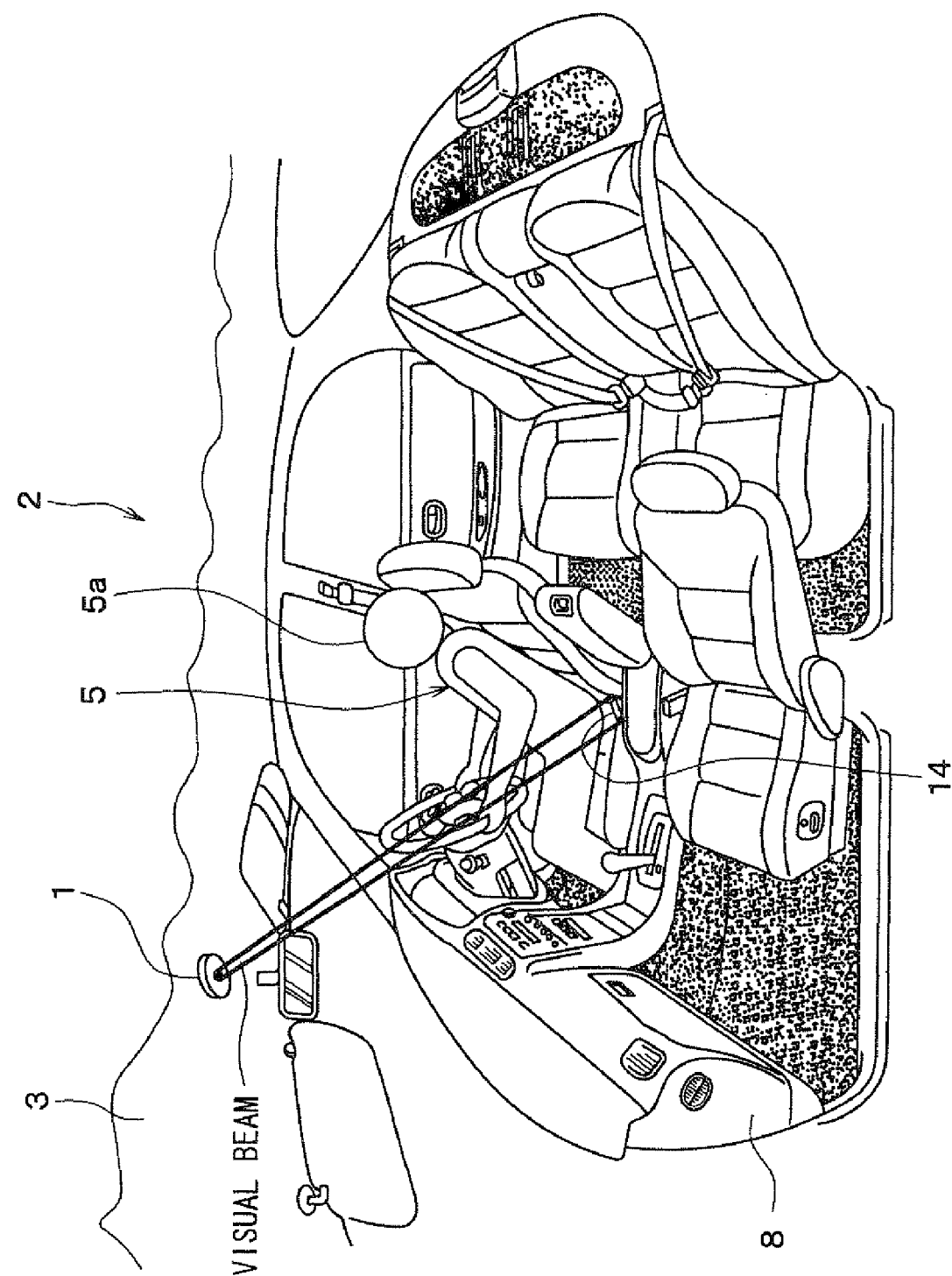
FIG. 10 illustrates an interior when a seat belt buckle is irradiated.

The irradiation direction indicator 12 outputs an instruction signal indicating the determined irradiation direction to the light direction adjuster 11. The light direction adjuster 11 adjusts the direction of the visual beam irradiated from the visible beam irradiator 6. The seat belt buckle is irradiated (Step 330). FIG. 10 shows the interior when a seat belt buckle 14 is irradiated.

In order to guide an attention of the user 5 to the seat belt buckle 14, it is preferable to irradiate a visual beam to a location in the vehicle compartment where the user 5 can easily recognize the visual beam. From that location, the visual beam may be movingly irradiated so as to finally irradiate the seat belt buckle 14 making it possible to guide the user 5 to the seat belt buckle 14 to which the user 5 is requested to pay careful attention. The user 5 can be unerringly provided with the information.

The user can easily confirm that the information is displayed to prompt the user 5 to operate the seat belt buckle 14. The user 5 can unerringly operate the seat belt buckle 14.

The irradiation instruction frame may contain the irradiation stop instruction frame for the seat belt buckle 14 (Step 340). The irradiation direction indicator 12 outputs an instruction signal to the light direction adjuster 11 so as to stop the irradiation to the seat belt buckle 14. The visible beam irradiator 6 stops the irradiation to the seat belt buckle 14 (Step 350). For example, the body ECU 21 may determine that the user 5 fastens the seat belt buckle 14 when confirming that the seat belt buckle 14 turns on. The body ECU 21 can supply the irradiation direction indicator 12 with the irradiation stop instruction frame for the seat belt buckle 14 so as to terminate the seat belt warning. The operation to fasten the seat belt buckle 14 is confirmed to provide a condition for stopping the irradiation. Under this condition, the body ECU 21 transmits the irradiation stop instruction frame for the seat belt.

The seat belt may remain unfastened even when the visual beam is irradiated so as to provide the information. It is impossible to determine that the user 5 fastens the seat belt buckle 14. In such a case, the irradiation stop instruction frame for the seat belt may be transmitted after lapse of a predetermined time to stop unnecessarily irradiating the visual beam.

The in-vehicle information display apparatus according to the embodiment irradiates a visual beam to the seat belt buckle 14 based on signals indicating the on/off states of the seat belt buckle 14 and the key switch. The in-vehicle information display apparatus can allow the user 5 to easily confirm that the seat belt needs to be fastened. The user 5 can fasten the seat belt. Particularly, the in-vehicle information display apparatus first irradiates a visual beam to a location easily recognized by the user 5 in the vehicle compartment, then moves the irradiated visual beam, and finally irradiates the seat belt buckle 14. The in-vehicle information display apparatus can reliably guide an attention of the user 5 to the seat belt buckle 14 that needs to be confirmed by the user 5. The information can be unerringly provided for the user 5.

(Third Embodiment)

A third embodiment of the invention will be described. As an example of the in-vehicle information display apparatus, the embodiment describes a case of irradiating a visual beam to a target switch that is described in the first embodiment and differs from the operation switch 13 for the headlamp. Similarly to the first embodiment, the third embodiment describes information provision based on the vehicle state information.

Figure 11:
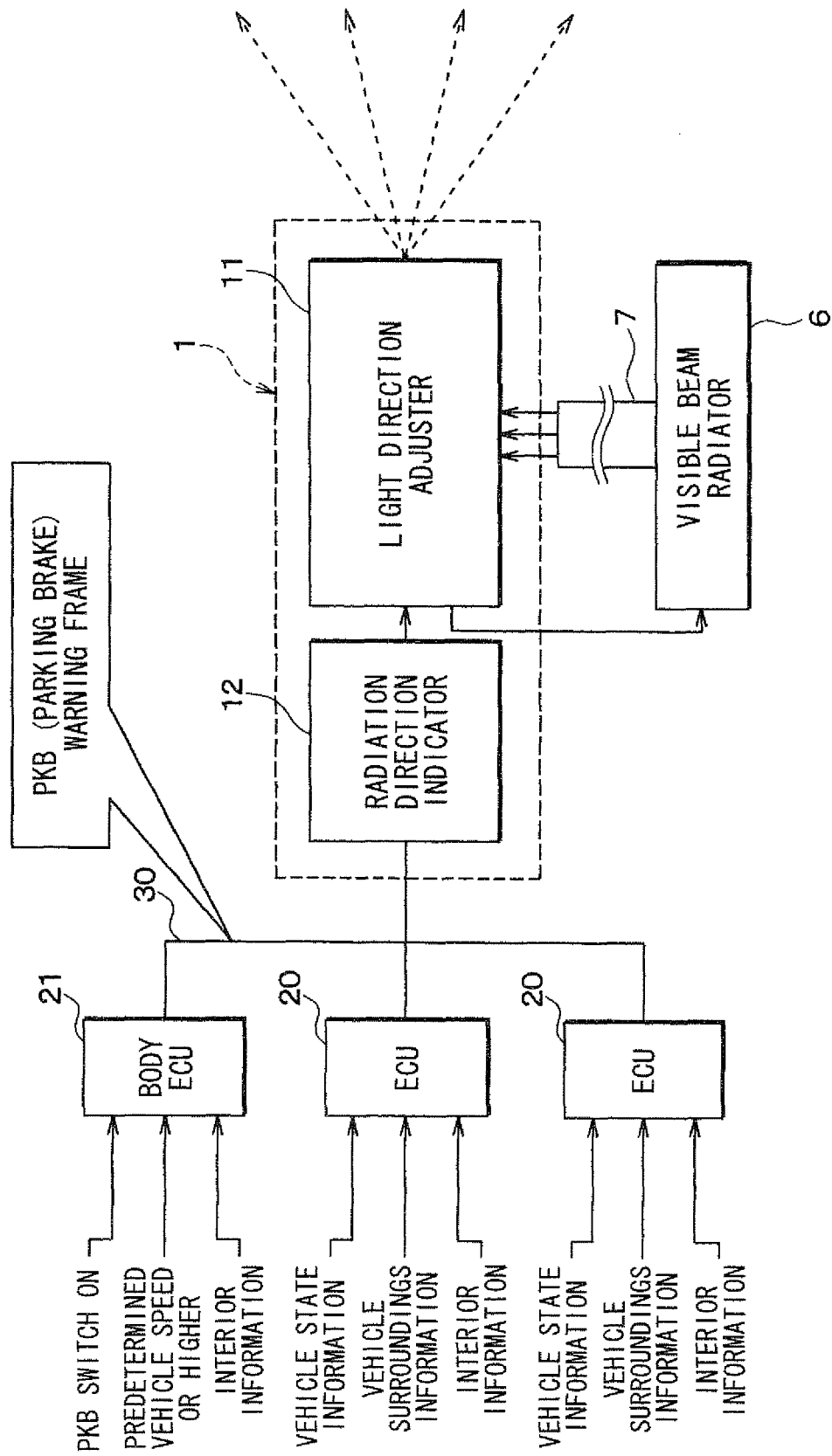
FIG. 11 is a block diagram illustrating an exemplary use of an in-vehicle information display apparatus according to a third embodiment of the invention.
Figure 12:
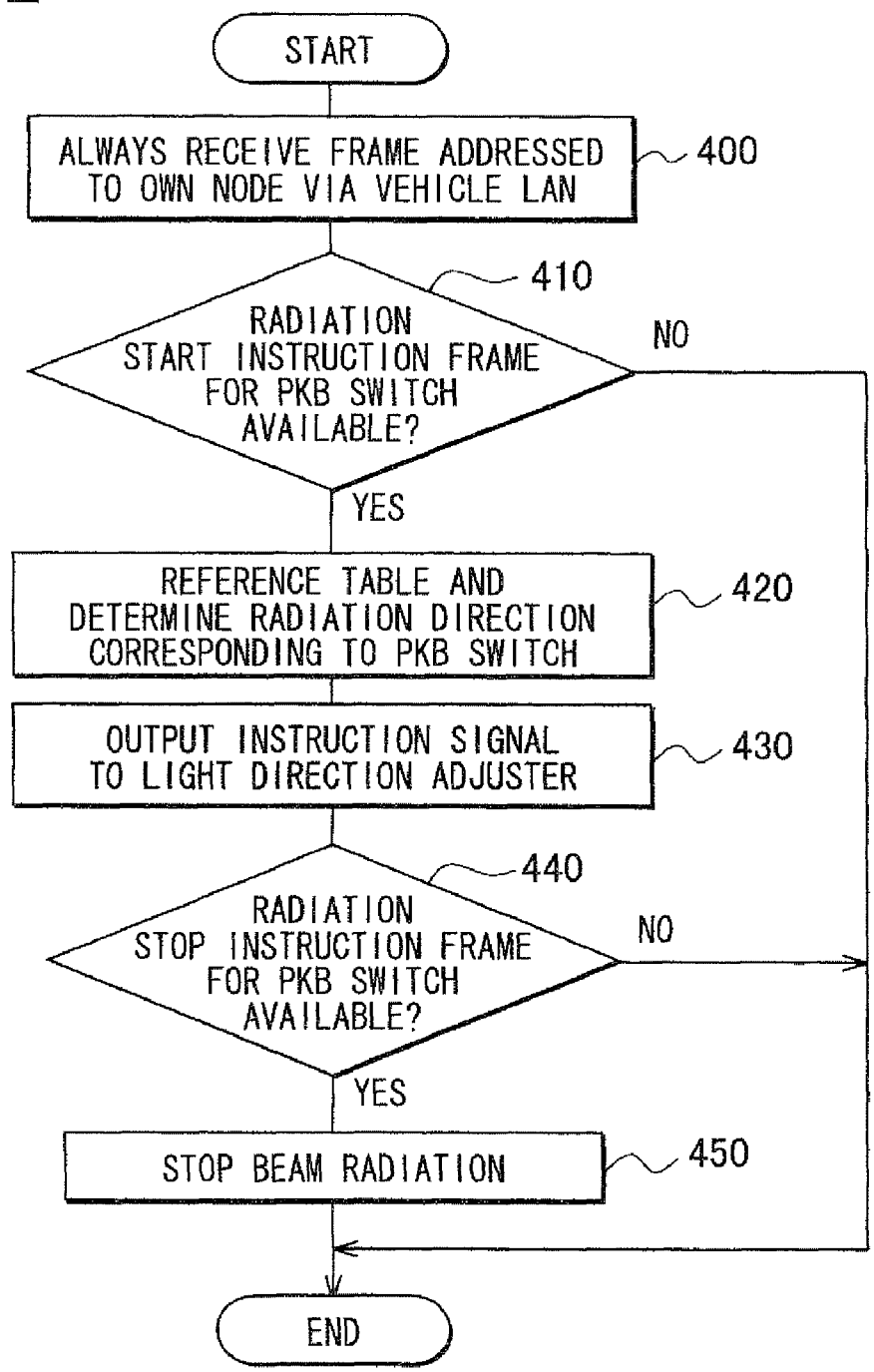
FIG. 12 is a flow chart illustrating an information display process performed by an irradiation direction indicator according to an example in FIG. 11.

FIG. 11 is a block diagram exemplifying the use of the in-vehicle information display apparatus according to the third embodiment. FIG. 12 is a flow chart showing the information display process performed by the irradiation direction indicator 21 according to the example. With reference to these drawings, the following describes operation examples of the in-vehicle information display apparatus according to the embodiment.

FIG. 11 shows an example of the body ECU 21 as one of the above-mentioned ECUs 20. The body ECU 21 confirms release of a parking brake (hereafter referred to as a PKB). The following describes displaying information in the vehicle compartment based on a request from the body ECU 21 so as to guide the user 5 in releasing the PKB.

Specifically, the body ECU 21 acquires a signal that indicates the on/off state of the PKB switch and is used for operating the PKB. The body ECU 21 also acquires vehicle speed data. For example, a brake ECU (not shown) computes a vehicle speed based on signals detected from a wheel speed sensor and a vehicle speed sensor. A computation result is delivered to the vehicle LAN 30 and is transmitted to the body ECU 21 to acquire the vehicle speed data. The signal indicating the on/off state of the PKB and the vehicle speed data are used as the vehicle state information. Based on these signals, the body ECU 21 may detect that the PKB is operated and the vehicle speed exceeds a specified value. In such case, the body ECU 21 determines that the user 5 is going to drive the vehicle with the PKB operated. The body ECU 21 provides a PKB warning by supplying the irradiation direction indicator 12 with an irradiation instruction frame for irradiating the PKB switch. To stop the irradiation, the body ECU 21 supplies the irradiation direction indicator 12 with an irradiation instruction frame for stopping irradiating the PKB warning.

When supplied with the irradiation instruction frame, the irradiation direction indicator 12 performs the information display process as shown in FIG. 12. The process receives the irradiation instruction frame associated with the own node (Step 400). The process determines whether the irradiation instruction frame contains the irradiation start instruction frame for the PKB switch (Step 410). When the irradiation instruction frame contains the irradiation start instruction frame for the PKB switch, the process determines an irradiation direction corresponding to the PKB switch by referencing the table (Step 420). As shown in FIG. 6 according to the first embodiment, the table also stores adjustment data in terms of irradiation directions corresponding to the PKB switch.

Figure 13:
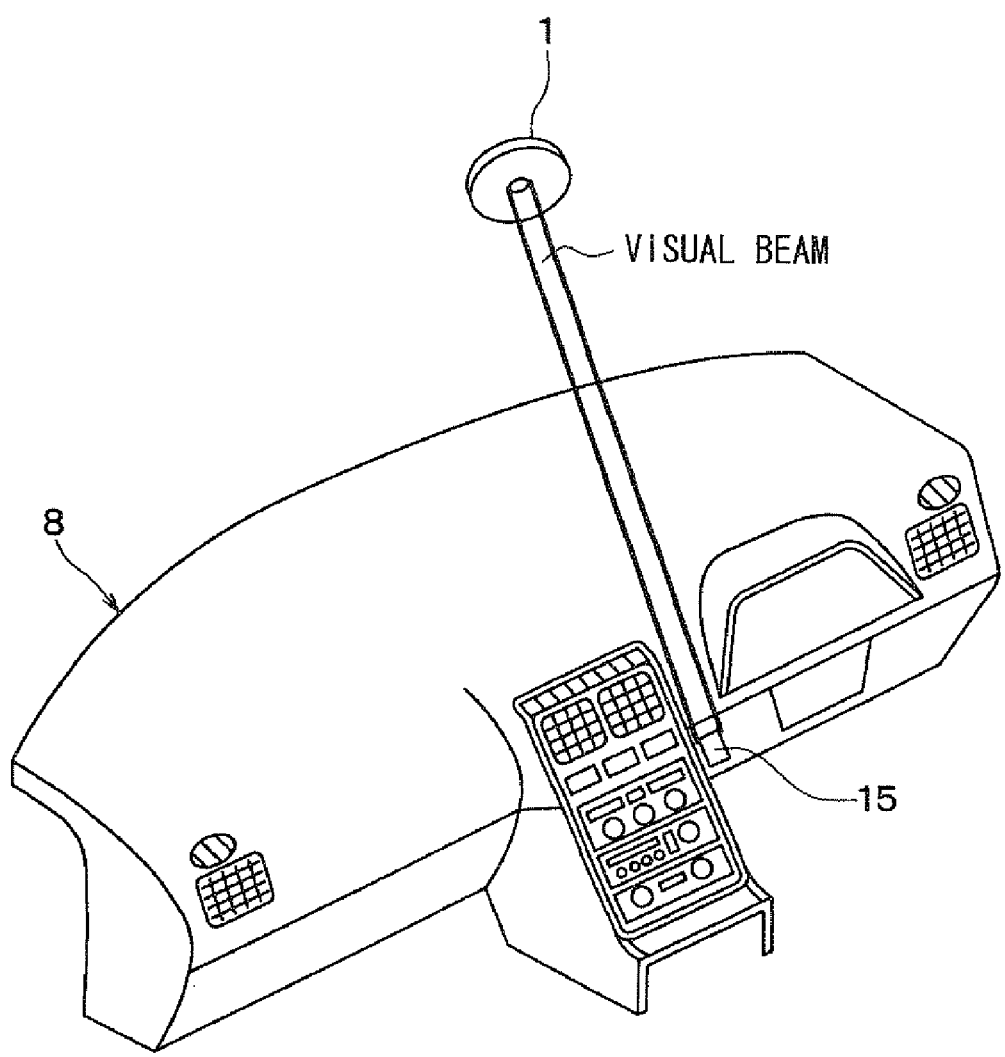
FIG. 13 illustrates an interior when a parking brake switch is irradiated.

The irradiation direction indicator 12 outputs an instruction signal indicating the determined irradiation direction to the light direction adjuster 11. The light direction adjuster 11 adjusts the direction of the visual beam irradiated from the visible beam irradiator 6. The PKB switch is irradiated (Step 430). FIG. 13 schematically shows the inside of the vehicle compartment when a PKB switch 15 is irradiated.

In order to guide an attention of the user 5 to the PKB switch 15, it is preferable to irradiate a visual beam to a location in the vehicle compartment where the user 5 can easily recognize the visual beam. From that location, the visual beam may be movingly irradiated so as to finally irradiate the PKB switch 15 making it possible to guide the user 5 to the PKB switch 15 to which the user 5 is requested to pay careful attention. The user 5 can be unerringly provided with the information.

The user 5 can easily confirm that the information is displayed to prompt the user 5 to operate the PKB switch 15 to release the PKB. The user 5 can unerringly operate the PKB switch 15.

The irradiation instruction frame may contain the irradiation stop instruction frame for the PKB switch (Step 440). The irradiation direction indicator 12 outputs an instruction signal to the light direction adjuster 11 so as to stop the irradiation to the PKB switch 15. The visible beam irradiator 6 stops the irradiation to the PKB switch 15 (Step 450). For example, the body ECU 21 may determine that the user 5 releases the PKB when confirming that the PKB switch 15 turns off. The body ECU 21 can supply the irradiation direction indicator 12 with the irradiation stop instruction frame for the PKB switch 15 so as to terminate the PKB warning. The operation to release the PKB is confirmed to provide a condition for stopping the irradiation. Under this condition, the body ECU 21 transmits the irradiation stop instruction frame for the PKB switch.

The PKB switch 15 may not turn off even when the visual beam is irradiated so as to provide the information. It is impossible to determine that the user 5 releases the PKB. In such a case, the irradiation stop instruction frame for the PKB switch may be transmitted after lapse of a predetermined time to stop unnecessarily irradiating the visual beam. Alternatively, the same effect can be provided by transmitting the irradiation stop instruction frame for the PKB switch when confirming that the user 5 leaves the vehicle 2, for example, the wireless ECU confirms a door lock state.

The in-vehicle information display apparatus according to the embodiment irradiates a visual beam to the PKB switch 15 based on the signal indicating the on/off state of the PKB 15 and the vehicle speed data. The in-vehicle information display apparatus can allow the user 5 to easily confirm whether to release the PKB. The user 5 can unerringly operate the PKB switch 15. Particularly, the in-vehicle information display apparatus first irradiates a visual beam to a location easily recognized by the user 5 in the vehicle compartment, then moves the irradiated visual beam, and finally irradiates the PKB switch 15. The in-vehicle information display apparatus can reliably guide an attention of the user 5 to the PKB switch 15 that needs to be confirmed by the user 5. The information can be unerringly provided for the user 5.

(Fourth Embodiment)

A fourth embodiment of the invention will be described. As a specific example of the in-vehicle information display apparatus, the embodiment also describes a case of irradiating a visual beam to a location different from the target switch as described in the first embodiment. Similarly to the first embodiment, the fourth embodiment describes information provision based on the vehicle state information.

Figure 14:
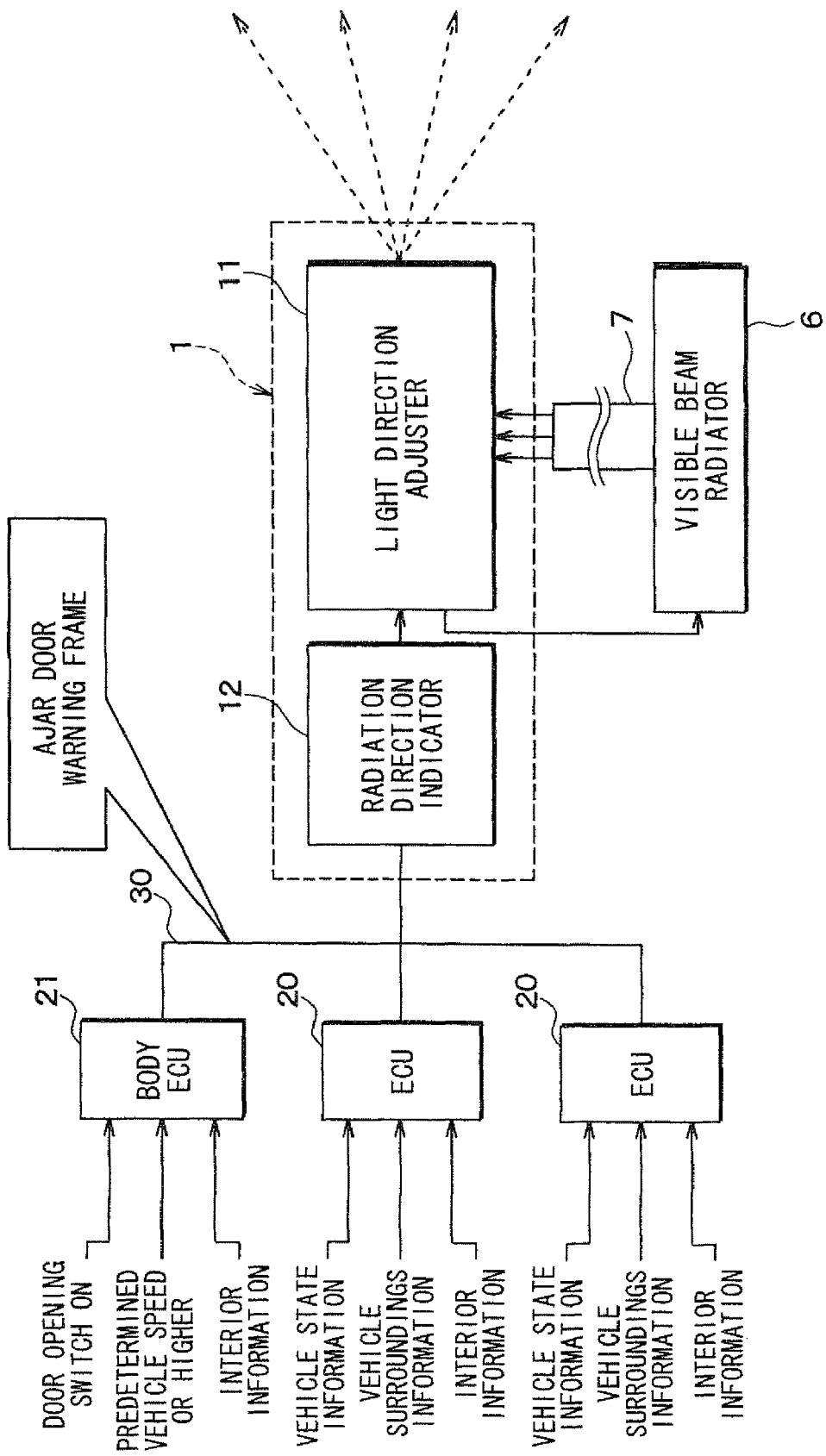
FIG. 14 is a block diagram illustrating an exemplary use of an in-vehicle information display apparatus according to a fourth embodiment of the invention.
Figure 15:
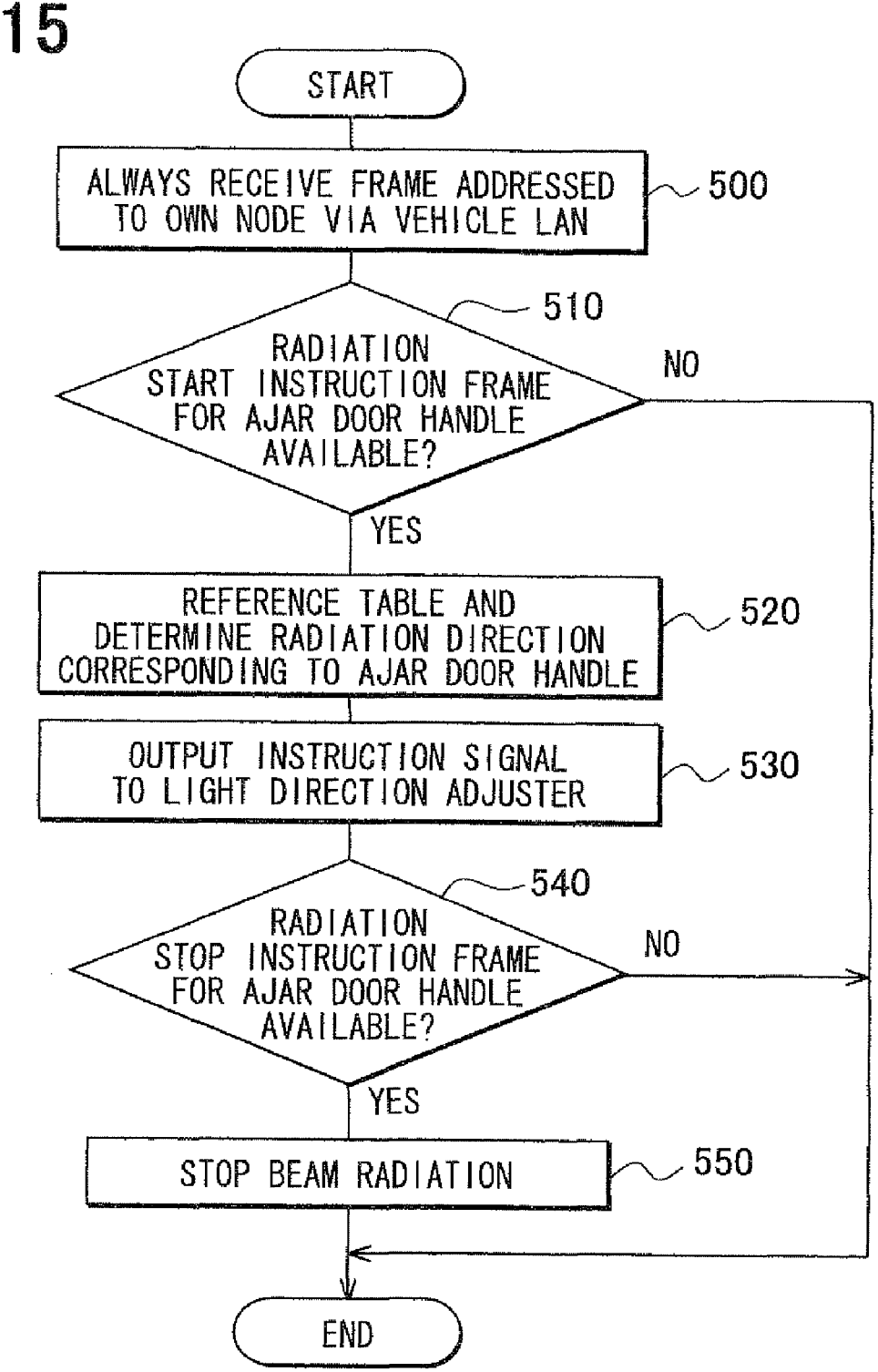
FIG. 15 is a flow chart illustrating an information display process performed by an irradiation direction indicator according to an example in FIG. 14.

FIG. 14 is a block diagram exemplifying the use of the in-vehicle information display apparatus according to the fourth embodiment. FIG. 15 is a flow chart showing the information display process performed by the irradiation direction indicator 21 according to the present example. With reference to these drawings, the following describes operation examples of the in-vehicle information display apparatus according to the embodiment.

FIG. 14 is a diagram of an example of using the body ECU 21 as one of the above-mentioned ECUs 20. The body ECU 21 confirms opening and closing of a door. The following describes how the in-vehicle information display apparatus displays information in the vehicle compartment based on a request from the body ECU 21 or, more specifically, guides the user 5 to operate an ajar door handle.

The body ECU 21 acquires a signal indicating an on/off state of a door switch that notifies door opening/closing. The body ECU 21 also acquires vehicle speed data. These signal and data are used as the vehicle state information. Based on the signals, the body ECU 21 may detect that the door switch turns on and the vehicle speed exceeds a specified value. In such a case, the body ECU 21 determines that the user 5 is driving the vehicle with the door opened. To warn the user 5 against the ajar door, the body ECU 21 supplies the irradiation direction indicator 12 with an irradiation instruction frame that instructs irradiation of an ajar door handle, namely, a handle for the ajar door. To stop the irradiation, the body ECU 21 supplies the irradiation direction indicator 12 with an irradiation instruction frame that stops the irradiation for the door ajar warning.

When the irradiation instruction frame is transmitted, the irradiation direction indicator 12 performs the information display process as shown in FIG. 15. The process receives the irradiation instruction frame attached with the own node (Step 500). The process determines whether the irradiation instruction frame contains the irradiation start instruction frame for the ajar door handle (Step 510). When the irradiation instruction frame contains the irradiation start instruction frame for the ajar door handle, the process determines an irradiation direction corresponding to the ajar door handle by referencing the table (Step 520). As shown in FIG. 6 according to the first embodiment, the table also stores adjustment data in terms of irradiation directions corresponding to the ajar door handle.

Figure 16:
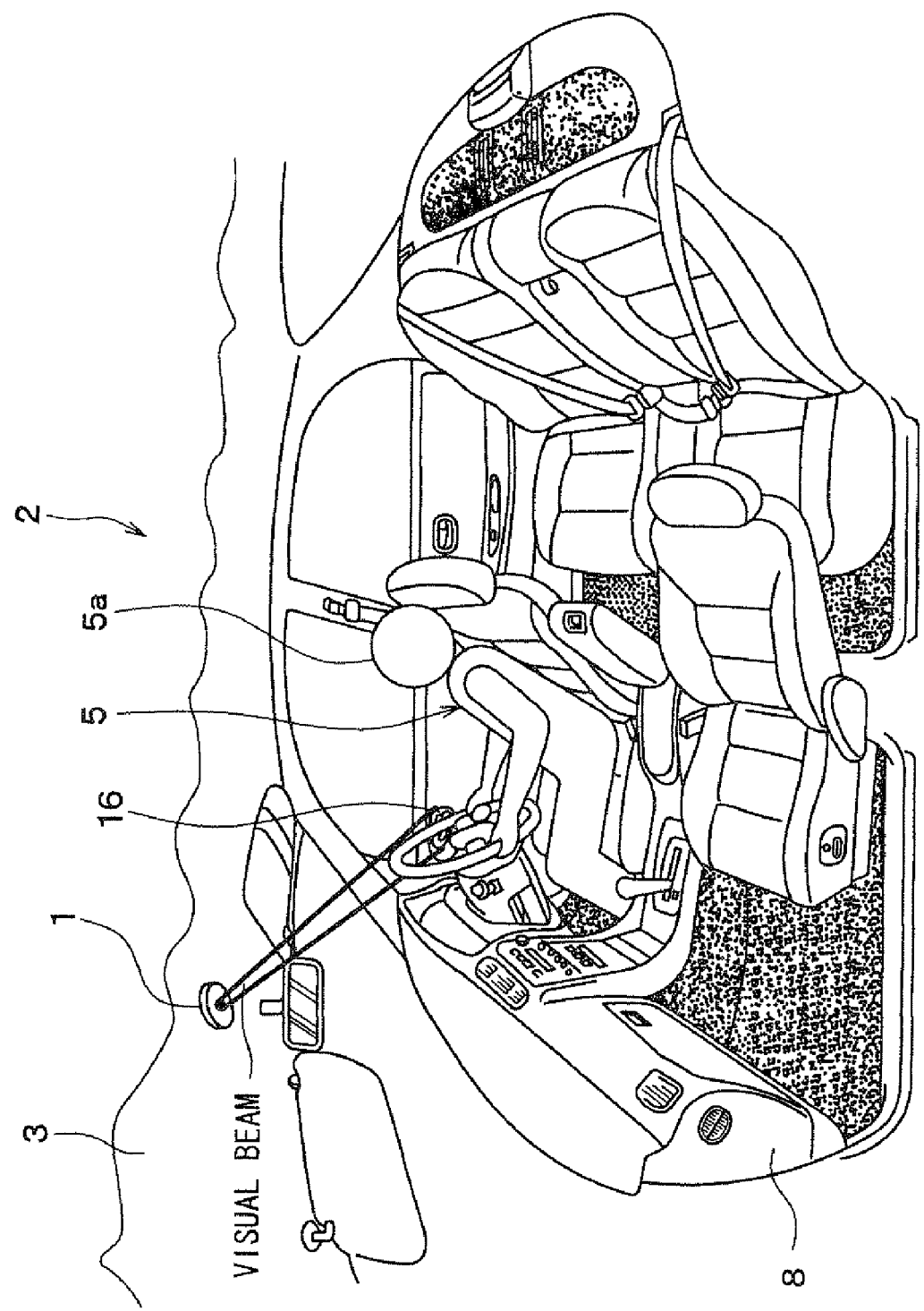
FIG. 16 illustrates an interior when a half-shut door handle is irradiated.

An instruction signal indicating the determined irradiation direction is output to the light direction adjuster 11. The light direction adjuster 11 adjusts the direction of the visual beam irradiated from the visible beam irradiator 6 to irradiate the ajar door handle (Step 530). FIG. 16 shows the inside of the vehicle compartment the interior when irradiating a door handle 16 corresponding to an ajar door near the driver seat.

In order to guide an attention of the user 5 to the ajar door handle, it is preferable to irradiate a visual beam to a location in the vehicle compartment where the user 5 can easily recognize the visual beam. From the recognized location, the visual beam may be movingly irradiated so as to finally irradiate the ajar door handle making it possible to guide the user 5 to the ajar door handle to which the user 5 is requested to pay careful attention. The user 5 can be unerringly provided with the information.

The user 5 can easily confirm that the information is displayed to prompt the user 5 to operate the ajar door handle due to an door ajar warning. The user 5 can unerringly operate the ajar door handle.

The irradiation instruction frame may contain the irradiation stop instruction frame for the ajar door handle (Step 540). The irradiation direction indicator 12 outputs an instruction signal to the light direction adjuster 11 so as to stop the irradiation to the ajar door handle. The visible beam irradiator 6 stops the irradiation to the ajar door handle (Step 550). For example, the body ECU 21 may determine that the user 5 closes the ajar door handle when confirming that the ajar door handle is locked. The body ECU 21 can supply the irradiation direction indicator 12 with the irradiation stop instruction frame for the ajar door handle so as to terminate the door ajar warning. The operation to close the ajar door handle is confirmed to provide a condition for stopping the irradiation. Under such a condition, the body ECU 21 transmits the irradiation stop instruction frame for the ajar door handle.

The ajar door handle may not be locked even when the visual beam is irradiated so as to provide the information. In such a case, the irradiation stop instruction frame for the ajar door handle may be transmitted after lapse of a predetermined time to stop unnecessarily irradiating the visual beam. Alternatively, the same effect can be provided by transmitting the irradiation stop instruction frame for the ajar door handle when confirming that the user 5 leaves the vehicle 2, for example, the wireless ECU confirms a door lock state.

The in-vehicle information display apparatus according to the embodiment irradiates a visual beam to the ajar door handle based on the signal indicating the on/off state of the door switch and the vehicle speed data. The in-vehicle information display apparatus can allow the user 5 to easily confirm the door ajar warning. The user 5 can unerringly operate the ajar door handle.

(Fifth Embodiment)

A fifth embodiment of the invention will be described. The embodiment describes the information provision based on vehicle interior information in addition to the vehicle state information. As a specific example of the in-vehicle information display apparatus, the embodiment describes the information provision by irradiating a visual beam to a location the user 5 can easily visually recognize.

Figure 17:
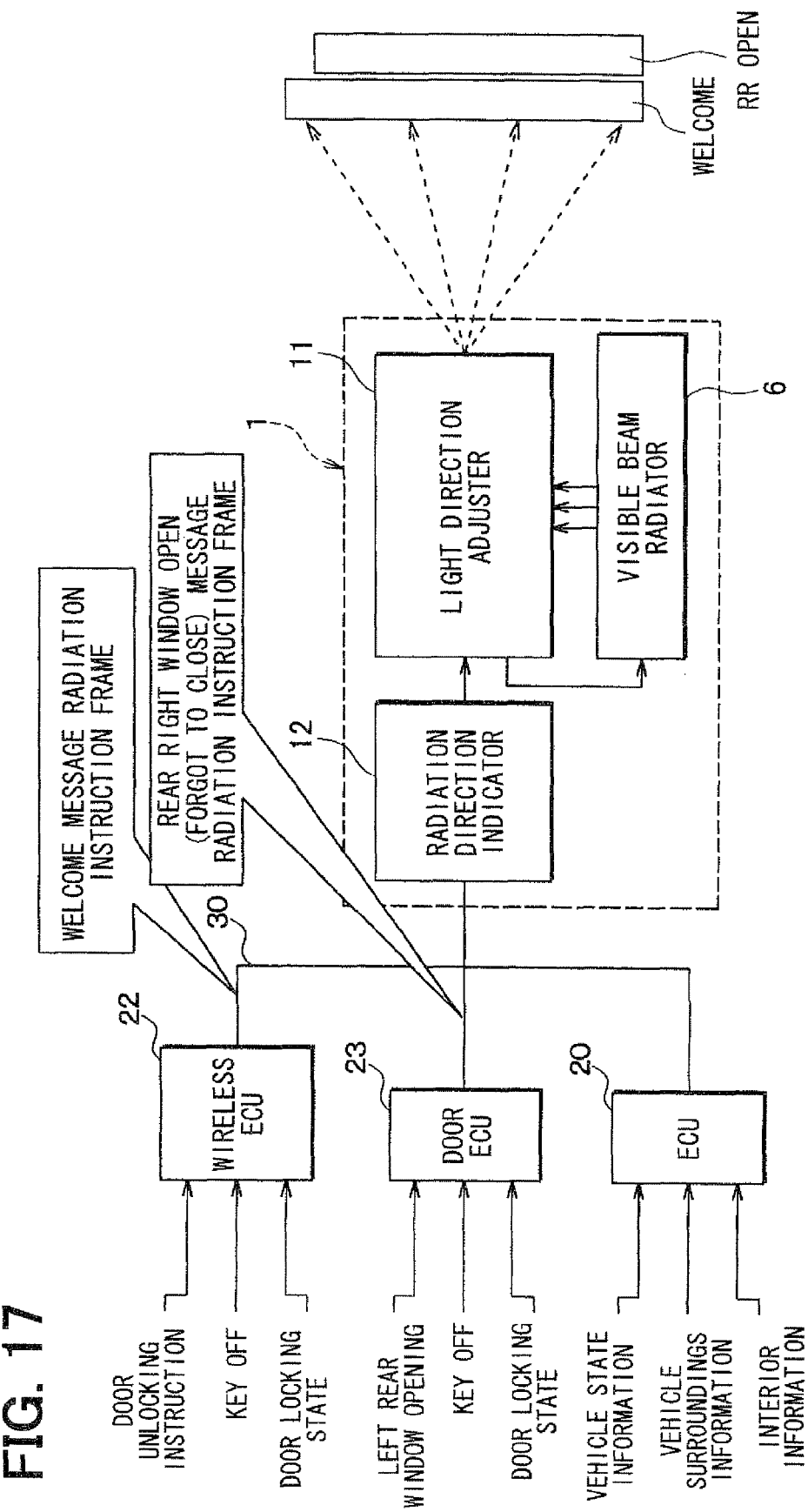
FIG. 17 is a block diagram illustrating an exemplary use of an in-vehicle information display apparatus according to a fifth embodiment of the invention.
Figure 18:
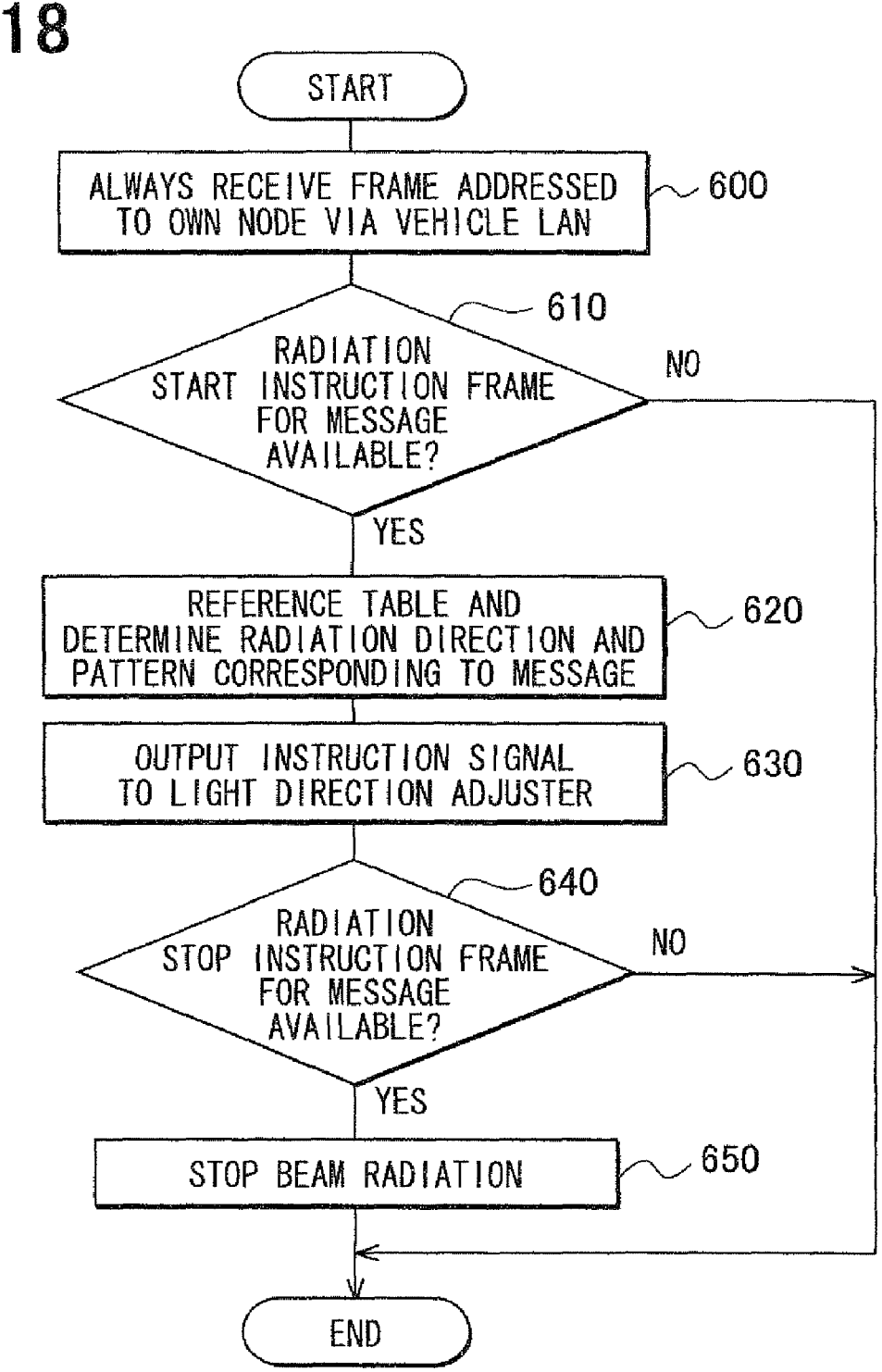
FIG. 18 is a flow chart illustrating an information display process performed by an irradiation direction indicator according to the example in FIG. 17.

FIG. 17 is a block diagram exemplifying the use of the in-vehicle information display apparatus according to the fifth embodiment. FIG. 18 is a flow chart showing the information display process performed by the irradiation direction indicator 21 according to the example. With reference to these drawings, the following describes operation examples of the in-vehicle information display apparatus according to the embodiment.

As shown in FIG. 17, a wireless ECU 22 and a door ECU 23 are used as examples of the above-mentioned ECUs 20. The wireless ECU 22 controls door locking/unlocking states using a wireless key (remote key). The door ECU 23 recognizes and controls open/close states of a door and a window. The information is displayed in the vehicle compartment based on requests from the wireless ECU 22 and the door ECU 23 as follows.

Specifically, the wireless ECU 22 receives an instruction signal wirelessly transmitted from a wireless key for locking or unlocking the door. The wireless ECU 22 acquires a signal indicating the on/off state of the key switch. The wireless ECU 22 also acquires a signal indicating the lock/unlock state of the door. The signals are used as the vehicle compartment information.

Based on the signals, the wireless ECU 22 may detect that the key switch is off and the door is locked when the wireless key supplies a door unlock instruction signal. In such a case, the wireless ECU 22 determines (presumes) that the user 5 is going to get into the vehicle 2 or that no occupant exists in the vehicle compartment. The wireless ECU 22 supplies the irradiation direction indicator 12 with a message irradiation start instruction frame for displaying a message "Welcome." The message irradiation may stop after lapse of a predetermined time from the time the message irradiation start instruction frame is transmitted, for example. In such case, the wireless ECU 22 supplies the irradiation direction indicator 12 with a message irradiation stop instruction frame for stopping the message irradiation.

The door ECU 23 acquires signals indicating the open/close state of a window, the on/off state of the key switch, and the lock/unlock state of a door. The signals are used as the vehicle interior information and the vehicle state information. Based on the signals, for example, the door ECU 23 may detect that the window for the left rear door is opened, the key switch is off, and the door is locked. In such a case, the door ECU 23 determines that the user 5 is going to leave the vehicle 2 without closing the left rear window. The door ECU 23 supplies the irradiation direction indicator 12 with the message irradiation start instruction frame for displaying message "RR Open" signifying that the left rear window is opened.

The message irradiation may stop after lapse of a predetermined time from the time the message irradiation start instruction frame is transmitted, for example. In such case, the door ECU 23 supplies the irradiation direction indicator 12 with a message irradiation stop instruction frame for stopping the message irradiation.

When the irradiation instruction frame is transmitted, the irradiation direction indicator 12 performs the information display process as shown in FIG. 18. The process receives the irradiation instruction frame attached with the own node (Step 600). The process determines whether the irradiation instruction frame contains the message irradiation start instruction frame (Step 610). When the irradiation instruction frame contains the message irradiation start instruction frame, the process determines an irradiation direction of the visual beam for displaying the message "Welcome" or "RR Open" by referencing the table (Step 620). As shown in FIG. 6 according to the first embodiment, the table also stores adjustment data in terms of irradiation directions corresponding to the displayed message.

Figure 19:
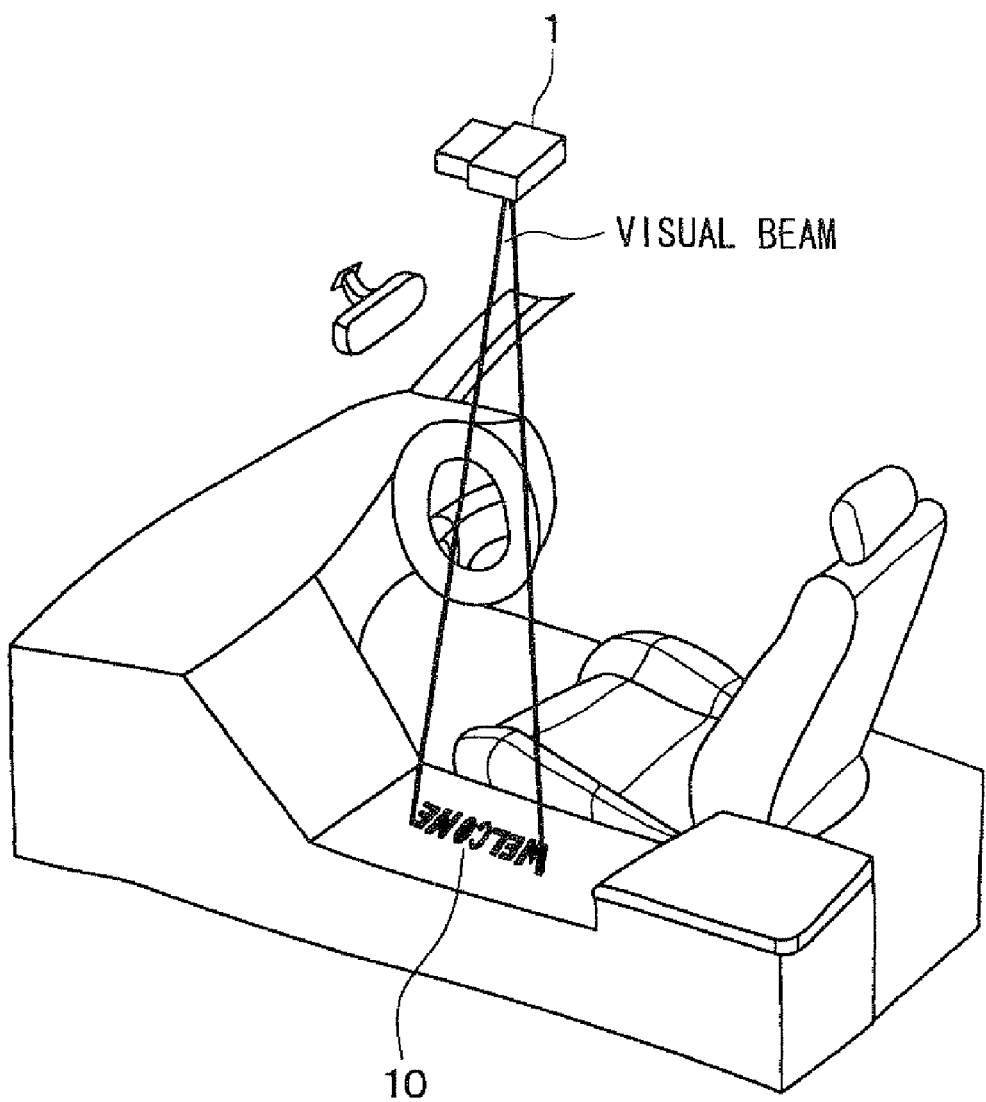
FIG. 19 illustrates an interior when a center console displays a "Welcome" message.

An instruction signal indicating the determined irradiation direction is output to the light direction adjuster 11. The light direction adjuster 11 adjusts the direction of the visual beam irradiated from the visible beam irradiator 6 to irradiate the message (Step 630). FIG. 19 shows the inside of the vehicle compartment the interior when irradiating the message "Welcome" to the center console 10.

Figure 20:
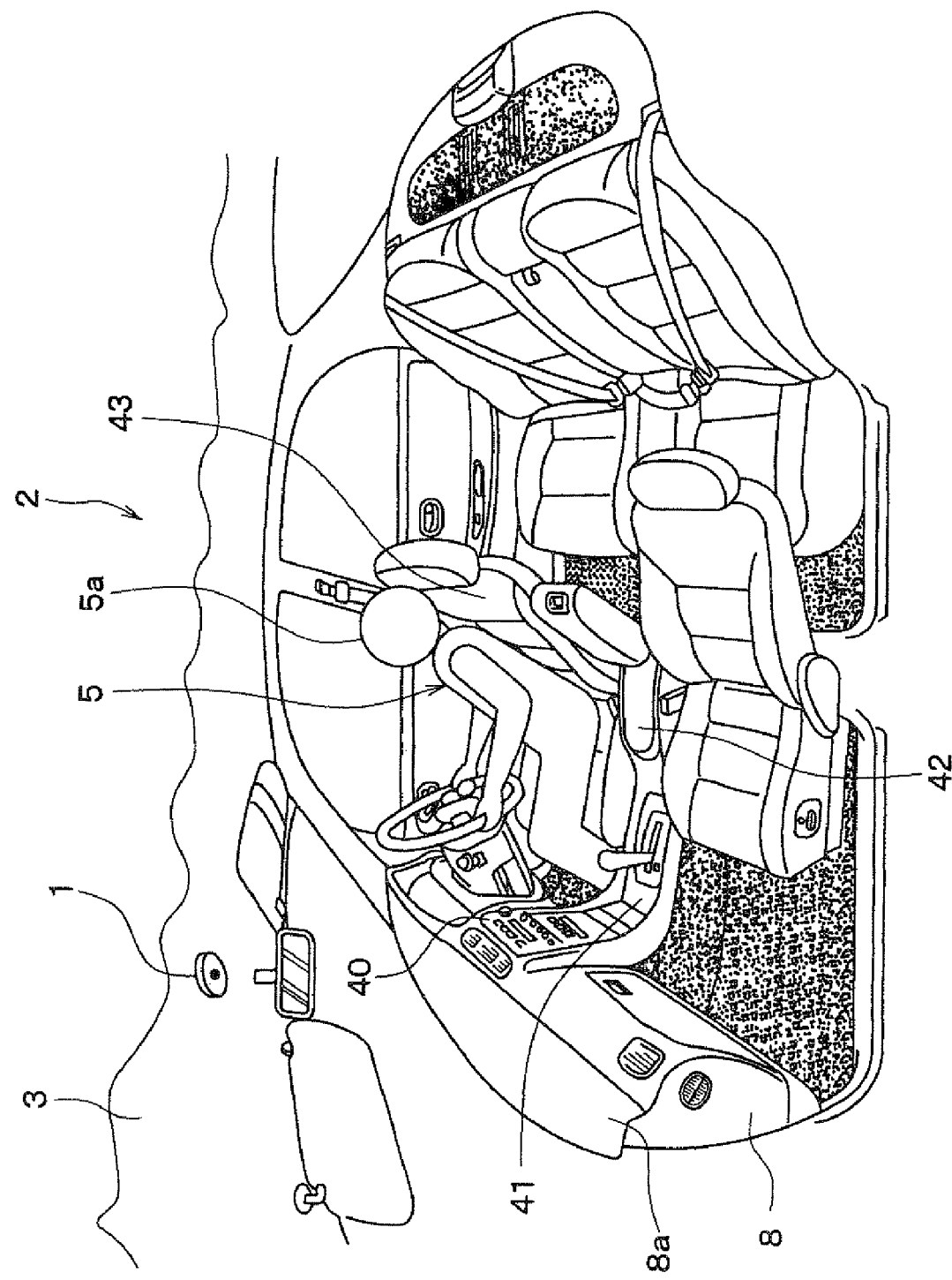
FIG. 20 illustrates an interior where a message is to be displayed.

The message "Welcome" or "RR Open" may be displayed on any position the user 5 can easily recognize. As schematically shown in FIG. 20 illustrating the inside of the vehicle compartment, for example, the message may be displayed on a top surface 8a of the instrument panel, an operation panel 40, a drive position lever 41, a console box 42, or a driver seat 43. The visual beam may be irradiated at a constant intensity. More preferably, the visual beam may be irradiated at varying intensities depending on diffuse reflectances of the materials. For example, let us suppose that the top surface 8a of the instrument panel, the operation panel 40, the drive position lever 41, and the console box 42 are made of black resin, metallic panel, wood-effect panel, and interior fabric, respectively. The diffuse reflectance is increased in the order of the operation panel 40, the dive position lever 41, the console box 42, and the top surface 8a of the instrument panel. When the intension of irradiating the visual beam is decreased for a high diffuse reflectance, variations in intensities of the reflected visual beams can be suppressed. The diffuse reflectance for each location may be previously stored as the vehicle interior information.

When getting into the vehicle, the user 5 can easily confirm the message "Welcome" or "RR Open" displayed by the irradiation of the visual beam.

The irradiation instruction frame may contain the message irradiation stop instruction frame (Step 640). The irradiation direction indicator 12 outputs an instruction signal to the light direction adjuster 11 so as to stop the message irradiation. The visible beam irradiator 6 stops the irradiation so that the message irradiation stops (Step 650). To stop unnecessarily irradiating the visual beam, for example, the message irradiation stop instruction frame may be transmitted after lapse of a predetermined time from the time to start irradiating the message.

The in-vehicle information display apparatus according to the embodiment can display the message such as "Welcome" based on the door lock/unlock signal supplied from the wireless key. The in-vehicle information display apparatus can display the message such as "RR Open" based on the signal indicating whether the door is locked or unlocked. The user 5 can be provided with information in accordance with the vehicle state information or the vehicle compartment information.

A place for displaying the message "Welcome" or "RR Open" can be determined based on the vehicle compartment information. For example, let us consider the case of displaying the message "Welcome." When the wireless key inputs a door unlock instruction signal, the key switch may be off and the door may be locked. In such a case, the user 5 is going to get into the vehicle 2, the user 5 is not seated on the driver seat 43, or no occupant exists in the vehicle compartment. The user 5 can unerringly recognize the message "Welcome" displayed on the driver seat 43 the user 5 may first confirm when getting into the vehicle. Let us consider the case of displaying the message "RR Open." The window of the rear left door is opened, the key switch is off, and the door is locked. In such a case, the user 5 may be going to get out of the vehicle 2 or may still be sitting on the driver seat 43. It is preferable to display the message anywhere except the driver seat 43.

(Sixth Embodiment)

A sixth embodiment of the invention will be described. The embodiment uses the other vehicle compartment information than that used for the fifth embodiment. For example, as mentioned above, the vehicle compartment information includes an eye position of the user 5 and an obstacle such as the steering wheel that interrupts the visual beam. The embodiment uses such elements of information to adjust a position of displaying the information displayed by a visual beam. The embodiment describes an example of displaying the information on the top surface 8a of the instrument panel using the visual beam.

Figure 21:
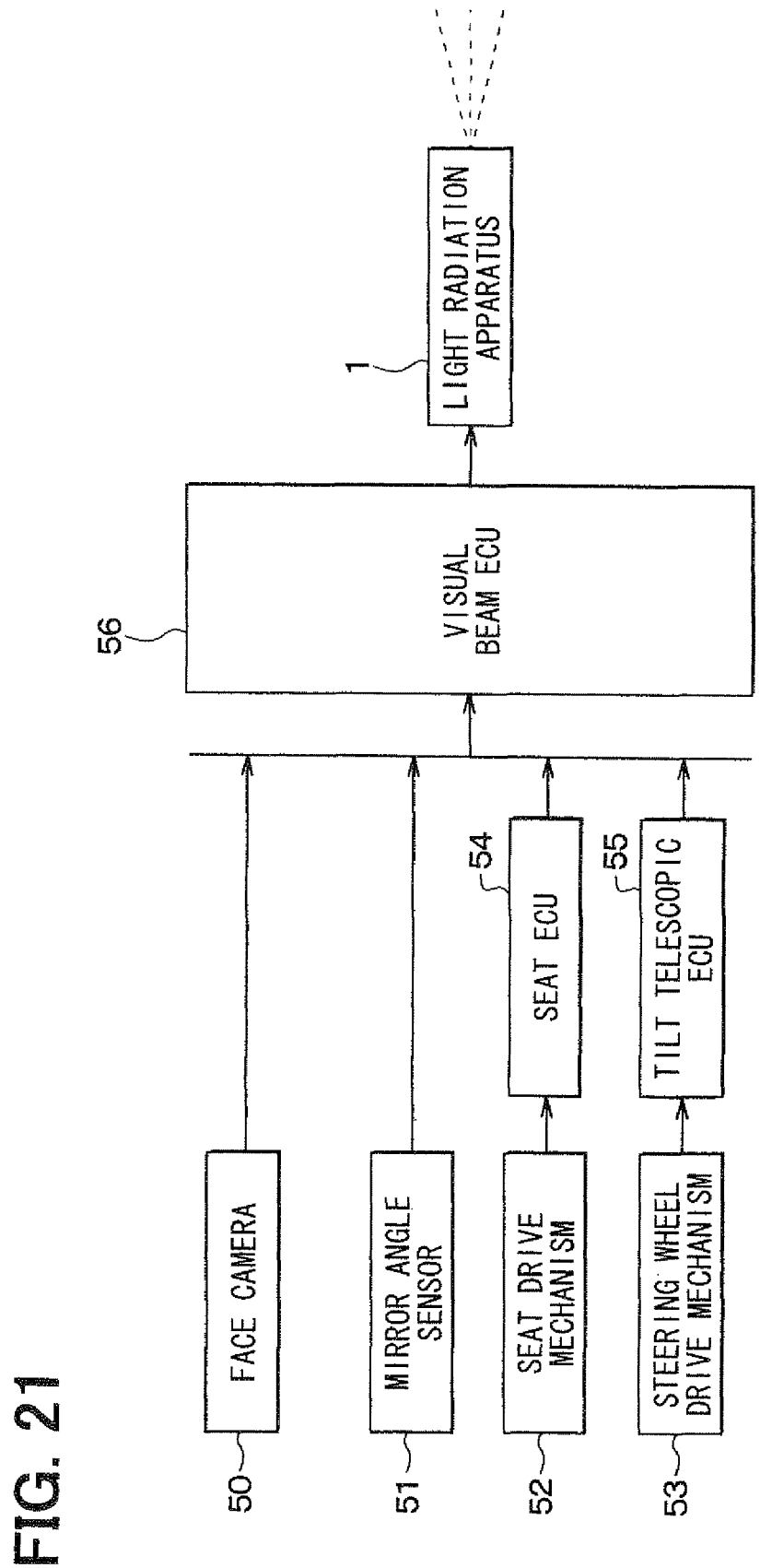
FIG. 21 is a block diagram illustrating a use of information about an obstacle to a visible beam as vehicle interior information according to a sixth embodiment of the invention.
Figure 22:
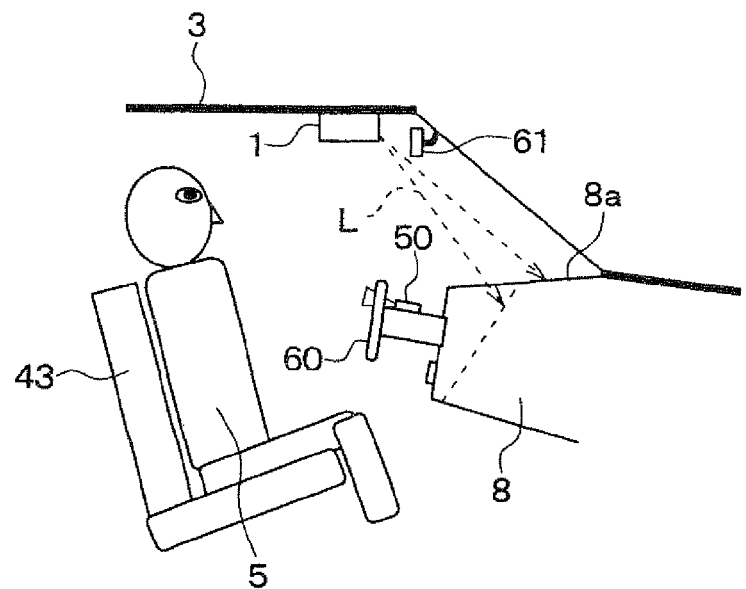
FIG. 22 illustrates an interior mounted with the in-vehicle information display apparatus according to the example of FIG. 21.

FIG. 21 is a block diagram showing an example of using information about an eye position of the user 5 and an obstacle such as a steering wheel interrupting the visual beam as the vehicle compartment information. FIG. 22 shows the inside of the vehicle compartment mounted with the in-vehicle information display apparatus according to the embodiment.

The above-mentioned embodiments have described the mode where each ECU 20 outputs the irradiation instruction frame. As shown in FIG. 21, the sixth embodiment provides a mode where one ECU receives various vehicle interior information from various apparatuses for recognizing the vehicle compartment information and the ECUs supplied with detection signals from the apparatuses and controls irradiation of a visual beam from the light irradiation device 1. Obviously, these modes are only examples. The sixth embodiment may employ the mode of the above-mentioned embodiments. The above-mentioned embodiments may employ the mode of the sixth embodiment.

As shown in FIG. 21, apparatuses for recognizing the vehicle interior information include a face camera 50, a mirror angle sensor 51, a seat drive mechanism 52, and a steering wheel drive mechanism 53. The ECUs for detection signals from the apparatuses include a set ECU 54 and a tilt telescopic ECU 55. Further, a visual beam ECU 56 is provided. Information from the apparatuses 50 through 53 and the ECUs 54 and 55 is transmitted to the visual beam ECU 56. The visual beam ECU 56 controls the light irradiation device 1.

The face camera 50 captures a face of the user 5 (driver) sitting on the driver seat 43 and is provided at the top of a shaft of the steering wheel 60 (see FIG. 22). The mirror angle sensor 51 detects an adjustment angle of a rear view mirror 61 (see FIG. 22). Specifically, the mirror angle sensor 51 detects vertical and horizontal adjustment angles. The seat drive mechanism 52 electrically adjusts positions of the driver seat 43 in a front-back direction and angles of a backrest. The seat ECU 54 is supplied from the seat drive mechanism 52 with position information about the driver seat 43 such as adjustment positions based on positions in a front-back direction and angles of a backrest. The steering wheel drive mechanism 53 electrically adjusts a position determined by a vertical angle and a telescopic quantity in an axial direction of the steering wheel 60. The tilt telescopic ECU 55 is supplied from the steering wheel drive mechanism 53 with position information about the steering wheel 60, namely an adjustment position based on the vertical angle and the telescopic quantity in the axial direction.

Figure 23:
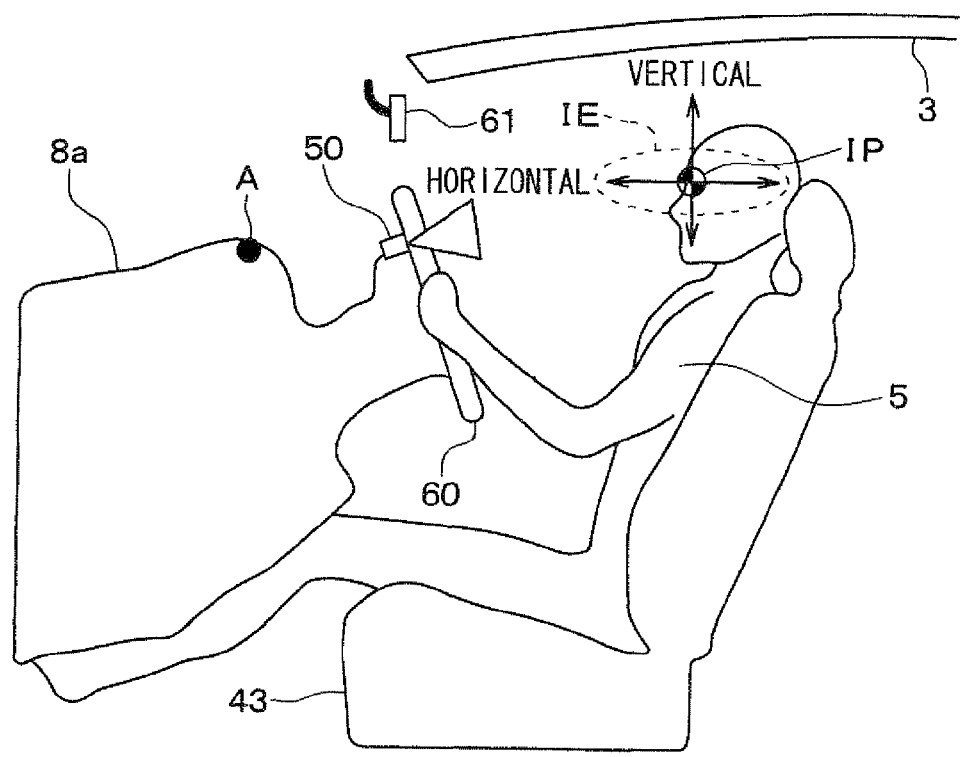
FIG. 23 illustrates a technique of detecting a user eye position.

When the light irradiation device 1 irradiates a visual beam in such a construction, the in-vehicle information display apparatus detects an eye position of the user 5 and displays information by irradiating a visual beam to a position corresponding to the eye position of the user 5. As shown in FIG. 23, the in-vehicle information display apparatus detects an eye position of the user 5 in the vehicle compartment as an eye position IP within the range of two-dimensional positions in a vertical or height direction and a horizontal or front-back direction. The in-vehicle information display apparatus detects a vertical position by analyzing an image captured by the face camera 50. The in-vehicle information display apparatus detects a horizontal position based on the adjustment position of the driver seat 43.

The in-vehicle information display apparatus can detect an eye position corresponding to the driver eye position in the height direction based on the vertical angle of the rear view mirror 61 detected by the mirror angle sensor 51.

The in-vehicle information display apparatus can detect an eye position corresponding to the driver eye position in the front-back direction based on a horizontal angle of the rear view mirror 61 detected by the mirror angle sensor 51.

Figure 24:
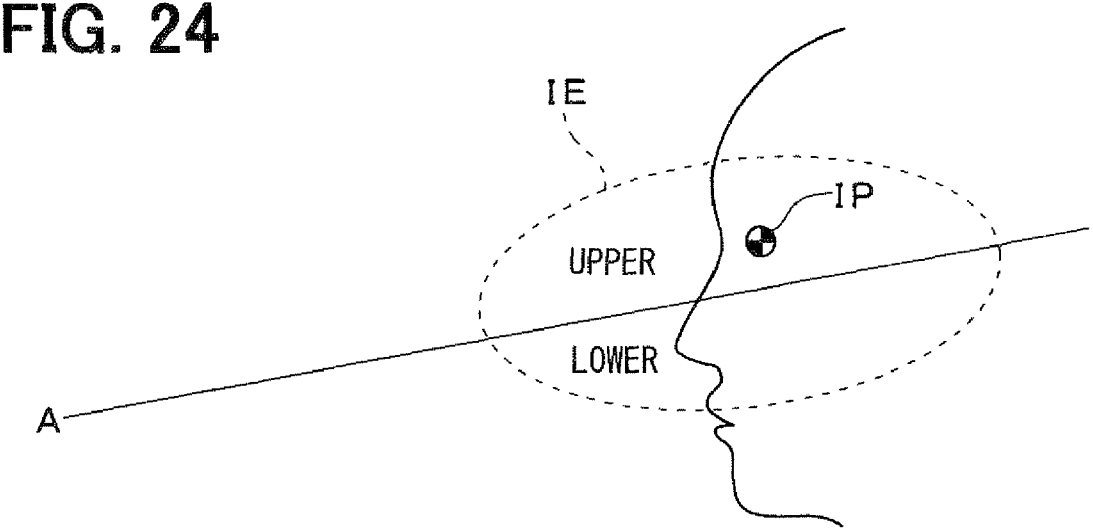
FIG. 24 illustrates whether the user eye position belongs to an upper or lower group.

The in-vehicle information display apparatus determines whether the detected eye position IP of the user 5 is included in a high visual point group or a low visual point group. As shown in FIG. 24, a threshold value is defined as a line that passes through a predetermined point A that separates an area of an eye ellipsis IE containing eye positions of 99% of persons in a given population in half. A position above the threshold value belongs to the high visual point group. A position below the threshold value belongs to the low visual point group.

When the eye position is determined to be high or low, the information can be displayed by irradiating the visual beam to an appropriate location. The position for displaying the information can be changed in accordance with the height of the eye of the user 5. The information can be visually recognized in accordance with the height of the user 5. The position for displaying the information can be adjusted so as to be capable of decreasing a visual line distance. The information display position can be adjusted automatically without requiring the user 5 to be aware of the adjustment.

In such a construction, the light irradiation device 1 irradiates the visual beam by adjusting the irradiation position so that an obstacle such as the steering wheel 60 may not interrupt the irradiation of the visual beam.

Figure 25:
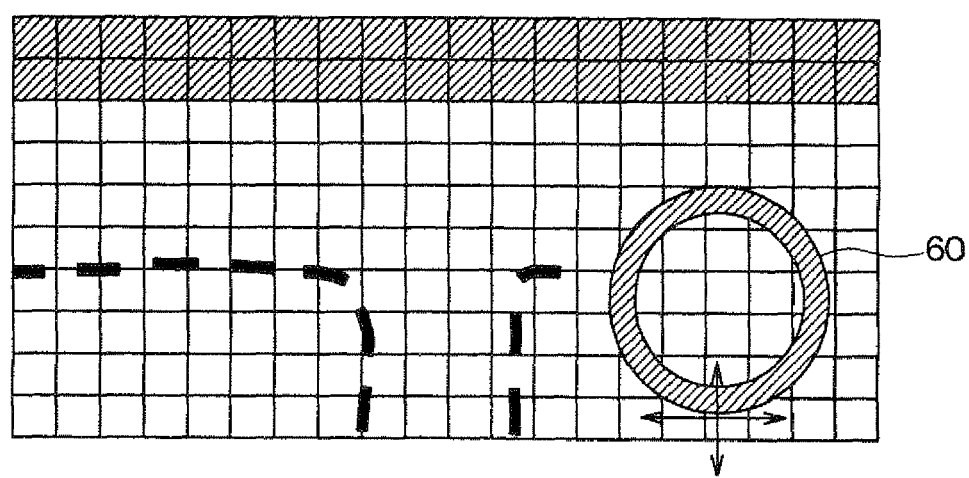
FIG. 25 illustrates a prohibited area for prohibiting irradiation of a visible beam.

Specifically, the in-vehicle information display apparatus receives the position information about the steering wheel 60, namely the information about the vertical angle and the telescopic quantity in the axial direction. Based on the position information, the in-vehicle information display apparatus determines a prohibited area for prohibiting irradiation of the visual beam. FIG. 25 shows visual beam irradiation coordinate data that represents an area capable of displaying the information on the top surface 8a of the instrument panel. The in-vehicle information display apparatus computes an area where the visual beam irradiation is interrupted by the steering wheel 60 represented by a circle. The computed area is defined to be the prohibited area. When the above-mentioned point IP of the user 5 belongs to the low visual point group, the user 5 cannot easily visually check part of the top surface 8a of the instrument panel farther from the user, namely a shaded top area in FIG. 6. Such an area may be also defined to be the prohibited area.

After the prohibited area is determined, the visual beam can be irradiated so as to avoid the prohibited area. The user 5 can reliably recognize the information displayed by the irradiated visual beam.

As mentioned above, the vehicle compartment information can be used to adjust the position of displaying the information irradiated by the visual beam. The position of the irradiated visual beam can be easily confirmed from the eye position of the user 5. The visual beam can be irradiated without being interrupted by an obstacle.

(Seventh Embodiment)

A seventh embodiment of the invention will be described. The embodiment describes the information provision based on the vehicle surrounding information and the vehicle state information.

Figure 26:
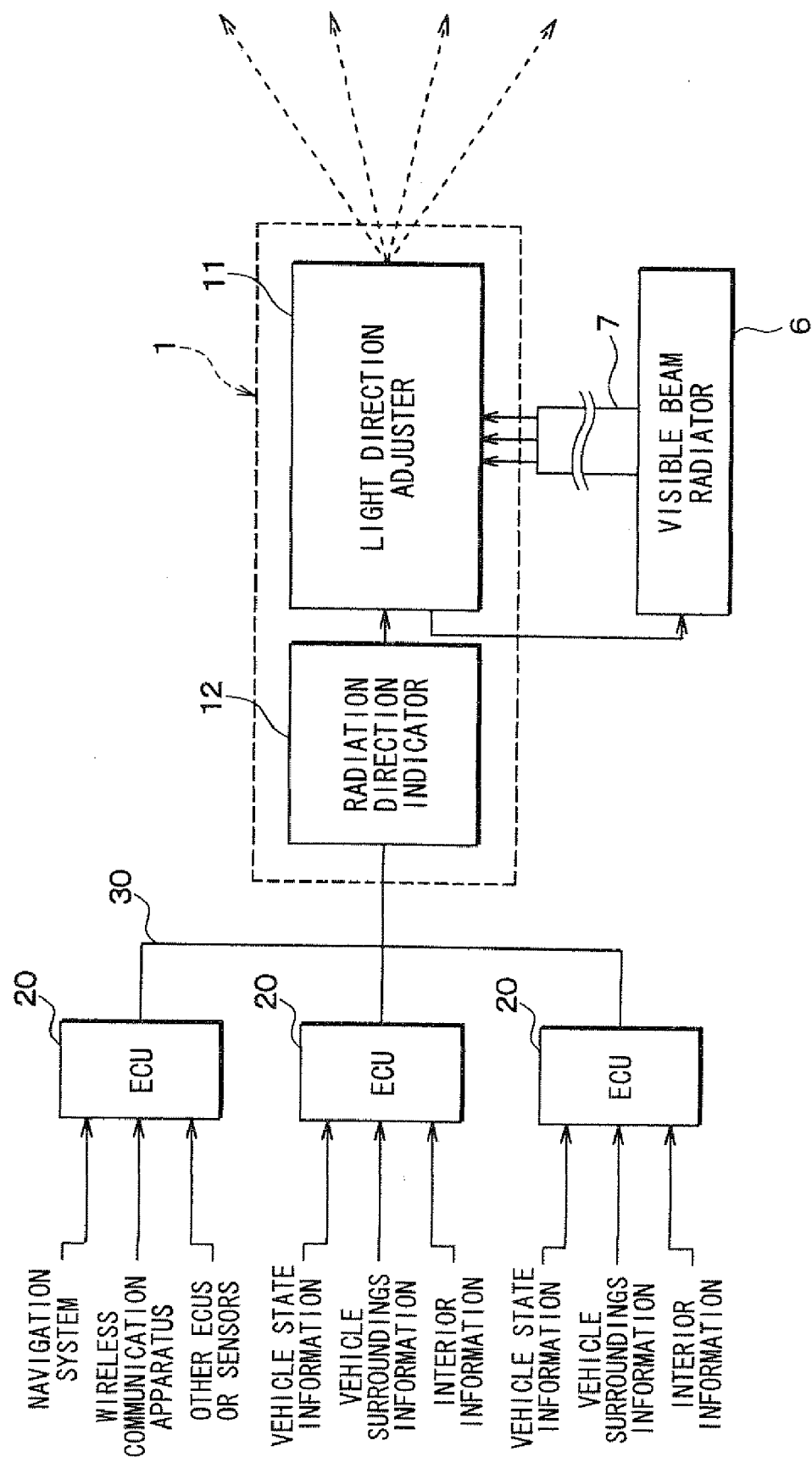
FIG. 26 is a block diagram illustrating an exemplary use of an in-vehicle information display apparatus according to a seventh embodiment of the invention.

FIG. 26 is a block diagram exemplifying the use of the in-vehicle information display apparatus according to the seventh embodiment. As shown in FIG. 26, the above-mentioned ECUs 20 function as information input apparatuses. The ECUs 20 supply various types of vehicle surrounding information and vehicle state information via an interior LAN that transmits information from a navigation system, a wireless communication apparatus, the other ECUs, and sensors, though not shown.

The navigation system supplies the vehicle surrounding information such as navigation information including road information around the own vehicle and guidance route information, and position information indicating the current position of the own vehicle. The wireless communication apparatus supplies the vehicle surrounding information provided by the road-to-vehicle communication between the vehicle and an external roadside infrastructure or from the inter-vehicle communication with the other vehicles. Specifically, the wireless communication apparatus supplies information (surrounding situation information) about an obstacle, namely, an object such as another vehicle, two-wheel vehicle, or pedestrian that may interrupt the progress of the own vehicle. An obstacle detection sensor (autonomous sensor such as an ultrasonic or a radar sensor) mounted on the own vehicle cannot detect such obstacle. The vehicle surrounding information includes obstacle types, positions (latitude and longitude), traveling directions (orientations), and traveling speeds (kilometers per hour). The vehicle LAN 30 supplies the vehicle state information such as information about a turn signal lamp of the own vehicle, vehicle speed information, and information indicating a detection result from an obstacle sensor. The ECU 20 determines a traveling direction of the own vehicle based on the turn signal lamp information and the vehicle speed information. The ECU 20 also detects an obstacle and computes a distance between the own vehicle and the obstacle based on the information indicating the detection result from the obstacle sensor. The traveling direction of the own vehicle may be determined by further supplying steering angle information from the steering wheel of the own vehicle.

Based on these elements of information, the ECU 20 estimates possible patterns of collision between the own vehicle and an obstacle. Based on the surrounding situation information acquired from the road-to-vehicle communication, for example, the ECU 20 estimates a pattern in which the own vehicle would collide with another vehicle immediately after merging onto a priority road. Based on the vehicle surrounding information acquired from the inter-vehicle communication, the ECU 20 estimates a pattern in which another vehicle would bump into the own vehicle from behind when the own vehicle changes the driving lane to a passing lane.

The ECU 20 determines whether the estimated pattern of collision may occur. When the road-to-vehicle communication provides the vehicle surrounding information, the ECU 20 determines the possibility of collision by comprehensively evaluating positions and traveling or moving directions of the own vehicle, another vehicle, a two-wheel vehicle, and a pedestrian. When a collision may occur, the ECU 20 determines a danger level. The ECU 20 determines a possibility of collision when the turn signal lamp information and the vehicle speed information indicate the presence of another vehicle, two-wheel vehicle, or pedestrian moving in the traveling direction of the own vehicle, for example. The ECU 20 can determine a danger level based on a distance to the obstacle and a vehicle speed for the collision. Similarly, when the inter-vehicle communication provides the vehicle surrounding information, the ECU 20 can determine a possibility of collision and a danger level by comprehensively evaluating positions and traveling or moving directions of the own vehicle and another vehicle.

When determining the collision pattern, the collision possibility, and the danger level, the ECU 20 transmits a corresponding collision warning frame to the light irradiation device 1. The light irradiation device 1 displays the corresponding information. The following describes examples of information display patterns.

Figure 27:
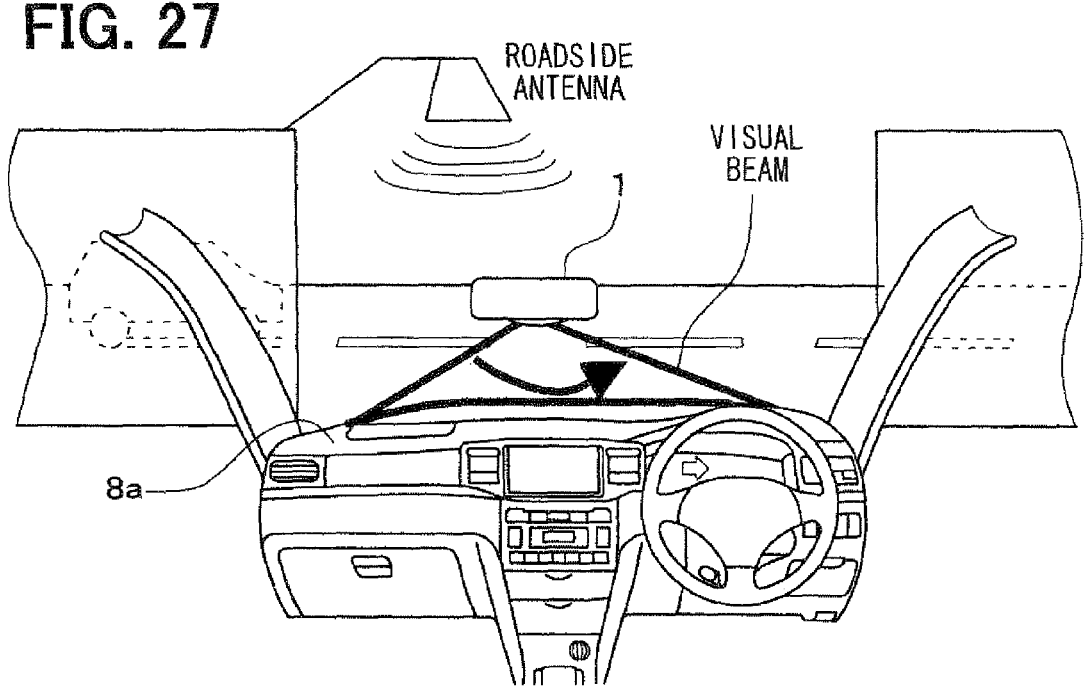
FIG. 27 illustrates an example of irradiating a visual beam when an own vehicle is going to merge onto a priority road by turning to the right and another vehicle is approaching from the left on the priority road.

FIG. 27 shows an example of irradiating a visual beam when the own vehicle is going to merge onto a priority road by turning to the right and another vehicle is approaching from the left of the priority road. As shown in FIG. 27, an irradiation reference direction for the visual beam is determined so as to guide the visual line of the user 5 of the own vehicle. In FIG. 27, the irradiation reference direction corresponds to the left side where another vehicle is hidden behind a wall. The top surface 8*a* of the instrument panel is defined as an irradiation range. The light irradiation device 1 can display information using a display pattern of moving the visual beam from the irradiation reference direction within the irradiation range in a direction opposite the guidance direction, namely a traveling direction of another vehicle.

Figure 28:
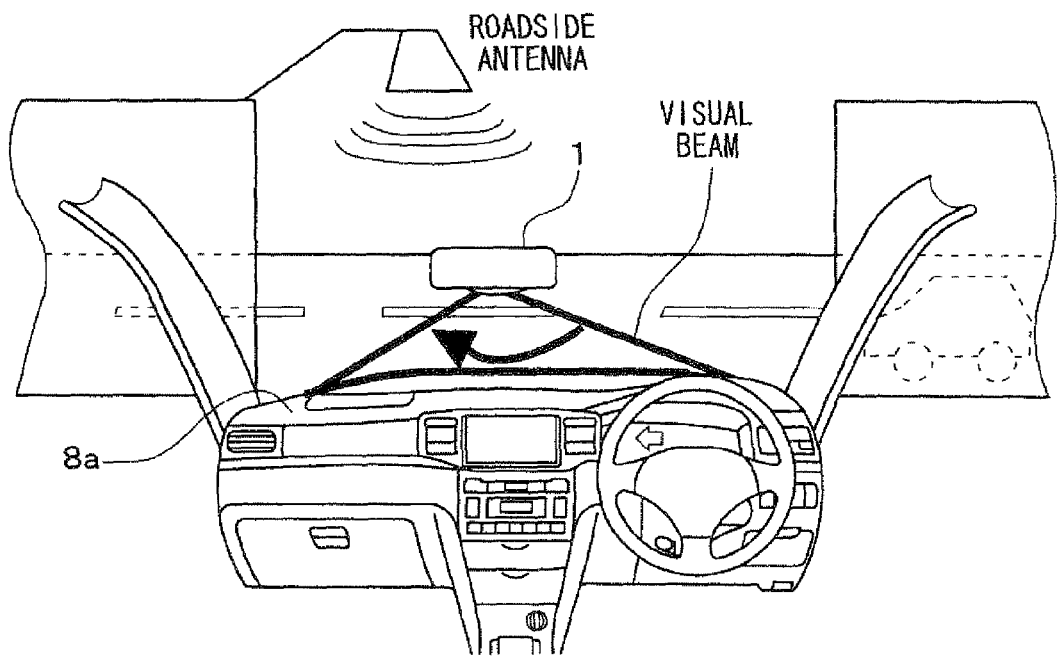
FIG. 28 illustrates an example of irradiating a visual beam when the own vehicle is going to merge onto a priority road by turning to the left and another vehicle is approaching from the right on the priority road.

FIG. 28 shows an example of irradiating a visual beam when the own vehicle is going to merge onto a priority road by turning to the left and another vehicle is approaching from the right of the priority road. As shown in FIG. 28, an irradiation reference direction for the visual beam is determined so as to guide the visual line of the user 5 of the own vehicle. In FIG. 28, the irradiation reference direction corresponds to the right side where another vehicle is hidden behind a wall. The light irradiation device 1 can display information using a display pattern of moving the visual beam from the irradiation reference direction within the irradiation range DA in a direction opposite the guidance direction, namely a traveling direction of another vehicle.

Since the visual beam is irradiated according to the above-mentioned technique, the user 5 can recognize a direction to which attention needs to be paid. Changing the irradiation direction can vary the visual beam displayed in a peripheral visual field of the user 5. The user 5 can easily notice the visual beam.

Figure 29:
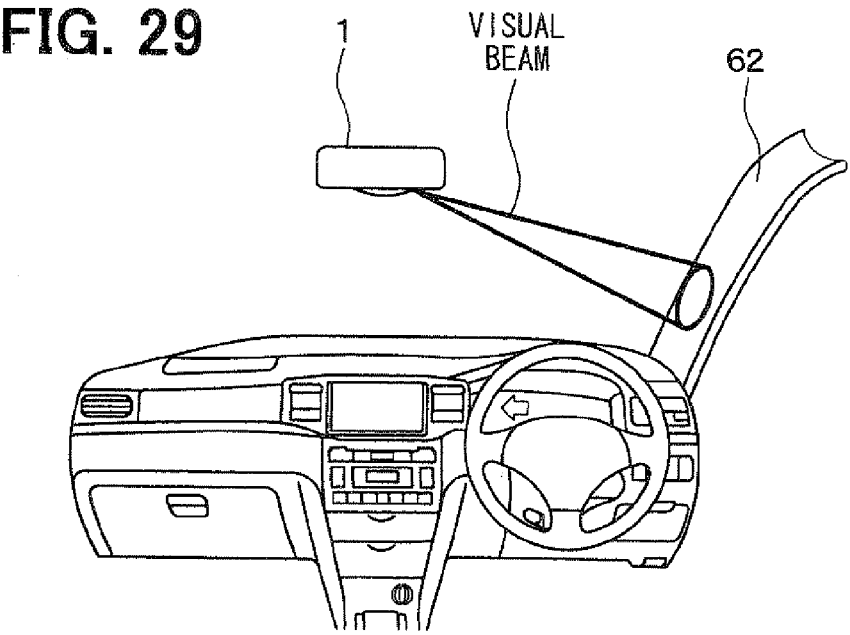
FIG. 29 illustrates another example of irradiating a visual beam when the own vehicle is going to merge onto a priority road by turning to the left and another vehicle is approaching from the right on the priority road.

The examples in FIGS. 27 and 28 define the irradiation range on the top surface 8*a* of the instrument panel. The irradiation range may be defined elsewhere. Similarly to FIG. 28, FIG. 29 shows another example of irradiating a visual beam when the own vehicle is going to merge onto a priority road by turning to the left and another vehicle is approaching from the right of the priority road;

As shown in FIG. 29, the surface of a front pillar 62 is defined as the irradiation range. An irradiation reference direction for the visual beam is determined so as to guide the visual line of the user 5 of the own vehicle to the right in FIG. 29. A display pattern may be used for movingly irradiating a green visual beam near the irradiation reference direction so as to draw a circle on the front pillar 62. The display pattern can vary the visual beam displayed in a peripheral visual field of the user 5. The user 5 can easily notice the visual beam.

Figure 30:
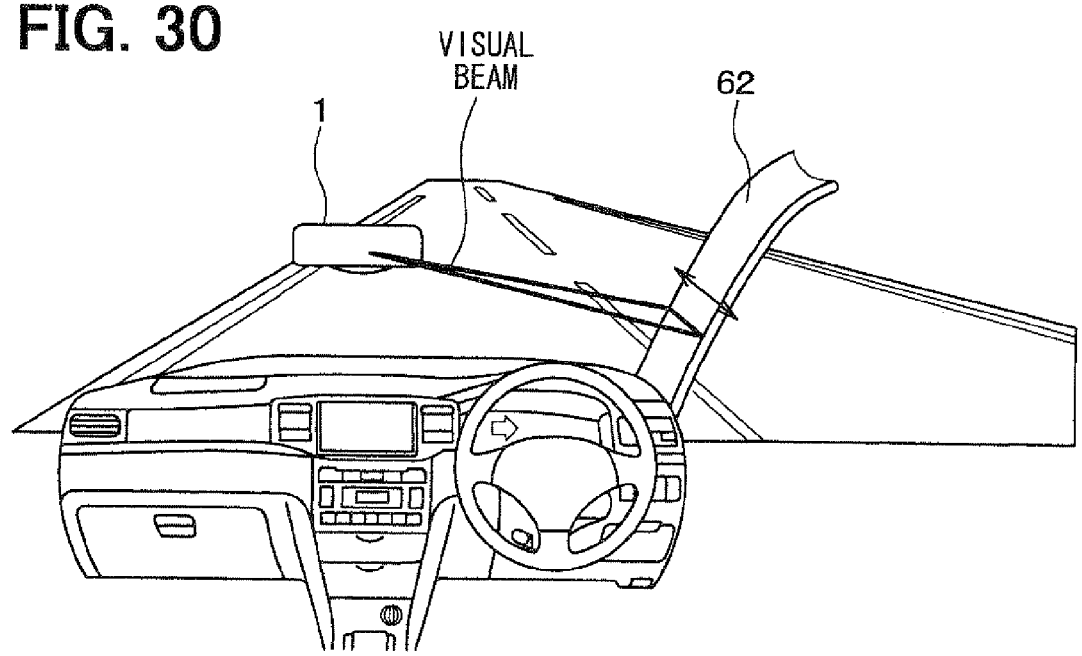
FIG. 30 illustrates an example of irradiating a visual beam when a vehicle is going to change a driving lane to a passing lane and another vehicle approaches from a right rear.

FIG. 30 shows an example of irradiating a visual beam when the own vehicle is going to change a driving lane to a passing lane and another vehicle approaches from the right rear. Also in such a case, the surface of the front pillar 62 is defined as the irradiation range DA. An irradiation reference direction for the visual beam is determined so as to guide the visual line of the user 5 of the own vehicle to the right in FIG. 30. A display pattern may be used for movingly irradiating a green visual beam near the irradiation reference direction so as to draw a line on the front pillar 62. The display pattern can vary the visual beam displayed in a peripheral visual field of the user 5. The user 5 can easily notice the visual beam.

Display patterns can be changed depending on obstacle types. For example, the ECU 20 determines whether an object moving near the vehicle is a human being or a two-wheel vehicle. The ECU 20 further identifies a movement direction of the object. Based on a determination result, the ECU 20 can select a trajectory for displaying the obstacle.

FIG. 31 is a table listing trajectory examples. When the obstacle is a human being, the visual beam can be irradiated so as to form two points. The points can be moved alternately as if human legs were moving. When the obstacle is a two-wheel vehicle, the visual beam can be irradiated so as to form two adjacent rings. The rings can be displayed and moved in the same direction as if a two-wheel vehicle were moving. Since the display patterns can vary with obstacle types, the user 5 can be made to easily recognize obstacle types. Since the visual beam is displayed movingly in accordance with an obstacle trajectory, a moving direction of the obstacle can be more distinctively impressed on the user 5.

When the own vehicle may collide with an obstacle, different display patterns may be used so as to display the visual beam in accordance with danger levels. For example, a high danger level fast changes the irradiation direction of the visual beam. A low danger level slowly changes the irradiation direction of the visual beam. The user 5 can recognize the danger level based on a moving speed of the displayed visual beam.

FIG. 32(*a*) shows a low danger level indicating that an obstacle is far from the user 5. A display pattern may be used to display a visual beam trajectory in a small-amplitude low frequency wave. FIG. 32(*b*) shows a medium danger level indicating that an obstacle is nearer to the user 5. A display pattern may be used to display a visual beam trajectory in a small-amplitude high frequency wave. FIG. 32(*c*) shows a high danger level indicating that an obstacle is close to the user 5. A display pattern may be used to display a visual beam trajectory in a large-amplitude high frequency wave. Using these display patterns, the user 5 can recognize the danger levels.

(Eighth Embodiment)

An eighth embodiment of the invention will be described. Compared to the seventh embodiment, the eighth embodiment varies information displayed by a visual beam according to a distance to an obstacle. The distance is calculated based on information indicating a detection result from an obstacle sensor.

The obstacle sensor uses a clearance sonar, for example. The obstacle sensor is provided at the left and right ends and the center of the front and the rear of the vehicle, for example. When an obstacle exists near the vehicle, the obstacle sensor outputs a signal corresponding to a distance between the vehicle and the obstacle. The signal indicates the distance to the obstacle. Information about the distance is transmitted to the ECU 20. The ECU 20 calculates the distance to the obstacle. Depending on which obstacle sensor on the vehicle has calculated the distance to the obstacle, the ECU 20 can recognize the position of the obstacle near the own vehicle and the distance to the obstacle from the own vehicle.

The obstacle sensor uses detection distances such as a long distance (50 cm to 30 cm), a medium distance (30 cm to 20 cm), and a short distance (20 cm or less), for example. The obstacle sensor may use finer calibrations in units of centimeters, for example.

The ECU 20 specifies the position of the obstacle and the distance to the obstacle based on the information indicating detection results from the obstacle sensor. Based on the specified position and distance, the ECU 20 determines a target point, a start point, and a trajectory for irradiating the visual beam. The ECU 20 controls the light direction adjuster 12 so as to irradiate the visual beam to the determined start point. The ECU 20 also controls the light direction adjuster 12 so that the visual beam is irradiated on the target point via the determined trajectory.

The ECU 20 determines whether the obstacle is still approaching depending on whether the obstacle sensor further supplies information about a detection result. When the obstacle is approaching, the ECU 20 continues to display the information using the visual beam. When the obstacle does not approach, the ECU 20 stops displaying the information using the visual beam.

The ECU 20 determines the target point, the start point, and the trajectory as follows. When an object is detected by the obstacle sensors provided for the front of the vehicle, the ECU 20 determines a front end in the vehicle compartment 1 so as to be used as a range of positions for the target point, the start point, and the trajectory. The range is hereafter referred to as an irradiation range.

Figure 33:
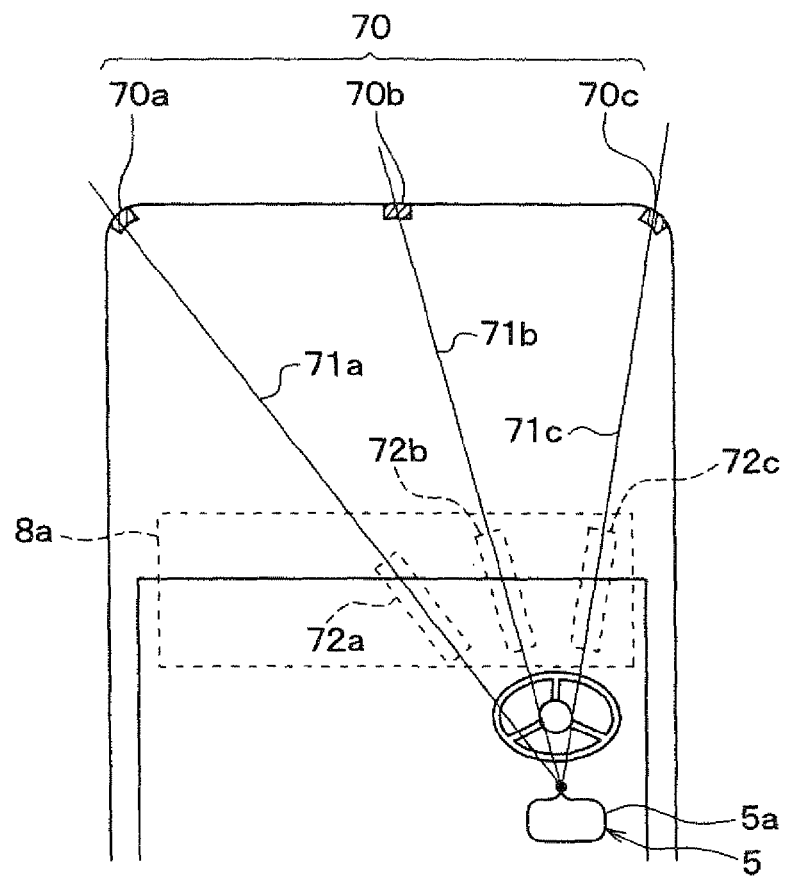
FIG. 33 illustrates examples of irradiating ranges of visible laser when an obstacle is found ahead of a vehicle.

As shown in FIG. 33, the irradiation range is defined as an area along a designed or virtual line connecting one of the obstacle sensors 70 detecting the obstacle with a position of the head 5*a* of the user 5. When an obstacle sensor 70*a* at the left front of the vehicle detects the obstacle, the irradiation range is assumed to be an area 72*a* along a virtual line 71*a* including the top surface 8*a* of the instrument panel and part of an engine hood beyond a windshield glass. When an obstacle sensor 70*b* at the center front of the vehicle detects the obstacle, the irradiation range is assumed to be an area 72*b* along a virtual line 71*b* including the top surface 8*a* of the instrument panel and part of the engine hood beyond the windshield glass. When an obstacle sensor 70*c* at the right front of the vehicle detects the obstacle, the irradiation range is assumed to be an area 72*c* along a virtual line 71*c* including the top surface 8*a* of the instrument panel and part of the engine hood beyond the windshield glass.

Figure 34:
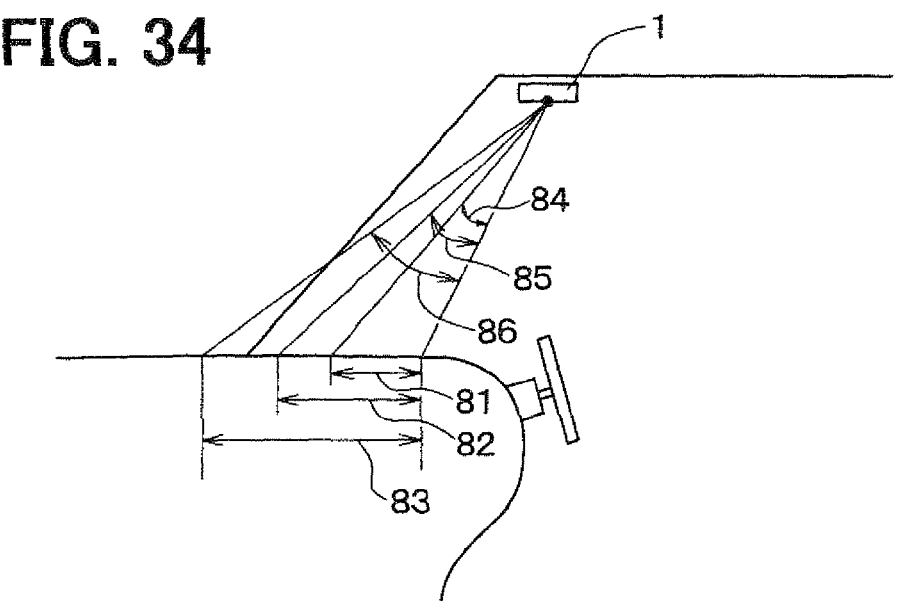
FIG. 34 illustrates examples of trajectory lengths to positions for irradiating visible laser when an obstacle is found ahead of a vehicle.

The start point is assumed to be nearest to the user 5 in the irradiation range. The trajectory of irradiation may linearly reciprocate between the start point and the target point. In such a case, the target point is positioned far away from the user 5 in proportion to a distance to the detected obstacle. As shown in FIG. 34, for example, a minimum length 81 from the start point to the target point is used for detection of an obstacle at the short distance. A medium length 82 from the start point to the target point is used for detection of an obstacle at the medium distance. A maximum length 83 from the start point to the target point is used for detection of an obstacle at the long distance.

The ECU 20 controls an angle of the light direction adjuster 12 so that the angle varies within any of angular ranges 84, 85, and 86 depending on whether the obstacle is detected at the short, medium, or long distance.

As the distance to the obstacle increases, the ECU 20 controls the light irradiation device 1 so as to increase the length of the trajectory formed by the irradiated visual beam.

The ECU 20 further controls the light irradiation device 1 so that the direction of the trajectory formed by the irradiated visual beam varies with the direction from the user 5 to the obstacle. Varying with the direction toward an obstacle signifies that the trajectory varies with at least the direction toward the obstacle when this direction changes.

The distance to an obstacle increases or decreases as the length of the trajectory formed by the irradiated visual beam increases or decreases. The user 5 can intuitively recognize the distance to the obstacle according to the display generated by the visual beam. The direction to the obstacle viewed from the user 5 is analogous to the direction of the trajectory for the irradiated position. The user 5 can more intuitively recognize the direction to the obstacle.

(Ninth Embodiment)

A ninth embodiment of the invention will be described. According to the fifth embodiment, for example, the visual beam is irradiated on the surface 8*a* of the instrument panel, the operation panel 40, the drive position lever 41, the console box 42, or the driver seat 43. The ninth embodiment describes a case of irradiating the visual beam elsewhere.

The embodiment displays information by irradiating a visual beam to the surface of the steering wheel 60. The user 5 needs to adjust the steering wheel position. As described in the sixth embodiment, the tilt telescopic ECU 55 is supplied with position information about the steering wheel 60, namely the vertical angle and the telescopic quantity in the axial direction. Such position information is used as the vehicle compartment information. A position of irradiation to the steering wheel 60 is corrected based on the position information. The visual beam can be more precisely irradiated.

Such visual beam irradiation to the steering wheel 60 enables the obstacle avoidance display and the lane departure warning, for example.

As described in the seventh or eighth embodiment, the in-vehicle information display apparatus provides the obstacle avoidance display by determining the presence or absence of an obstacle or calculating a distance to the obstacle based on a signal indicating a detection result from the obstacle sensor. When collision with an obstacle is expected, the in-vehicle information display apparatus displays information based on a steering wheel operation direction and a steering wheel manipulation amount so as to guide the user 5 in the steering wheel operation. The steering wheel operation direction and the steering wheel manipulation amount are equivalent to the vehicle state information and can be acquired by supplying the ECU 20 with a signal detected by a steering angle sensor.

Figure 35:
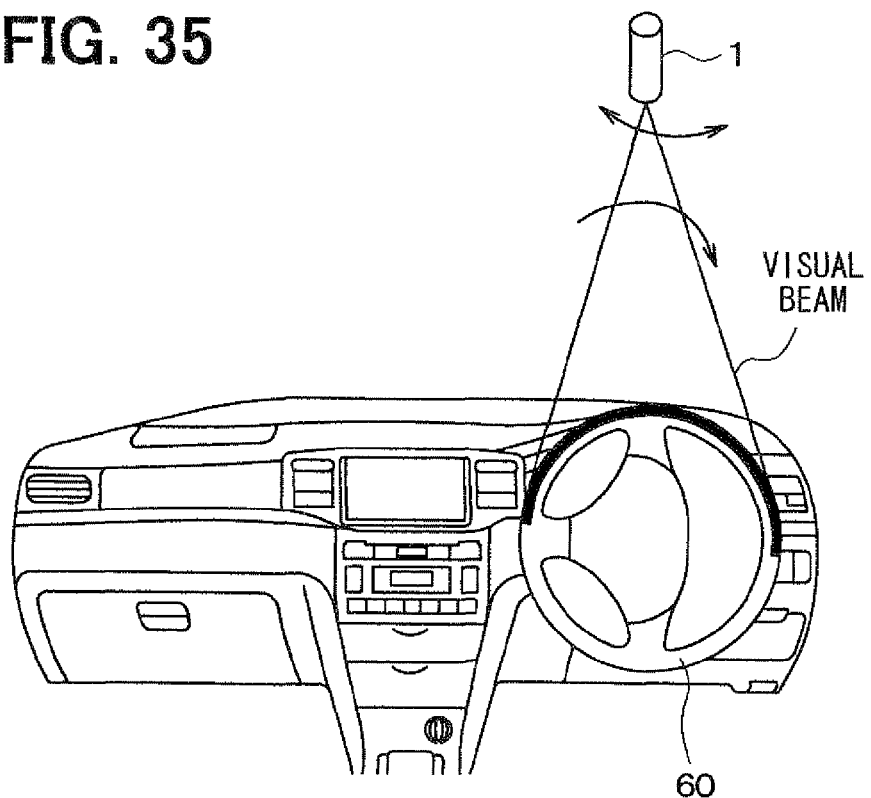
FIG. 35 illustrates an example of displaying a steering wheel operation using a laser beam.

FIG. 35 shows an example where the steering wheel operation direction is right and the steering wheel manipulation amount is 180 degrees or more. Irradiation positions are calculated so as to provide the following display. The light irradiation device 1 irradiates a visual beam to the left end of the steering wheel 60 and moves the visual beam clockwise. The light irradiation device 1 moves the visual beam along the top of the steering wheel 60 and stops the irradiation when the visual beam reaches the right end of the steering wheel 60. The light irradiation device 1 then repeats the irradiation from the left end of the steering wheel 60.

The in-vehicle information display apparatus then controls the visible beam irradiator 11 and the light direction adjuster 12. Specifically, the ECU 20 supplies the light direction adjuster 12 with angle data so as to irradiate the visual beam to the calculated irradiation position. The ECU 20 repeatedly transmits an on/off signal to the visible beam irradiator 11 so as to irradiate the visual beam only within the range from the left end of the steering wheel 60 and the right end thereof. The irradiation display is repeated from the left end of the steering wheel 60 to the right end thereof clockwise.

Figure 36:
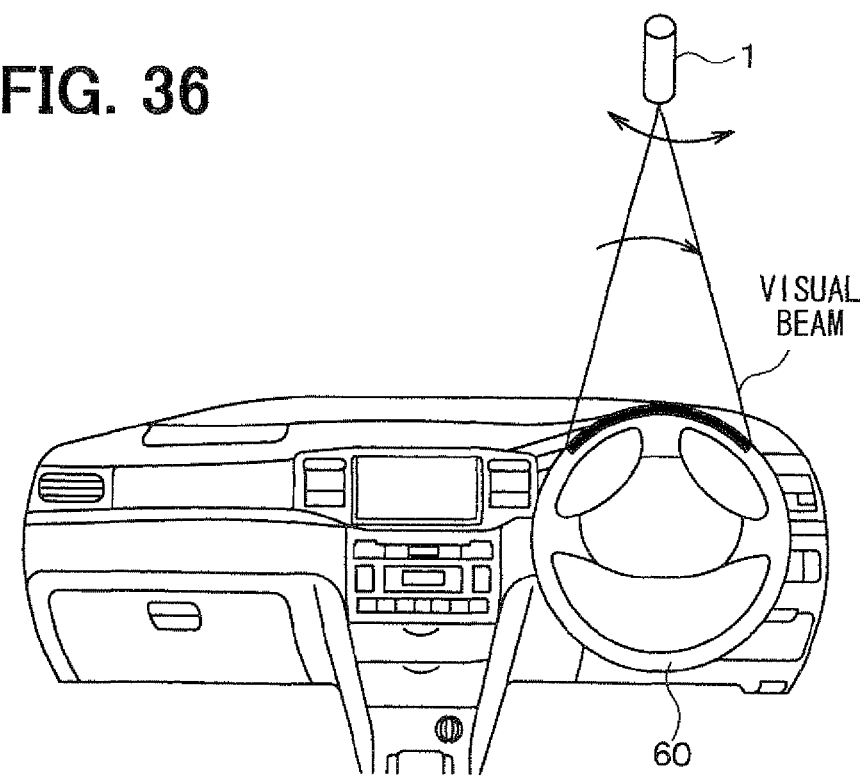
FIG. 36 illustrates another example of displaying a steering wheel operation using a laser beam.

When the steering wheel manipulation amount becomes less than 180 degrees, the in-vehicle information display apparatus changes irradiation positions in accordance with the steering wheel manipulation amount so as to narrow the irradiation range of the visual beam. FIG. 36 shows that the irradiation range of the visual beam is narrowed. When the steering wheel manipulation amount becomes zero degrees, the in-vehicle information display apparatus stops irradiating the visual beam.

When the lane departure warning is used, the ECU 20 is configured to capture a photographic image from a monitoring camera provided at the front of the vehicle. The ECU 20 detects a lane on the road from the photographic image using an image recognition technology. The ECU 20 settles an estimated course of the vehicle based on the steering wheel operation direction, the steering wheel manipulation amount, or a vehicle speed. The ECU 20 determines whether the vehicle drifts from the lane on the road. When the vehicle is expected to drift from the lane on the road, the ECU 20 guides the user 5 in the steering wheel operation so as to keep the lane.

Figure 37:
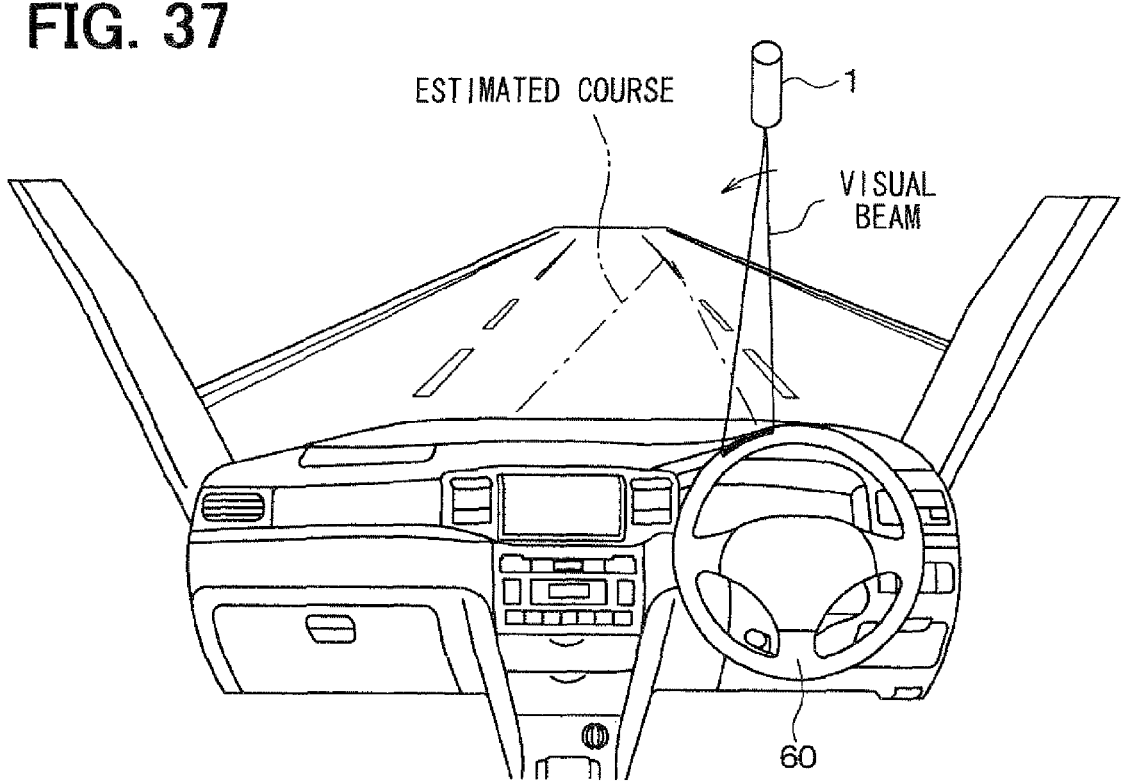
FIG. 37 illustrates still another example of displaying a steering wheel operation using a laser beam.

FIG. 37 shows an example where the steering wheel operation direction is to the left. The light irradiation device 1 starts irradiating a visual beam counterclockwise on the top of the steering wheel 60, stops the irradiation after irradiating a predetermined range, and then repeats the irradiation on the top of the steering wheel 60. Irradiation positions are calculated so as to repeat the display by the irradiation. The irradiation is controlled in accordance with the irradiation positions.

Figure 38:
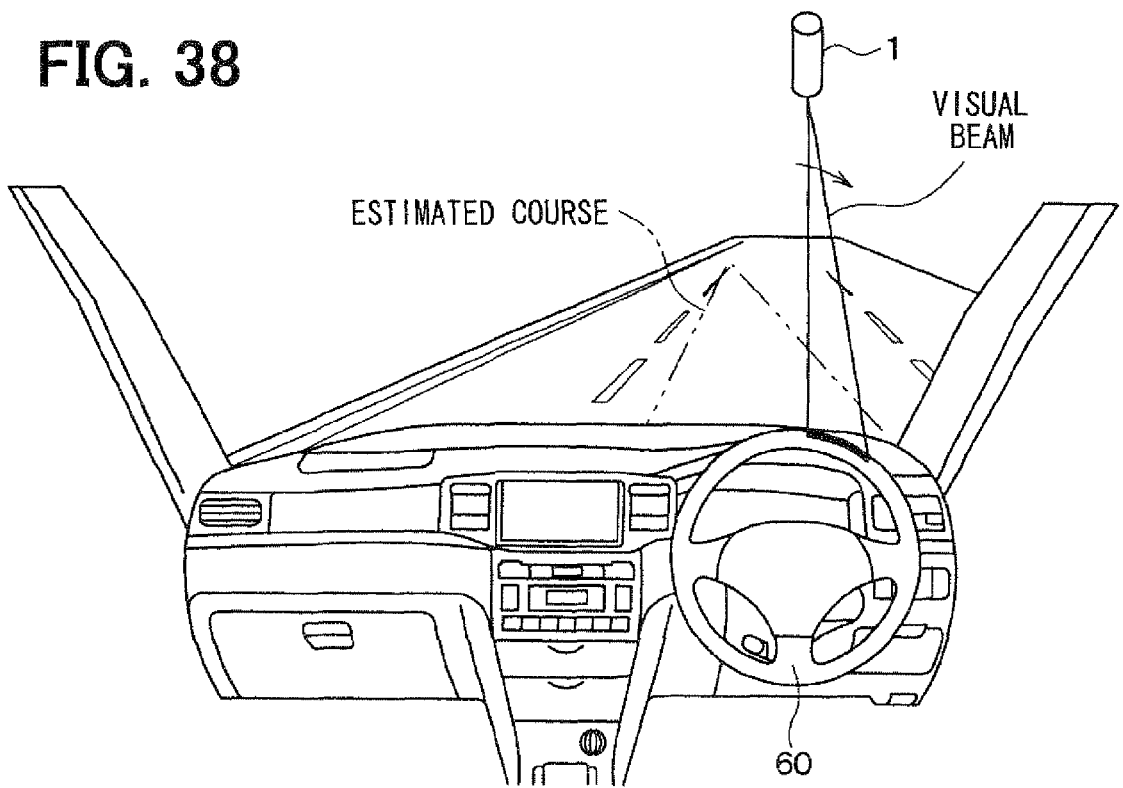
FIG. 38 illustrates yet another example of displaying a steering wheel operation using a laser beam.

FIG. 38 shows an example where the steering wheel operation direction is to the right. The light irradiation device 1 starts irradiating a visual beam clockwise on the top of the steering wheel 60, stops the irradiation after irradiating a predetermined range, and then repeats the irradiation on the top of the steering wheel 60. Irradiation positions are calculated so as to repeat the display by the irradiation. The irradiation is controlled in accordance with the irradiation positions.

It is also possible to guide the user 5 in the steering wheel operation by irradiating the visual beam onto the steering wheel 60.

(Tenth Embodiment)

A tenth embodiment of the invention will be described. In the present embodiment, the light irradiation device 1 included in the in-vehicle information display apparatus is mounted at a location different from the first through ninth embodiments.

Figure 39:
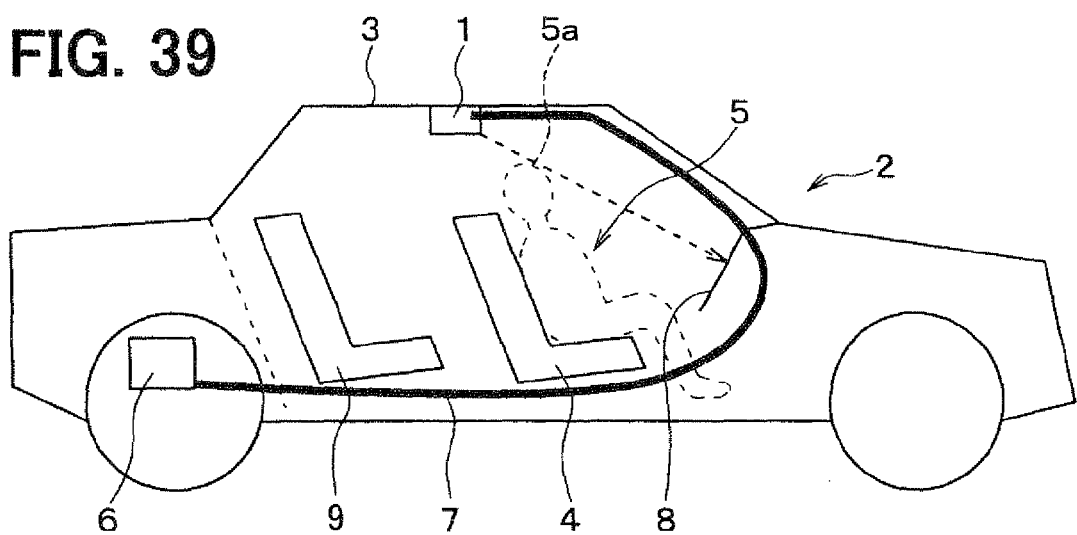
FIG. 39 illustrates a location for mounting a light irradiation device of an in-vehicle information display apparatus according to a tenth embodiment of the invention.

FIG. 39 shows a location for mounting the light irradiation device 1 according to the embodiment. As shown in FIG. 39, the in-vehicle information display apparatus 1 may be mounted at the center of the ceiling of the vehicle 2, namely between the driver seat 4 including the passenger seat and a rear seat 9. In such a case, the optical fiber cable 7 can lead to the ceiling 3 through the front pillar similarly to the first embodiment or through a center pillar (not shown).

(Eleventh Embodiment)

An eleventh embodiment of the invention will be described. The embodiment also mounts the light irradiation device 1 included in the in-vehicle information display apparatus at a location different from the first through tenth embodiments.

Figure 40:
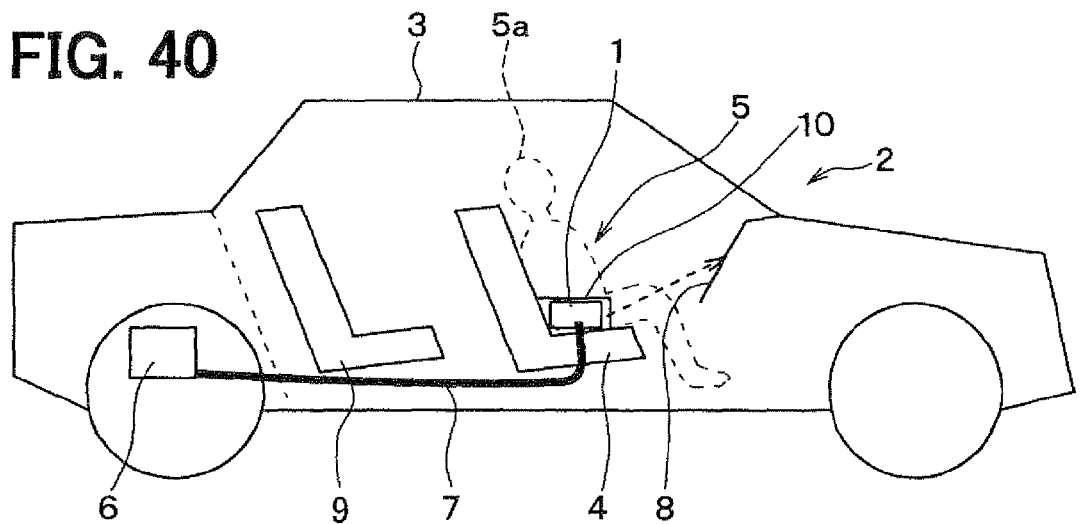
FIG. 40 illustrates a location for mounting a light irradiation device of an in-vehicle information display apparatus according to an eleventh embodiment of the invention.

FIG. 40 shows a location for mounting the light irradiation device 1 according to the embodiment. As shown in FIG. 40, the light irradiation device 1 may be mounted between the driver seat 4 and the passenger seat, for example, on a center console 10, not on the ceiling 3 of the vehicle 2. As mentioned above, the light irradiation device 1 is preferably mounted on the ceiling 3 of the vehicle 2 because a visual beam can be irradiated on a wide range. However, the instrument panel 8 may interrupt the irradiation of the visual beam from light irradiation device 1 to a lower part of the instrument panel 8. In consideration of the possibility of interruption, the light irradiation device 1 may be mounted on the center console 10 according to the embodiment.

(Twelfth Embodiment)

A twelfth embodiment of the invention will be described. In the present embodiment, another light irradiation device 1 is used for an occupant sitting on the rear seat 9 in addition to the light irradiation device 1 for the driver seat 4 or the passenger seat.

Figure 41:
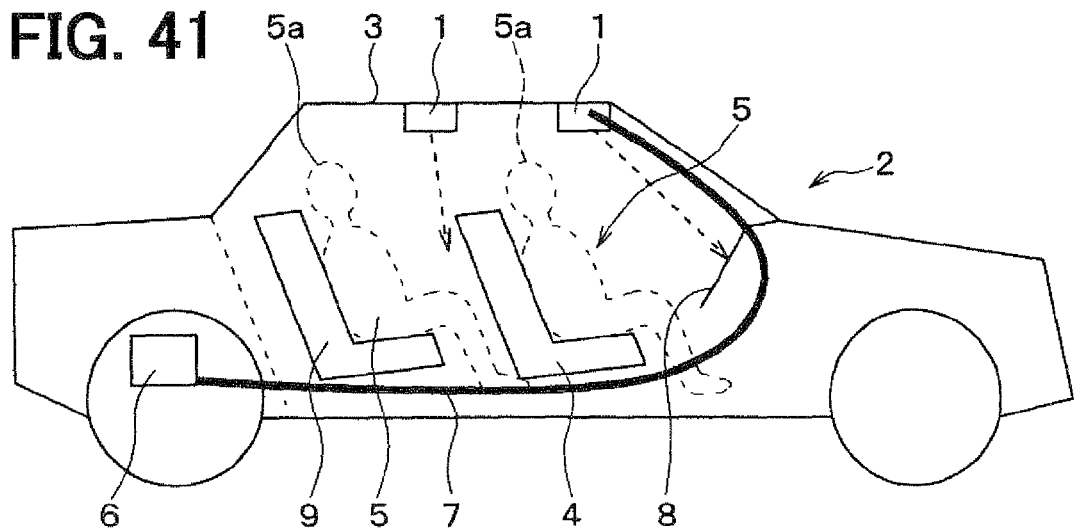
FIG. 41 illustrates a location for mounting a light irradiation device of an in-vehicle information display apparatus according to a twelfth embodiment of the invention.

FIG. 41 shows a location for mounting the light irradiation device 1 according to the embodiment. As shown in FIG. 41, the two light irradiation devices 1 are mounted on the ceiling 3 of the vehicle 2. The first light irradiation device 1 is mounted ahead of an estimated position of the head 5a of the user 5 on the driver seat 4. The second light irradiation device 1 is mounted ahead of an estimated position of the head 5a of the user 5 on the rear seat 9.

It is undesirable to irradiate a visual beam from the light irradiation device 1 directly to an eye of the user 5. When a laser is used as the visual beam, special attention must be paid to prevent the visual beam from directly entering an eye of the user 5. Of the two, the front light irradiation device 1 irradiates things ahead of itself such as switches on the instrument panel 8, for example. The rear light irradiation device 1 irradiates an ajar door handle for the rear seat 9, for example. Each light irradiation device 1 irradiates no visual beam behind itself. In such a manner, it is possible to prevent a visual beam irradiated from the light irradiation device 1 from directly entering an eye of the user 5.

The rear light irradiation device 1 can irradiate a visual beam to switches on the instrument panel 8. However, the visual beam may be irradiated on the user 5 on the driver seat 4. The rear light irradiation device 1 preferably displays information only for the user 5 on the rear seat 9.

(Other Embodiments)

In the above-mentioned embodiments, examples of the in-vehicle information display apparatus that irradiates a visual beam to the switches or to the door handle that is ajar have been described. These are only examples. Other locations may be irradiated. For example, a visual beam may be irradiated on a meter or a warning lamp in the instrument panel 8. A visual beam may be irradiated so as to provide a message so that the user 5 can be provided with information as the message. For example, it may be preferable to irradiate a message notifying that the headlamp remains on. When the remaining fuel is low, a visual beam may be directly irradiated on a fuel gauge. Further, a message may be displayed to indicate the remaining fuel quantity. Alternatively, a message may be displayed to indicate a possible travel distance that can be estimated from the remaining fuel quantity and the fuel consumption of the vehicle 2. It is preferable to display these messages on a dashboard, an instrument cluster, or elsewhere the user 5 can easily recognize.

In the first through fourth embodiments, the light irradiation device 1 is mounted on the ceiling 3 of the vehicle 2 ahead of the head 5a of the user 5. In the fifth embodiment, the light irradiation device 1 is mounted on the center of the ceiling 3 of the vehicle 2. The sixth embodiment mounts the light irradiation device 1 on the center console 10. The embodiments have shown examples of mounting the single light irradiation device 1. Two or more light irradiation devices 1 may be combined to irradiate a visual beam according to the embodiments.

According to the above-mentioned embodiments, the light irradiation device 1 irradiates a visual beam to provide information and guide the user 5 in operations. A sound may be added during the visual beam irradiation from the light irradiation device 1 for more effectively providing information and guiding the user 5 in operations. For example, a sound effect may be added as the irradiated visual beam moves. The user 5 can be more easily provided with information and guided in operations. Further, the user 5 can more easily notice that the visual beam is irradiated.

The ECU 20 creates an irradiation instruction frame based on the vehicle state information, the vehicle surrounding information, and the vehicle interior information. At such a time, the ECU 20 determines a sound output mode and transmits an instruction signal to an audio output apparatus (not shown) such as a speaker. The instruction signal causes the audio output apparatus to output a sound according to the output mode. Similarly to the determination of the start point as described in the eighth embodiment, for example, situations inside and outside multiple vehicles are classified into groups according to degrees of urgency of the situations. The sound output mode is assigned to each of the groups. When the currently received situations inside and outside the vehicle belong to a group, the group is assigned with a sound output mode. Such a sound output mode can be determined as the current one.

FIG. 42 shows a table of grouping examples according to degrees of urgency. A group for high degree of urgency may include meter warning display, meter indicator display, and drowsiness detection. A group for low degree of urgency may include route guidance display, clearance sonar display, rear view display, and notification of incoming call, ETC charging, and maintenance when needed.

The group for high degree of urgency may be assigned with a sound output mode that continuously generates a repetitive beep while an irradiation position moves. The group for low degree of urgency may be assigned with a sound output mode that generates a beep only when an irradiation position starts moving.

The high degree of urgency requires the user to unerringly recognize a situation for safety reasons. For example, the high degree of urgency may be applied to a case where an emergency vehicle approaches, or a pedestrian, two-wheel vehicle, or another vehicle approaches the own vehicle. When the degree of urgency is high, it is effective to change the irradiation area as mentioned above and decrease a volume of the sound output apparatus. The low degree of urgency has no concern for safety aspects such as display for entertainment, for example. One example is to selectively circulate indoor or outdoor air depending on temperatures. Another example is to register a song favored by the user. While the user listens to the radio for music, a visual beam is irradiated for notifying the user of the favorite song that is broadcast on another channel. Still another example is to store map information or shop information in a navigation system. When the vehicle approaches a place for lunch, a visual beam can be irradiated so as to guide the visual line to that place.

The above-mentioned embodiments have shown examples of the light irradiation device capable of spot irradiation of visual beams. The invention is not limited to the spot irradiation. The light irradiation device may irradiate a visual beam having an appropriate area equivalent to a diameter of a pen so that a vehicle occupant can more easily recognize information. For example, a projector or any other devices may be used as the light irradiation device. The irradiation area can be enlarged or reduced by changing a light condensing distance using different optical lenses. The light irradiation device can also freely change irradiation areas based on such a technique.

The vehicle compartment information may be displayed using biological information about the user 5 such as sweating, pulsation, and blink or mouth opening based on the face image recognition. For example, the biological information can be used to estimate drowsiness of the user 5. When the drowsiness is high, a visual beam may be irradiated on an audio switch, an air conditioner switch, or a window opening/closing switch to keep awake. The user 5 can be guided to turn on the audio switch for increasing a volume, turn on the air conditioner switch for decreasing a temperature in the vehicle compartment, or open the window.

The biological information may indicate that the user 5 is in bad health. The user 5 can be guided to operate an emergency switch for notifying of the emergency outside the vehicle compartment. Further, the user 5 can be guided to operate a controller or a touch panel display of the navigation system for selecting a navigation destination and retrieve a hospital as the category for destination retrieval.

The estimation of drowsiness or the detection of health conditions about the user 5 is already known and a detailed description is omitted.

The final posture sensor can detect whether the user 5 is seated. Detection by the final posture sensor, that the user 5 sits on the driver seat, can be used as the vehicle compartment information to irradiate a visual beam elsewhere than the driver seat. Similarly, the camera is used to capture the inside of the vehicle compartment to determine whether the user 5 is seated based on a camera image. The use of camera images makes it possible to acquire more detailed information about the user 5 and accordingly change irradiation locations.

In the first embodiment, the locations in the vehicle compartment for information display, the vehicle state information, the vehicle surrounding information, and the vehicle interior information have been described. The location concepts also apply to all the other embodiments.

In the above-mentioned embodiments, the light irradiation device 1 determines a timing to stop irradiating the visual beam in accordance with various information display images. Basically, the irradiation may be stopped when the user operates an object indicated based on the information about the information display image or when a predetermined time has passed after the visual beam irradiation starts.

The above-mentioned working examples include the following modes.

According to a first mode, an in-vehicle information display apparatus includes: a visible light irradiation device mounted on a vehicle and configured to irradiate a condensed visible light as one of a spot light and an area light to a predetermined position in a vehicle compartment; a light irradiation controller including a light direction adjuster and an irradiation direction indicator, wherein the light direction adjuster adjusts an irradiation direction of the visible light irradiated from the visible light irradiation device, and the irradiation direction indicator outputs data associated with the irradiation direction to the light direction adjuster to adjust the irradiation direction of the visible light; and an electronic control unit specifying information about an information display image based on at least one of vehicle state information, vehicle surrounding information and vehicle interior information, and transmits the information about the information display image to the irradiation direction indicator. The irradiation direction indicator outputs the data associated with the irradiation direction to the light direction adjuster based on the information about the information display image transmitted from the electronic control unit, and the light direction adjuster adjusts the irradiation direction of the visible light irradiated from the visible beam irradiator for irradiating the visible light irradiated into the vehicle compartment according to the information about the information display image.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation controller is provided in the vehicle compartment. The light irradiation controller irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information.

In the description, the information display image signifies information such as a message, symbol, and pattern or information that simply specifies an irradiation target. In other words, the information display image includes not only an information display image that is meaningful itself but also illumination information that, while meaningless in itself, guides the user to an irradiation target when illuminated.

The light direction adjuster may adjust the irradiation direction of the visible light irradiated from the visible light irradiation device, and irradiates the visible light into the vehicle compartment by changing an irradiation position of the visible light in accordance with the information about the information display image transmitted from the electronic control unit.

Since the visible light is movingly irradiated, the user can more easily notice the irradiation. It is possible to allow the user to unerringly recognize the start of visual beam irradiation and guide a fixation point of the user to a location targeted for the irradiation in the vehicle compartment.

For example, the light direction adjuster may adjust the irradiation direction of the visible light irradiated from the visible light irradiation device, and movingly irradiates the visible light from a position to another position in the vehicle compartment in accordance with the information about the information display image transmitted from the electronic control unit. Further, the light direction adjuster may adjust the irradiation direction of the visible light irradiated from the visible light irradiation device, and movingly irradiates the visible light from a specific position to another position in the vehicle compartment in accordance with the information about the information display image transmitted from the electronic control unit.

For example, the electronic control unit may acquire a signal indicating an on-off state of a headlamp operation switch and a signal indicating an on-off state of a key switch, determines a headlamp to be inadvertently left turned on when the headlamp operation switch is on and the key switch is off, and instructs the irradiation direction indicator to provide a headlamp warning as the information display. Specifically, the irradiation direction indicator may provide the headlamp warning by outputting data associated with defining a lighting switch for the headlamp as the irradiation direction, and the light direction adjuster irradiates the visible light to the lighting switch.

The electronic control unit may acquire a signal indicating a fastened-unfastened state of a seat belt and a signal indicating an on-off state of a key switch, determines that the seat belt is unfastened when the seat belt is unfastened and the key switch is off, and instructs the irradiation direction indicator to provide a seat belt warning as the information display. Specifically, the irradiation direction indicator may provide the seat belt warning by outputting data associated with defining a seat belt buckle as the irradiation direction, and the light direction adjuster irradiates the visible light to the seat belt buckle.

The electronic control unit may acquire a signal indicating an on-off state of a parking brake switch and vehicle speed data of the vehicle, determines that a parking brake is inadvertently not released when the parking brake switch is on and the vehicle speed exceeds a threshold value, and instructs the irradiation direction indicator to provide a parking brake warning as the information display. Specifically, the irradiation direction indicator may provide the parking brake warning by outputting data associated with defining the parking brake switch as the irradiation direction, and the light direction adjuster irradiates the visible light to the operation switch.

Further, the electronic control unit may acquire a signal indicating an open-close state of a door of the vehicle and vehicle speed data of the vehicle, determines that the door is inadvertently left opened when the door is opened and the vehicle speed exceeds a threshold value, and instructs the irradiation direction indicator to provide a door ajar warning as the information display. Specifically, the irradiation direction indicator may provide the door ajar warning by outputting data associated with defining a door handle for a ajar door as the irradiation direction, and the light direction adjuster irradiates the visible light to the door handle.

In this in-vehicle information display apparatus, the visible light irradiation device may be arranged on a place different from the light irradiation controller, and an optical fiber cable transmits the visible light irradiated from the visible light irradiation device to the light irradiation controller. When the light direction adjuster is mounted on part of the vehicle that easily becomes hot, for example, it is preferable to mount the visible light irradiation device elsewhere because the visible light irradiation device is weak against a high temperature. In such a case, the optical fiber cable can be used to transmit visible light irradiated from the visible light irradiation device to the light direction adjuster. In the above described construction, for example, it is preferable to mount the visible light irradiation device in a trunk of the vehicle for avoiding a high temperature.

The ceiling of the vehicle is preferable for mounting the light irradiation controller used for the in-vehicle information display apparatus. When the light direction adjuster is mounted on the ceiling, the light irradiation controller can irradiate visible light to a wide range because there are few obstacles interrupting a straight route from the light irradiation controller to switches on the instrument panel.

It is preferable that the light irradiation controller is mounted on a part of the ceiling ahead from an estimated position of a head of a user sitting on a seat of the vehicle.

It is undesirable to irradiate visible light directly to an eye of the user. When a laser is used as the visible light, special attention must be paid to prevent the visible light from directly entering an eye of the user. In consideration of avoiding the eye of the user, the light irradiation controller is mounted ahead of a position for the head of the user. No visible light is irradiated behind the light irradiation controller. When the light irradiation controller irradiates visible light, it is possible to prevent the visible light from directly entering an eye of the user.

One light irradiation controller may be provided for a user on the driver seat or the passenger seat and another light irradiation controller may be provided for a user on the rear seat. The light irradiation controller is mounted on the ceiling ahead from an estimated position of a head of the user sitting on a driver seat. The other light irradiation controller is mounted on the ceiling ahead from an estimated position of the head of the user sitting on a rear seat.

At least one light irradiation controller may be mounted on the ceiling and the vehicle center console each making it possible to display information in a wider range.

According to a second mode, an in-vehicle information display apparatus includes: a light irradiation controller mounted on a vehicle and configured to irradiate a condensed visible light as one of a spot light and an area light to a predetermined position in a vehicle compartment; and an electronic control unit specifying information about an information display image based on at least one of vehicle state information, vehicle surrounding information and vehicle interior information, and transmits the information about the information display image to the light irradiation controller. The light irradiation controller irradiates the visible light into the vehicle compartment in accordance with information about the information display image transmitted from the electronic control unit. The light irradiation controller irradiates the visible light into the vehicle compartment by changing an irradiation position of the visible light in accordance with the information about the information display image transmitted from the electronic control unit.

Such in-vehicle information display apparatus can provide a user with information by irradiating visible light to locations in the vehicle compartment corresponding to the information about the information display image based on at least one of the vehicle state information, the vehicle surrounding information, and the vehicle interior information. The light irradiation controller is provided in the vehicle compartment. The light irradiation controller irradiates visible light for displaying information in the vehicle compartment. Information can be provided for the user in a new mode. The information can be displayed on various locations in the vehicle compartment. A location to irradiate the visible light can be changed in accordance with the information about an information display image. For example, information can be displayed in association with an irradiation location. Further, information can be displayed by movingly irradiating the visible light making it possible to guide the attention of the user to a targeted location. The visible light can be movingly irradiated on locations in the vehicle compartment so as to guide the attention of the user to a targeted location. It is possible to allow the user to reliably view a location where the visible light is irradiated. The user can be unerringly provided with information.

In the description, the information display image signifies information such as a message, symbol, and pattern or information that simply specifies an irradiation target. In other words, the information display image includes not only an information display image that is meaningful itself but also information that, while meaningless in itself, guides the user to an irradiation target when illuminated.

Further, in such a case, the light irradiation controller may irradiate the visible light into the vehicle compartment by changing an irradiation position of the visible light in accordance with the information about the information display image transmitted from the electronic control unit. Since the visible light is movingly irradiated, the user can more easily notice the irradiation. It is possible to allow the user to unerringly recognize the start of visual beam irradiation and guide a fixation point of the user to a location targeted for the irradiation in the vehicle compartment. The information can be displayed on various locations in the vehicle compartment. A location to irradiate the visible light can be changed in accordance with the content of information to be displayed. For example, information can be displayed in association with an irradiation location.

According to a third, the light direction adjuster may adjust an irradiation direction of visible light irradiated by the visible light irradiation device so that the light irradiation controller movingly irradiates the visible light from a position to another position in the vehicle compartment in accordance with the information about the information display image transmitted from the electronic control unit. Further, the light irradiation controller may movingly irradiate the visible light from a specific position to another position in the vehicle compartment in accordance with the information about the information display image transmitted from the electronic control unit.

In the above-mentioned description, the predetermined position in the vehicle compartment may include an interior of the vehicle compartment where the light irradiation controller is capable of irradiating light.

The vehicle state information may shows information indicating a state of the vehicle detected by an onboard device mounted on the vehicle. The vehicle surrounding information may show exterior information including at least one of information associated with the presence of an obstacle around the vehicle, information available near the vehicle, external temperature, weather information, and exterior illumination detected by a vehicle surrounding sensor. The vehicle interior information may include information about the user including biological information and information about a vehicle compartment used for irradiating the visible light.

The light irradiation controller may terminate irradiation of the visible light at an irradiation termination time when the visible light is irradiated, when one of: an irradiation target is operated based on the information about the information display image; and a predetermined time has passed after starting the irradiation of the visible light.

The light irradiation controller can irradiate visible light at a spot but is not limited thereto. The light irradiation controller may irradiate visible light having an appropriate area equivalent to a diameter of a pen so that a vehicle occupant can more easily recognize information. For example, a projector or any other devices may be used as the light irradiation controller. The irradiation area can be enlarged or reduced by changing a light condensing distance using different optical lenses. The light irradiation controller can also freely change irradiation areas based on the above described technique.

The visible light visibility can be flexibly adjusted. The irradiation area can be changed in accordance with the degree of urgency for notification to the user. For example, the irradiation area can be increased for a higher degree of urgency, allowing the user to unerringly recognize the information. Especially, the user is subject to different degrees of the recognition or awareness depending on driving situations of the vehicle. It is effective to change the irradiation area in accordance with the degrees.

The high degree of urgency requires the user to unerringly recognize a situation for safety reasons. For example, the high degree of urgency may be applied to a case where an emergency vehicle approaches, or a pedestrian, two-wheel vehicle, or another vehicle approaches the own vehicle. When the degree of urgency is high, it is effective to change the irradiation area as mentioned above and decrease a volume of the sound output apparatus. The low degree of urgency has no concern for safety aspects such as display for entertainment, for example. One example is to selectively circulate indoor or outdoor air depending on temperatures. Another example is to register a song favored by the user. While the user listens to the radio for music, a visual beam is irradiated for notifying the user of the favorite song that is broadcast on another channel. Still another example is to store map information or shop information in a navigation system. When the vehicle approaches a place for lunch, a visual beam can be irradiated so as to guide the visual line to that place.

According to a fifth mode, a vehicular display apparatus includes: a video light generation device mounted in a vehicle compartment, and configured to condense a light emitted from a light source to generate video light; an occupant determination means for determining whether an occupant occupies the vehicle compartment; and a display control means for controlling the video light generation device to irradiate the video light into the vehicle compartment to display a video image when the occupant determination means determines no occupant in the vehicle compartment.

When it is determined that no occupant exists in the vehicle compartment according to such a construction, the video light generation apparatus irradiates video light in the vehicle compartment to display a video. The video can be displayed more effectively without limitation on places for displaying the video.

The video light may be irradiated on a seat or a center console of the vehicle.

The video light can be irradiated on a vehicle seat or a center console to display a video.

The vehicular display apparatus may further include an elapsed time determination means for determining whether a predetermined reference time or more has passed after the occupant determination means estimates that an occupant has occupied the vehicle. The display control means controls the video light generation device to stop irradiating the video light when the elapsed time determination means determines that the predetermined reference time has passed after the occupant determination means estimates that the occupant is to get into the vehicle.

Let us suppose that the video light irradiation stops immediately when an occupant is assumed to get into a vehicle. In such case, the occupant may not be able to confirm a display content. However, in the present embodiment, the video light irradiation stops when the predetermined time or longer is determined to have passed after the occupant is assumed to get into the vehicle. It is thereby possible to improve the visibility of contents displayed by the video light. The predetermined time is preferably configured so as not to irradiate video light to an occupant getting into the vehicle.

According to a sixth embodiment, a position adjusting means adjusts a display position of information displayed by irradiating a laser beam on an instrument panel surface of a vehicle from a vehicular display apparatus. Information can be visually recognized in accordance with a height of a driver. The position for displaying the information can be adjusted so as to be capable of decreasing a visual line distance.

Specifically, the vehicular display apparatus may further include an eye position detection means for detecting an eye position of a driver in a vertical direction. The position adjusting means adjusts the display position of the information displayed by the information display means in accordance with the eye position of the driver detected by the eye position detection means. The vehicular display apparatus according to such a construction can automatically adjust an information display position without requiring the driver to be aware of the adjustment.

It is possible to detect a vertical eye position of the driver based on a photographic image of a driver face captured by a photographic means. Such a construction can relatively accurately detect a vertical eye position of the driver.

The vertical eye position of the driver can be also detected based on a vertical angle of a rear view mirror detected by a vertical angle detection means. The relatively simple construction can be used to detect a vertical eye position of the driver.

When the eye height of the driver is unchanged, the visibility on an instrument panel surface depends on positions in a front-back direction. Accordingly, the eye position detection means also detects eye positions of the driver in the front-back direction. The vehicular display apparatus according to such a construction can properly adjust information display positions.

An eye position of the driver in the front-back direction can be detected based on a driver seat adjusting position detected by a driving position detecting means. Such a construction can relatively accurately detect an eye position of the driver in the front-back direction.

An eye position of the driver in the front-back direction can be also detected based on a horizontal angle of a rear view mirror detected by a horizontal angle detecting means. The relatively simple construction can be used to detect a vertical eye position of the driver in the front-back direction.

According to a seventh mode, a generated light is irradiated on the surface of a structural object in a vehicle compartment positioned in a peripheral visual field of an occupant so as to change an irradiation direction of the generated light. The generated light is displayed movingly within an irradiation range. An occupant can notice the generated light that is displayed movingly in a peripheral visual field to provide information.

Generally, the human visual cognitive capability is highest at the central visual field and tends to decrease from the central visual field to the peripheral visual field. When recognizing an object included in the peripheral visual field, the human being moves his or her visual line so that the object is included in the central visual field. A change may be made to the object included in the peripheral visual field in such a case where a pedestrian runs out into the road. The human being obviously tends to unconsciously and promptly react on the change of the object and move the visual line to the object. The human being can notice the generated light that is displayed movingly in the peripheral visual field.

In the above described manner, the in-vehicle information display apparatus can acquire information about a surrounding situation from outside the vehicle while an autonomous sensor mounted on the vehicle cannot detect the surrounding situation. The in-vehicle information display apparatus can determine whether the information needs not to be provided.

According to an eighth mode, the in-vehicle information display apparatus acquires information about a surrounding situation from an system outside of the vehicle while an autonomous sensor mounted on the vehicle cannot detect the surrounding situation. The in-vehicle information display apparatus determines whether the information needs to be provided. When it is determined that information needs to be provided, a generated light is irradiated on a structural object in the vehicle compartment included in the peripheral visual field of an occupant. The occupant can notice the display by the generated light and pay attention to surroundings of the vehicle. As a result, the in-vehicle information display apparatus can supply the occupant with information about an obstacle that cannot be detected from the vehicle.

Since the generated light is displayed movingly in the irradiation range, the occupant can notice the generated light movingly displayed within the peripheral visual field.

An irradiation control means preferably controls irradiation so that the generated light is irradiated in a guidance direction for guiding the visual line of an occupant in the vehicle. The occupant can recognize the direction to notice.

An irradiation direction change means uses the guidance direction as an irradiation reference direction for generated light. The irradiation direction change means changes the irradiation direction of the generated light so that the generated light is movingly irradiated near the irradiation reference direction making it possible to vary the generated light displayed in the peripheral visual field of the occupant. The occupant can easily notice the generated light.

The irradiation direction change means uses the guidance direction as the irradiation reference direction for generated light. The irradiation direction change means may change the irradiation direction of the generated light so that the generated light is movingly irradiated from the irradiation reference direction to a direction different from the guidance direction. Changing the irradiation direction also makes it possible to vary the generated light displayed in the peripheral visual field of the occupant. The occupant can easily notice the generated light.

An information acquisition means acquires surrounding situation information from at least one of road-to-vehicle communication with a roadside infrastructure and inter-vehicle communication with the other vehicles. The surrounding situation information concerns at least one of another vehicle, a two-wheel vehicle, and a pedestrian around the vehicle. Even when the vehicle cannot detect information about another vehicle, a two-wheel vehicle, and a pedestrian, such information can be acquired as the surrounding situation information using the road-to-vehicle communication or the inter-vehicle communication.

An occupant in the vehicle can be provided with information when the vehicle is expected to collide with another vehicle, a two-wheel vehicle, and a pedestrian. As a result, the occupant can pay attention to surroundings of the vehicle.

It is possible to determine a possibility of collision with another vehicle, a two-wheel vehicle, or a pedestrian when at least one of the possible collision objects is expected to interrupt the progress of the vehicle.

The irradiation control means preferably controls irradiation so that the generated light is irradiated in accordance with whether the object is another vehicle, a two-wheel vehicle, or a pedestrian. The occupant can recognize an obstacle type from the generated light irradiation.

The vehicular information service apparatus may further include a hazard determination means for determining a hazard level for the vehicle based on the surrounding situation information. The irradiation control means provides irradiation control so as to irradiate the generated light in accordance with the hazard level. The occupant can recognize a hazard level from the generated light irradiation.

The irradiation direction change means accelerates a change in the irradiation direction of generated light as the hazard level increases. The irradiation direction change means decelerates a change in the irradiation direction of generated light as the hazard level decreases. The occupant can recognize a hazard level according to a speed of the movingly displayed generated light.

Generated light can be irradiated on surfaces of an instrument panel and a front pillar included in a peripheral visual field of an occupant in a final posture.

According to a ninth mode, a vehicular display apparatus includes: an irradiator for irradiating a light into a vehicle compartment; and a display control means for controlling the irradiator to irradiate the light on a steering wheel of the vehicle and to display an instruction associated with a steering wheel operation.

According to the above described construction, the irradiator irradiates light to the vehicle compartment and to the vehicle steering wheel so as to display an instruction for steering wheel operation. The instruction for steering wheel operation can be displayed without providing an indicator on an instrument panel in the vehicle compartment.

The instruction for steering wheel operation can be displayed using a space on the vehicle steering wheel easily visible to a driver.

The irradiator condenses light from a light source and irradiates the light on a spot. The irradiator includes a drive mechanism for changing irradiator orientations. The display control means drives the drive mechanism to change irradiator orientations and displays an instruction for a steering wheel operation.

The construction can drive the drive mechanism for changing irradiator orientations and display an instruction for a steering wheel operation.

The irradiator condenses a light from a light source and generates a video light. The display control means instructs the irradiator to irradiate movingly a video light and displays an instruction for a steering wheel operation.

When the irradiator condenses light from a light source and generates video light, the construction can allow the irradiator to irradiate dynamic video light and display an instruction for a steering wheel operation.

The display control means displays an instruction for indicating a direction of a steering wheel operation so that the light moves in the direction of the steering wheel operation direction.

The construction displays an instruction for a steering wheel operation direction so that the light moves in the steering wheel operation direction. A driver can easily recognize the steering wheel operation direction.

The display control means specifies a direction of a steering wheel operation in accordance with information that indicates a selection of the direction of a steering wheel operation for avoiding an obstacle and the selection is input from an obstacle detector for detecting and providing a notification of an obstacle around the vehicle.

The construction can specify a steering wheel operation direction in accordance with information indicating a steering wheel operation direction for avoiding an obstacle, in which the information is supplied from the obstacle detector for detecting and notifying of an obstacle around the vehicle.

The display control means specifies a direction of a steering wheel operation in accordance with information that indicates a selection of the direction of the steering wheel operation for keeping a correct lane and the selection is input from a lane warning apparatus for detecting and providing a notification of a lane where the vehicle is running.

The construction can also specify a steering wheel operation direction in accordance with information indicating a steering wheel operation direction for keeping a correct lane, in which the information is supplied from the lane warning apparatus for detecting and notifying of a lane where the vehicle is running.

The display control means displays an instruction for a steering wheel manipulation amount so as to vary a range of moving light irradiated from the irradiator in accordance with the steering wheel manipulation amount.

The construction displays an instruction for a steering wheel manipulation amount so as to vary the range of moving the light irradiated from the irradiator in accordance with the steering wheel manipulation amount. The driver can easily recognize the steering wheel manipulation amount.

The display control means specifies a steering wheel manipulation amount in accordance with information indicating a value of the steering wheel manipulation amount for avoiding an obstacle and the value is input from the obstacle detector for detecting and providing a notification of an obstacle around the vehicle.

The construction can specify a steering wheel manipulation amount in accordance with information indicating a steering wheel manipulation amount for avoiding an obstacle, in which the information is supplied from the obstacle detector for detecting and notifying of an obstacle around the vehicle.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

The invention claimed is:

1. An in-vehicle information display apparatus comprising:
   a visible light irradiation device mounted on a vehicle and configured to irradiate a condensed visible light as one of a spot light and an area light to a predetermined position in a vehicle compartment;
   a light irradiation controller including a light direction adjuster and an irradiation direction indicator, wherein the light direction adjuster adjusts an irradiation direction of the visible light irradiated from the visible light irradiation device, and the irradiation direction indicator outputs data associated with the irradiation direction to the light direction adjuster to adjust the irradiation direction of the visible light; and
   an electronic control unit specifying information about an information display image based on at least one of vehicle state information, vehicle surrounding information and vehicle interior information, and transmits the information about the information display image to the irradiation direction indicator,
   wherein the irradiation direction indicator outputs the data associated with the irradiation direction to the light direction adjuster based on the information about the information display image transmitted from the electronic control unit, and
   wherein the light direction adjuster adjusts the irradiation direction of the visible light irradiated from the visible beam irradiator for irradiating the visible light irradiated into the vehicle compartment according to the information about the information display image.

2. The in-vehicle information display apparatus of claim 1, wherein the light direction adjuster adjusts the irradiation direction of the visible light irradiated from the visible light irradiation device, and irradiates the visible light into the vehicle compartment by changing an irradiation position of the visible light in accordance with the information about the information display image transmitted from the electronic control unit.

3. The in-vehicle information display apparatus of claim 1, wherein the light direction adjuster adjusts the irradiation direction of the visible light irradiated from the visible light irradiation device, and movingly irradiates the visible light from a position to another position in the vehicle compartment in accordance with the information about the information display image transmitted from the electronic control unit.

4. The in-vehicle information display apparatus of claim 1, wherein the light direction adjuster adjusts the irradiation direction of the visible light irradiated from the visible light irradiation device, and movingly irradiates the visible light from a specific position to another position in the vehicle compartment in accordance with the information about the information display image transmitted from the electronic control unit.

5. The in-vehicle information display apparatus of claim 1, wherein the electronic control unit acquires a signal indicating an on-off state of a headlamp operation switch and a signal indicating an on-off state of a key switch, determines a headlamp to be inadvertently left turned on when the headlamp operation switch is on and the key switch is off, and instructs the irradiation direction indicator to provide a headlamp warning as the information display.

6. The in-vehicle information display apparatus of claim 5, wherein the irradiation direction indicator provides the headlamp warning by outputting data associated with defining a lighting switch for the headlamp as the irradiation direction, and the light direction adjuster irradiates the visible light to the lighting switch.

7. The in-vehicle information display apparatus of claim 1, wherein the electronic control unit acquires a signal indicating a fastened-unfastened state of a seat belt and a signal indicating an on-off state of a key switch, determines that the seat belt is unfastened when the seat belt is unfastened and the key switch is off, and instructs the irradiation direction indicator to provide a seat belt warning as the information display.

8. The in-vehicle information display apparatus of claim 7, wherein the irradiation direction indicator provides the seat belt warning by outputting data associated with defining a seat belt buckle as the irradiation direction, and the light direction adjuster irradiates the visible light to the seat belt buckle.

9. The in-vehicle information display apparatus of claim 1, wherein the electronic control unit acquires a signal indicating an on-off state of a parking brake switch and vehicle speed data of the vehicle, determines that a parking brake is inadvertently not released when the parking brake switch is on and the vehicle speed exceeds a threshold value, and instructs the irradiation direction indicator to provide a parking brake warning as the information display.

10. The in-vehicle information display apparatus of claim 9, wherein the irradiation direction indicator provides the parking brake warning by outputting data associated with defining the parking brake switch as the irradiation direction, and the light direction adjuster irradiates the visible light to the operation switch.

11. The in-vehicle information display apparatus of claim 1,
wherein the electronic control unit acquires a signal indicating an open-close state of a door of the vehicle and vehicle speed data of the vehicle, determines that the door is inadvertently left opened when the door is opened and the vehicle speed exceeds a threshold value, and instructs the irradiation direction indicator to provide a door ajar warning as the information display.

12. The in-vehicle information display apparatus of claim 11,
wherein the irradiation direction indicator provides the door ajar warning by outputting data associated with defining a door handle for a ajar door as the irradiation direction, and the light direction adjuster irradiates the visible light to the door handle.

13. The in-vehicle information display apparatus of claim 1,
wherein the visible light irradiation device is arranged on a place different from the light irradiation controller, and an optical fiber cable transmits the visible light irradiated from the visible light irradiation device to the light irradiation controller.

14. The in-vehicle information display apparatus of claim 13,
wherein the visible light irradiation device is arranged in a trunk of the vehicle.

15. The in-vehicle information display apparatus of claim 1,
wherein the predetermined position in the vehicle compartment includes an interior of the vehicle compartment where the visible light irradiation device is capable of irradiating light.

16. The in-vehicle information display apparatus of claim 1,
wherein the vehicle state information shows information indicating a state of the vehicle detected by an onboard device mounted on the vehicle;
wherein the vehicle surrounding information shows exterior information including at least one of information associated with the presence of an obstacle around the vehicle, information available near the vehicle, external temperature, weather information, and exterior illumination detected by a vehicle surrounding sensor, and
wherein the vehicle interior information includes information about the user including biological information and information about a vehicle compartment used for irradiating the visible light.

17. The in-vehicle information display apparatus of claim 1,
wherein the light irradiation controller terminates irradiation of the visible light at an irradiation termination time when the visible light is irradiated, when one of: an irradiation target is operated based on the information about the information display image; and a predetermined time has passed after starting the irradiation of the visible light.

18. A light irradiation controller provided for the in-vehicle information display apparatus of claim 1,
wherein the light irradiation controller is arranged at a ceiling of the vehicle.

19. The light irradiation controller of claim 18,
wherein the light irradiation controller is mounted on a part of the ceiling ahead from an estimated position of a head of a user sitting on a seat of the vehicle.

20. The light irradiation controller of claim 18,
wherein at least one light irradiation controller is arranged on each of the ceiling and a center console of the vehicle.

21. The light irradiation controller of any one of claim 18,
wherein at least one light irradiation controller is mounted on each of a part of the ceiling and another part of the ceiling,
wherein the part of the ceiling is disposed ahead from an estimated position of a head of the user sitting on a driver seat, and
wherein the other part of the ceiling is disposed ahead from an estimated position of the head of the user sitting on a rear seat.

22. An in-vehicle information display apparatus comprising:
a light irradiation controller mounted on a vehicle and configured to irradiate a condensed visible light as one of a spot light and an area light to a predetermined position in a vehicle compartment; and
an electronic control unit specifying information about an information display image based on at least one of vehicle state information, vehicle surrounding information and vehicle interior information, and transmits the information about the information display image to the light irradiation controller,
wherein the light irradiation controller irradiates the visible light into the vehicle compartment in accordance with information about the information display image transmitted from the electronic control unit, and
wherein the light irradiation controller irradiates the visible light into the vehicle compartment by changing an irradiation position of the visible light in accordance with the information about the information display image transmitted from the electronic control unit.

23. The in-vehicle information display apparatus of claim 22,
wherein the predetermined position in the vehicle compartment includes an interior of the vehicle compartment where the light irradiation controller is capable of irradiating light.

24. An in-vehicle information display apparatus comprising:
a light irradiation controller mounted on a vehicle and configured to irradiate a condensed visible light as one of a spot light and an area light to a predetermined position in a vehicle compartment; and
an electronic control unit specifying information about an information display image based on at least one of vehicle state information, vehicle surrounding information and vehicle interior information, and transmits the information about the information display image to the light irradiation controller,
wherein the light irradiation controller irradiates the visible light into the vehicle compartment in accordance with information about the information display image transmitted from the electronic control unit, and
wherein the light irradiation controller movingly irradiates the visible light from a position to another position in the vehicle compartment in accordance with the information about the information display image transmitted from the electronic control unit.

25. An in-vehicle information display apparatus comprising:
a light irradiation controller mounted on a vehicle and configured to irradiate a condensed visible light as one of a spot light and an area light to a predetermined position in a vehicle compartment; and an electronic control unit specifying information about an information display image based on at least one of vehicle state information, vehicle surrounding information and vehicle interior information, and transmits the information about the information display image to the light irradiation controller, wherein the light irradiation controller irradiates the visible light into the vehicle compartment in accordance with information about the information display image transmitted from the electronic control unit, and wherein the light irradiation controller movingly irradiates the visible light from a specific position to another position in the vehicle compartment in accordance with the information about the information display image transmitted from the electronic control unit.

26. A vehicular display apparatus comprising:

a video light generation device mounted in a vehicle compartment, and configured to condense a light emitted from a light source to generate a video light;

an occupant determination unit for determining whether an occupant occupies the vehicle compartment; and a display control unit for controlling the video light generation device to irradiate the video light into the vehicle compartment to display a video image when the occupant determination unit determines no occupant in the vehicle compartment.

27. The vehicular display apparatus of claim 26, wherein the video light is irradiated on a seat or a center console of the vehicle.

28. The vehicular display apparatus of claim 26 further comprising:

an elapsed time determination unit for determining whether a predetermined reference time or more has passed after the occupant determination unit estimates that an occupant has occupied the vehicle, wherein the display control unit controls the video light generation device to stop irradiating the video light when the elapsed time determination unit determines that the predetermined reference time has passed after the occupant determination unit estimates that the occupant is to get into the vehicle.

29. A vehicular display apparatus comprising:

an information display unit for displaying information by irradiating a laser beam on an instrument panel surface of a vehicle;

a position adjusting unit for adjusting a display position of the information displayed by the information display unit;

an eye position detection unit for detecting an eye position of a driver in a vertical direction; and a vertical angle detection unit for detecting a vertical angle of a rear view mirror, wherein the position adjusting unit adjusts the display position of the information displayed by the information display unit in accordance with the eye position of the driver detected by the eye position detection unit, and wherein the eye position detection unit detects the eye position of the driver in the vertical direction based on the vertical angle of the rear view mirror detected by the angle detection unit.

30. The vehicular display apparatus of claim 29, further comprising:

a driving position detecting unit for detecting a driver seat adjusting position, wherein the eye position detection unit detects the eye position of the driver in the front-back direction based on the driver seat adjusting position detected by the driving position detecting unit.

31. The vehicular display apparatus of claim 29, further comprising a horizontal angle detecting unit for detecting a horizontal angle of a rear view mirror, wherein the eye position detection unit detects the eye position of the driver in a front-back direction based on the horizontal angle of the rear view mirror detected by the horizontal angle detecting unit.

32. A vehicular information service apparatus comprising:

an irradiator arranged in a vehicle compartment of a vehicle, and configured to irradiate light generated by condensing a light from a light source;

an information acquisition unit for acquiring surrounding situation information about a surrounding situation of the vehicle;

an information service determining unit for determining based on the surrounding situation information acquired by the information acquisition unit whether an object for information service for an occupant of the vehicle exists at a position out of a peripheral visual field of the occupant of the vehicle; and an irradiation control unit controlling to irradiate the generated light on a structural object other than a glass surface in the vehicle compartment positioned in a peripheral visual field of the occupant of the vehicle when the information service determining unit determines that the object for information service exists, wherein the irradiation control unit includes a variable mechanism variably changing an irradiation direction of the generated light, and an irradiation light moving unit that has an irradiation range on a surface of the structural object in the peripheral visual field of the occupant of the vehicle and movingly irradiates the generated light by using the variable mechanism within both the irradiation range and a predetermined range in which the object for information service exists.

33. The vehicular information service apparatus of claim 32, further comprising:

a communication unit for communicating with a system outside of the vehicle, wherein the information acquisition unit acquires the surrounding situation information from the system outside of the vehicle via the communication unit, and wherein the information service determining unit determines the information service based on the surrounding situation information acquired from the system outside of the vehicle.

34. The vehicular information service apparatus of claim 32, wherein the irradiation control unit controls to irradiate the generated light on at least one of structural objects of an instrument panel and a front pillar in the vehicle compartment.

35. A vehicular information service apparatus comprising:

an irradiator arranged in a vehicle compartment of a vehicle, and configured to irradiate a light generated by condensing the light from a light source;

an information acquisition unit for acquiring surrounding situation information about a surrounding situation of the vehicle;

an information service determining unit for determining a necessity of information service for an occupant of the vehicle based on the surrounding situation information acquired by the information acquisition unit;
an irradiation control unit for controlling to irradiate the generated light on a structural object other than a glass surface in the vehicle compartment positioned in a peripheral visual field of the occupant of the vehicle when the information service determining unit determines the necessity of information service; and
a communication unit for communicating with a system outside of the vehicle,
wherein the information acquisition unit acquires the surrounding situation information from the system outside of the vehicle via the communication unit, and
wherein the information service determining unit determines the information service based on the surrounding situation information acquired from the system outside of the vehicle.

36. The vehicular information service apparatus of claim 35,
wherein the irradiation control unit includes a variable mechanism for variably changing an irradiation direction of the generated light, and
wherein the irradiation control unit includes an irradiation direction change unit that establishes an irradiation range on a surface of the structural object, and changes the irradiation direction while irradiating the generated light within the irradiation range.

37. The vehicular information service apparatus of claim 36,
wherein the irradiation control unit controls the irradiation in such a manner that the generated light is scanned along with a guidance direction for guiding a visual line of an occupant in the vehicle.

38. The vehicular information service apparatus of claim 37,
wherein the irradiation direction change unit defines the guidance direction as an irradiation reference direction for the generated light, and changes the irradiation direction of the generated light in such a manner that the generated light is movingly irradiated around the irradiation reference direction.

39. The vehicular information service apparatus of claim 37,
wherein the irradiation direction change unit defines the guidance direction as an irradiation reference direction for the generated light, and changes an irradiation direction of the generated light in such a manner that the generated light is movingly irradiated from the irradiation reference direction to a direction different from the guidance direction.

40. The vehicular information service apparatus of claim 35,
wherein the surrounding situation information acquired by the information acquisition unit relates to at least one of another vehicle, a two-wheel vehicle and a pedestrian disposed around the vehicle, the surrounding situation information acquired from at least one of a road-to-vehicle communication with a roadside infrastructure and an inter-vehicle communication with the other vehicle.

41. The vehicular information service apparatus of claim 40 further comprising:
a collision determining unit for determining a possibility of collision between the vehicle and the at least one of the other vehicle, the two-wheel vehicle, and the pedestrian acquired from the surrounding situation information,
wherein the information service determining unit determines a necessity of information service for the occupant when the collision determining unit determines the possibility of collision.

42. The vehicular information service apparatus of claim 41,
wherein the collision determining unit determines a traveling direction of the vehicle in accordance with turn signal information and vehicle speed information about the vehicle, and determines the possibility of collision when there is the at least one of the other vehicle, the two-wheel vehicle, and the pedestrian entering around the vehicle in the traveling direction.

43. The vehicular information service apparatus of claim 35,
wherein the irradiation control unit provides irradiation control so as to irradiate the generated light in accordance with the other vehicle, the two-wheel vehicle and the pedestrian.

44. The vehicular information service apparatus of claim 35, further comprising:
a hazard determination unit for determining a hazard level for the vehicle based on the surrounding situation information,
wherein the irradiation control unit provides irradiation control so as to irradiate the generated light in accordance with the hazard level.

45. The vehicular information service apparatus of claim 44,
wherein the irradiation direction change unit accelerates a change of the irradiation direction of the generated light as the hazard level increases, and decelerates the change of the irradiation direction of the generated light as the hazard level decreases.

46. A vehicular display apparatus comprising:
an irradiator for irradiating a light into a vehicle compartment; and
a display control unit for controlling the irradiator to irradiate the light on a steering wheel of the vehicle and to display an instruction associated with a steering wheel operation.

47. The vehicular display apparatus of claim 46,
wherein the irradiator condenses the light from a light source, and irradiates the light at a spot,
wherein the irradiator includes a drive mechanism for changing an orientation of the irradiator, and
wherein the display control unit drives the drive mechanism to change the orientation of the irradiator and to display the instruction associated with the steering wheel operation.

48. The vehicular display apparatus of claim 46,
wherein the irradiator condenses the light from a light source, and generates a video light, and
wherein the display control unit controls the irradiator to movingly irradiate video light so as to display the instruction for the steering wheel operation.

49. The vehicular display apparatus of claim 46,
wherein the display control unit displays an instruction for indicating a direction of the steering wheel operation in such a manner that the light moves in the direction of the steering wheel operation.

50. The vehicular display apparatus of claim 49,
wherein the display control unit specifies the direction of the steering wheel operation in accordance with information that indicates a selection of the direction of the steering wheel operation for avoiding an obstacle, the selection input from an obstacle detector for detecting and providing a notification associated with the obstacle around the vehicle.

51. The vehicular display apparatus of claim 49, wherein the display control unit specifies the direction of the steering wheel operation in accordance with information that indicates a selection of the direction of the steering wheel operation for keeping a correct lane, the selection input from a lane warning apparatus for detecting and providing a notification associated with deviation from a lane where the vehicle is running.

52. The vehicular display apparatus of claim 46, wherein the instruction displayed by the display control unit includes an instruction for a steering wheel manipulation amount associated with varying a moving range of the light irradiated from the irradiator in accordance with the steering wheel manipulation amount.

53. The vehicular display apparatus of claim 52, wherein the display control unit specifies the steering wheel manipulation amount in accordance with information indicating a value of the steering wheel manipulation amount for avoiding the obstacle, the value input from an obstacle detector for detecting and providing a notification associated with the obstacle around the vehicle.

\* \* \* \* \*